(12) United States Patent
Womack

(10) Patent No.: US 10,494,067 B1
(45) Date of Patent: Dec. 3, 2019

(54) MELLOSHIP: PERSONAL WATERCRAFT FOR RELAXATION

(71) Applicant: John James Womack, Princeton, NJ (US)

(72) Inventor: John James Womack, Princeton, NJ (US)

( * ) Notice: Subject to any disclaimer, the term of this patent is extended or adjusted under 35 U.S.C. 154(b) by 0 days.

(21) Appl. No.: 15/332,418

(22) Filed: Oct. 24, 2016

Related U.S. Application Data

(60) Provisional application No. 62/245,509, filed on Oct. 23, 2015.

(51) Int. Cl.
| | |
|---|---|
| *B63B 35/73* | (2006.01) |
| *A45F 3/24* | (2006.01) |
| *A01K 97/10* | (2006.01) |
| *A63B 21/00* | (2006.01) |
| *B63B 35/38* | (2006.01) |

(52) U.S. Cl.
CPC ............ *B63B 35/73* (2013.01); *A01K 97/10* (2013.01); *A45F 3/24* (2013.01); *A63B 21/40* (2015.10); *B63B 35/38* (2013.01)

(58) Field of Classification Search
CPC ............................... B63B 35/38; B63B 35/73
See application file for complete search history.

(56) References Cited

U.S. PATENT DOCUMENTS

| | | | | |
|---|---|---|---|---|
| 5,290,196 A * | 3/1994 | Steel | ........................ | B63B 7/082 441/130 |
| 6,467,109 B1 * | 10/2002 | Wu | ........................... | A45F 3/24 5/120 |
| 2005/0251910 A1 * | 11/2005 | Boyd | ........................ | A45F 3/24 5/120 |
| 2014/0345048 A1 * | 11/2014 | Mueller | .................... | A45F 3/24 5/119 |

* cited by examiner

*Primary Examiner* — Stephen P Avila

(57) ABSTRACT

Disclosed herein are "Melloship" personal watercraft, optionally motorized, which are designed to be very comfortable and promote personal relaxation, and even allow one to doze off and nap while maintaining personal safety.

7 Claims, 50 Drawing Sheets

106, 108

106, 108

MELLOSHIP: PERSONAL WATERCRAFT FOR RELAXATION

CROSS-REFERENCE TO RELATED APPLICATION

This application claims the benefit of U.S. Provisional Application No. 62/245,509, filed on Oct. 23, 2015.

TECHNICAL FIELD

The disclosed inventions are in the field of personal watercraft. The disclosed inventions are also in the field of equipment and devices for promoting relaxation, i.e., to make one mellow.

BACKGROUND

There are numerous ways in which people relax. Sitting on a couch, reclining in an easy chair, lounging by the pool in a chaise, sunning on a blanket at the beach, and laying in a hammock in the shade on a hot sunny day are but a few ways in which people relax to escape life's stresses. Boating using personal watercraft is also a popular way in which people relax, but to get truly comfortable in a row boat, canoe, or kayak is quite difficult (e.g., hard surfaces and not much space) and/or quite dangerous (e.g., a canoe could easily tip if a person falls asleep and slumps to one side). One important factor to proper relaxation is the ability to stretch out one's body into a very comfortable position. Row boats, canoes, and kayaks provide users with sitting positions in which most of the user's weight is transferred directly through the user's ischium bones ("sits bones") onto a hard seat. Another aspect of relaxation is a quiet environment. Small internal combustion engine ("ICE") outboard motors are also quite noisy and/or smelly, so they are not conducive to promoting relaxation. Indeed, ICE outboard motors are frequently banned by municipalities on some ponds, lakes and rivers for reasons due to the noise they produce.

Another important factor to proper relaxation is the ability to doze off and nap. Falling asleep alone in a row boat, kayak, or canoe can be quite difficult (e.g., too uncomfortable) and/or quite dangerous (e.g., a canoe or kayak could easily tip if a person falls asleep and slumps to one side). Accordingly there is a need for personal watercraft, optionally motorized, which are designed to be very comfortable and promote personal relaxation, and even allow one to doze off and nap while maintaining personal safety. The "Melloship" personal watercraft inventions described herein are designed to provide this need.

SUMMARY

Provided herein are floating vessels having a first end and a second end spaced from the first end in a first direction, the floating vessel comprising: a first pontoon extending in the first direction; a second pontoon extending in the first direction and being substantially parallel to the first pontoon; a first support structure located at the first end and extending at least partially in a height direction, wherein the height direction is substantially perpendicular to the first direction, the first support structure being operatively coupled to both the first pontoon and the second pontoon; a second support structure located at the second end and extending at least partially in the height direction, the second support structure being operatively coupled to both the first pontoon and the second pontoon; and a hammock coupled to both the first support structure and the second support structure.

In various embodiments the first support structure includes a first hammock pole, a first support leg, and a second support leg, wherein the first support leg is operatively coupled to the first pontoon and the second support leg is operatively coupled to the second pontoon. In some embodiments the second support structure includes a second hammock pole, a third support leg, and a fourth support leg, wherein the third support leg is operatively coupled to the first pontoon and the fourth support leg is operatively coupled to the second pontoon.

In related embodiments the floating vessels may further comprise a first cross beam extending from the first pontoon to the second pontoon in a second direction, wherein the second direction is substantially perpendicular to both the first direction and the height direction; and a second cross beam extending from the first pontoon to the second pontoon in the second direction.

The first hammock pole in certain embodiments may also be coupled to the first cross beam and the second hammock pole is coupled to the second cross beam.

In related embodiments the first support leg can be coupled to the first hammock pole at a first point and the second support leg is coupled to the first hammock pole at the first point, and wherein the third support leg is coupled to the second hammock pole at a second point and the fourth support leg is coupled to the second hammock pole at the second point. In related embodiments the first point is positioned equidistant between the first pontoon and the second pontoon in the second direction, and wherein the second point is positioned equidistant between the first pontoon and the second pontoon in the second direction.

For easy transport the floating vessels can also have collapsible lightweight pontoons that are inflatable.

In a number of embodiments the floating vessels described herein may further be comprised of one or more of the following: an additional hammock and hammock support system, an additional pontoon, an umbrella, a battery to provide electric power to one or more devices, a solar photovoltaic system for charging the battery, a cup holder, a light, a yoga deck, deck flooring, an electric motor to propel the floating vessel, a fishing pole holder, an electric fan.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not drawn to scale. In the drawings.

DETAILED DESCRIPTION OF ILLUSTRATIVE EMBODIMENTS

Figure 1:
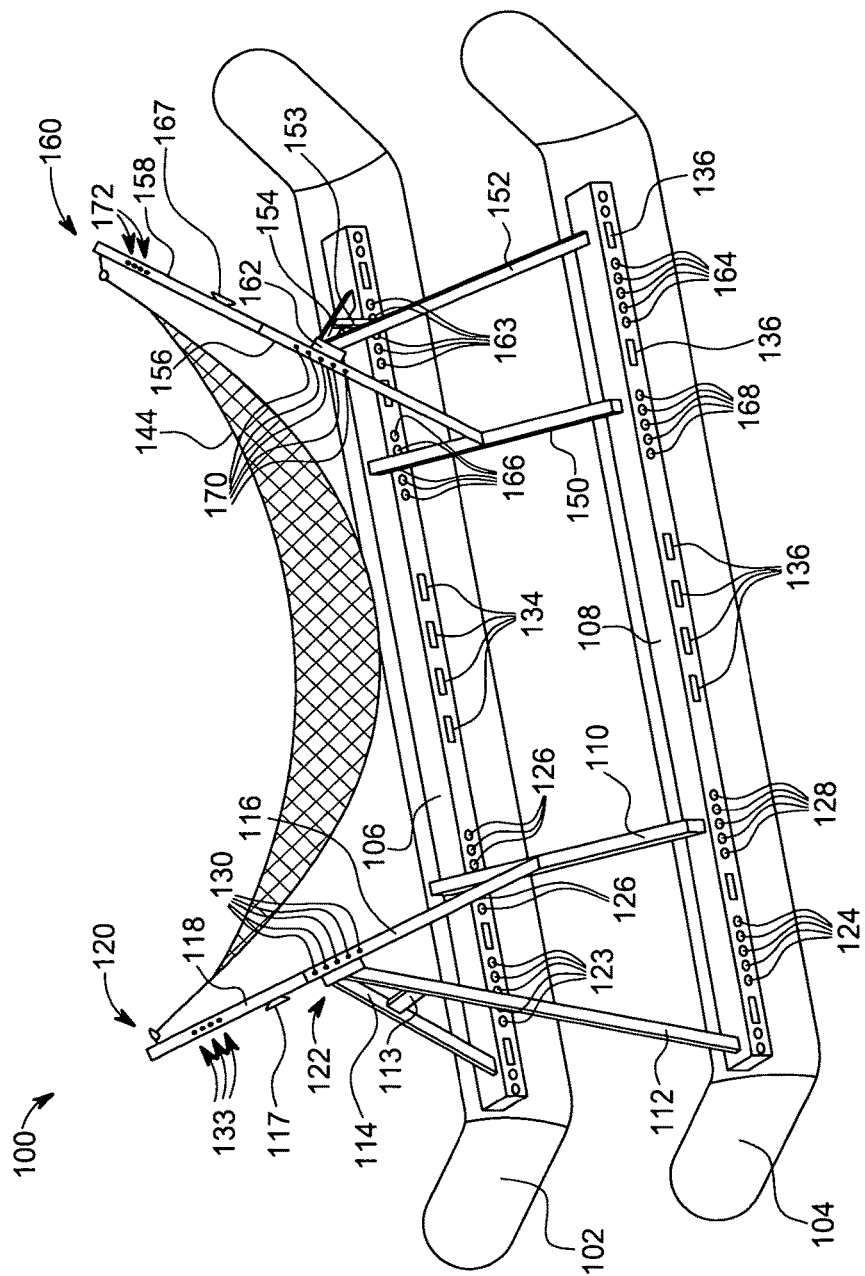
FIG. 1 is a perspective view of a floating hammock vessel, according to an aspect of this disclosure.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

Glossary of Elements

| # | Name of Element |
|---|---|
| 100 | Floating Hammock Vessel |
| 102 | Pontoon 1 |
| 104 | Pontoon 2 |
| 106 | Base Frame 1 (further, higher or left) |
| 108 | Base Frame 2 (closer, lower or right) |
| 110 | Leg C Crossbeam |
| 112 | Leg B |
| 113 | Cross-Legs supporter (btw: Legs A & B) |
| 114 | Leg A |
| 116 | Leg C |
| 117 | Hammock Fastening Point (rope tie down location) |
| 118 | Leg C Extension (hammock pole) |
| 120 | Suspension Point A |
| 122 | Junction Z |
| 123 | Leg A Adjuster (of base/foot) |
| 124 | Leg B Adjuster (of base/foot) |
| 126 | Leg C Crossbeam Adjuster (far, higher side, or left) |
| 128 | Leg C Crossbeam Adjuster (near, lower side, or right) |
| 130 | Leg C Connection Points (to attach to Junction Z) |

Glossary of Elements -continued

| # | Name of Element |
|---|---|
| 132 | Leg C Extension Connection Points (for attachments) |
| 134 | Frame 1 Connection Points (Strap Holes) |
| 136 | Frame 2 Connection Points (Strap Holes) |
| 144 | Hammock |
| 150 | Leg F Crossbeam |
| 152 | Leg E |
| 153 | Cross Legs Supporter (btw: legs E & D) |
| 154 | Leg D |
| 156 | Leg F |
| 158 | Leg F Extension |
| 160 | Suspension Point B |
| 162 | Junction Y |
| 163 | Leg D Adjuster (of base/foot) |
| 164 | Leg E Adjuster (of base/foot) |
| 166 | Leg F Crossbeam Adjuster (far, higher side, or left) |
| 167 | Hammock Fastening Point (rope tie down location) |
| 168 | Leg F Crossbeam Adjuster (near, lower side, or right) |
| 170 | Leg F Connection Points (to attach to Junction Y) |
| 172 | Leg F Extensions Connection points (for attachments) |
| 402 | Strap Receiving Loop on Pontoon |
| 404 | Strap |
| 406 | Pontoon Bladder 1 |
| 408 | Pontoon Bladder 2 |
| 410 | Pontoon Bladder 3 |
| 412 | Section 1 (of inflatable pontoon) |
| 414 | Section 2 (of inflatable pontoon) |
| 416 | Section 3 (of inflatable pontoon) |
| 418 | Bladder Valve (three of these) |
| 420 | Section 1 (of 3-section solid Pontoon w/o curved ends) |
| 422 | Section 2 (of 3-section solid Pontoon w/o curved ends) |
| 424 | Section 3 (of 3-section solid Pontoon w/o curved ends) |
| 426 | Section 1 (of 2-section solid Pontoon w/o curved ends) |
| 428 | Section 2 (of 2-section solid Pontoon w/o curved ends) |
| 430 | Section 1 (of 3-section solid Pontoon w/ curved ends) |
| 432 | Section 2 (of 3-section solid Pontoon w/ curved ends) |
| 434 | Section 3 (of 3-section solid Pontoon w/ curved ends) |
| 436 | Section 1 (of 2-section solid Pontoon w/ curved ends) |
| 438 | Section 2 (of 2-section solid Pontoon w/ curved ends) |
| 502 | Strap Hole (passing through base frame) |
| 504 | Base Frame, Top Side |
| 505 | Connector Hole (for connectingparts) |
| 506 | Base Frame Section 1 (of a 2-section frame) |
| 508 | Base Frame Section 2 (of a 2-section frame) |
| 520 | Base Frame, Bottom side |
| 521 | Connector Bar Receiving canal |
| 522 | Connector Bar |
| 524 | Connector Bar connection hole |
| 525 | Connector Members (bolts, nuts, washers, etc.) |
| 1002 | Angle R, between baseplate and leg |
| 1302 | Junction Z Connection Joint |
| 1402 | Curved Extension |
| 1404 | Curved Extension |
| 1406 | Connection Points (connection to Legs C and F extensions) |
| 1502 | Doubles Extension Mechanism A (left/Aside) |
| 1504 | Doubles Extension Mechanism B (right/B side) |
| 1510 to 1540 | 12 Suspension Points (1510, 1512, . . . 1520 and 1530, 1532, . . . 1540) |
| 1550 | Hammock #2 |
| 1602 | Curved Doubles Extension Mechanism A |
| 1604 | Curved Doubles Extension Mechanism B |
| 1610 to 1640 | 12 Suspension Points ( 1610, 1612, . . . 1620 and 1630, 1632, . . . 1640) |
| 1700 | Doubles Stacked Extension Attachment (A-Side) |
| 1701 | Doubles Stacked Extension Attachment (B side) |
| 1702 | Suspension Point A-S1 (A-side Upper of stacked hammocks) |
| 1704 | Suspension Point A-S2 (A-side Lower of stacked hammocks) |
| 1706 | Suspension Point B-S1 (B-side Upper of stacked hammocks) |
| 1708 | Suspension Point B-S2 (B-side Lower of stacked hammocks) |
| 1802 | Shade Umbrella |
| 1804 | Cup Holder |
| 1806 | Light |
| 1808 | Connector Strap (to attach elements to Legs A, B, C, D, E, F) |
| 1810 | Cup Holder Flexible Neck |
| 1812 | Cup Holder Connector Section |
| 1814 | Light Connector Section |

-continued

| Glossary of Elements | |
|---|---|
| # | Name of Element |
| 1902 | Floor Connector Hole |
| 1904 | Deck Flooring Section |
| 2102 | Yoga Deck Flooring Section |
| 2302 | Long Deck Flooring Section |
| 2402 | Motor Mount Hole Connectors |
| 2403 | Flat Mount for Motor |
| 2404 | Motor (Flat Mount version) |
| 2405 | Shaft and Propeller |
| 2406 | Solar Panel |
| 2407 | Motor Mount Clamp |
| 2408 | Solar Panel Mounting Attachment |
| 2409 | Tiller for steering |
| 2410 | Conduit |
| 2412 | Battery Holder Tie-Down |
| 2414 | Battery Holder |
| 2502 | Motor (Transom Mount version) |
| 2504 | Transom |
| 2506 | Transom Attachment |
| 2602 | Extension Cup Holder |
| 2604 | Base Frame Attachment with Cup Holder |
| 2702 | Fishing Pole Holder |
| 2704 | Base Frame Attachment with Fishing Pole Holder |
| 2802 | Table/Desktop |
| 2804 | Base Frame Attachment with Table/Desktop |
| 2902 | Fan |
| 2904 | Base Frame Attachment with Fan |
| 30 | i-Series (inflatable pontoon likely and different frame) (ponds, pools, rivers up to class 1 rapids) |
| 3002 | Strap Fastening Point (on Pontoon which enables attachment to Frame) |
| 3100 | i-Frame, fully assembled |
| 3101 | i-Frame Part 1 |
| 3102 | i-Frame Part 2 |
| 3103 | i-Frame Part 3 |
| 3104 | i-Frame Part 4 |
| 3105 | i-Frame Part 5 |
| 3106 | i-Frame Part 6 |
| 3107 | i-Frame Part 7 |
| 3108 | i-Frame Part 8 |
| 3109 | i-Frame Part 9 |
| 3110 | i-Frame Part 10 |
| 3111 | i-Frame Part 11 |
| 3112 | i-Frame Part 12 |
| 3113 | i-Frame Top Connector A |
| 3114 | i-Frame Top Connector B |
| 3115 | i-Frame Suspension Point A |
| 3116 | i-Frame Suspension Point B |
| 3202 | Strap Hole Fastening Point (on frame, enabling attachment to pontoon) |
| 3502 | i-Frame Doubles Top Connector A (A-side) |
| 3504 | i-Frame Doubles Top Connector B (B-side) |
| 36 | Next S-Series MelloShip (super slick Design with strong materials) |
| 3602 | Cross-Pontoon Frame |
| 3604 | Adjustable Joint Unit Attachment |
| 3606 | Cross-Pontoon Frame Rack Attachment |
| 3608 | Cross-Pontoon Frame Rack & Solar Panel Mount Attachment |
| 3610 | Solar Panel Mounting Location |
| 3702 | Cross-Pontoon Frame Attachment Receiver |
| 42 | Circular Pontoon/floatation device Series |
| 4202 | Circular Floating Device (Circular floatation device) |

The disclosure relates to a floating hammock vessel configured to safely and comfortably cruise about a body of water for recreational purposes.

FIG. 1 shows an overview of a particular version of the MelloShip. In this particular embodiment the MelloShip is shown with two pontoons 102 and 104, which are shown here as supporting Base Frame 1 (106) and Base Frame 2 (108). Pontoons 102 and 104 may be attached to their respective Base Frames (106 and 108) by means of straps or other fastener devices which hold Pontoon and Base Frames together, pulling them together so they act as one unit. These fasteners will not allow the Base Frame to move with respect to the Pontoon it is fastened to: not to move laterally, nor longitudinally, nor up and down. The manner in which Base Frame 1 is attached to Pontoon 1 (or in which Base Frame 2 is attached to Pontoon 2) could be that part or all of the Base Frame sits within the pontoon mold in the case where Pontoon 1 (or Pontoon 2) is a solid Pontoon with solid molding in place such that the molding has a channel, trench or other three-dimensional aspect of limiting the movement in terms of left/right, forward/backward, or Up/Down. In such a case, Base Frame 1 or 2 would fit snugly into Pontoon 1's or Pontoon 2's channel or trench or canal and be fastened to it by a strap system that is attached to Pontoon 1 or Pontoon 2 and prevents the Base Frame from rising up. In this case, the Strap would be connected to Pontoon 1 or Pontoon 2 and the strap would pass through a fastening point on Base Frame 1 or Base Frame 2 before it (the strap) would return to itself or to the Pontoon it originated from, and the strap would be able to be tightened, securely gripping the Base Frame, and the strap would then be affixed to itself or the pontoon it is attached to by means of Velcro or ratchets or other fastening mechanism. In the variation where Pontoon 1 and Pontoon 2 do not have a channel or trench, then Base Frame 1 and Base Frame 2 may sit atop Pontoon 1 and Pontoon 2 and be attached to it by straps and/or fasteners which prevent the movement of the Base Frame in relation to the pontoon. Multiple Straps and/or Fasteners may hold Base Frame 1 onto Pontoon 1 and multiple Straps and/or Fasteners may hold Base Frame 2 onto Pontoon 2. In The case that Pontoon 1 and Pontoon 2 are inflatable pontoons, then the straps and/or fastening mechanisms will be affixed directly to the inflatable pontoon or to a sleeve/covering into which the pontoon would tightly fit. In the variation of inflatable Pontoons 1 and 2, Base Frames 1 and 2 would be attached by these multiple straps and/or fastening mechanisms in such a manner that the Base Frame will not be able to move left/right, forward/backward, nor up/down in relation to the Pontoon. There may be multiple pontoon variations (solid, solid with molded channels, inflatable, inflatable with sleep/cover, etc.) which might be preferable for any given variation of the floating hammock vessel and in each variation the Pontoon will have straps and/or fasteners that are connected to the same Pontoon and which (straps/fasteners) pull (bring pressure between) the Base Frame back against the Pontoon before (the straps/fasteners) in such a manner as to create a pressure (friction) is what enables the Pontoon and Frame to maintain their singular structure-ness.

FIG. 1 shows that Base Frame 1 (106) and Base Frame 2 (108) also have Leg Adjuster Options: Leg A Adjuster 123, Leg B Adjuster 124, Leg C Crossbeam Adjusters 126 and 128, Leg F Crossbeam Adjusters 166 and 168, Leg D Adjuster 163, and Leg E Adjuster 164. Each of these adjusters in this embodiment have five different Adjustment points: 1, 2, 3, 4, and 5. In an alternate variation, there may be dozens of different adjustment points or those points might be variable, allowing for hundreds of different adjustment point options. All Adjusters ((Leg A Adjuster 123, Leg B Adjuster 124, Leg C Crossbeam Adjuster 126/128, Leg F Crossbeam Adjuster 166/168, Leg D Adjuster 163, and Leg E Adjuster 164)) have Adjustment point options that relate to the location point where the legs connect to the Base Frame 106 or 108 frame in terms of their relation to the middle of the pontoon. The purpose of these Adjustment Points is to allow for a variety of affixation points which in turn correspond with creating different angles of Leg C 116 or Leg F 156, which in turn correspond with creating different specific location points for Suspension Points A 120 and Suspension Point B 160, which directly alter the suspension location of Hammock 144, and that suspension location determines the concave-ness of the hammock or hammocks, depending on if the variation is with a single hammock or more hammocks. FIG. 1 does not show details of the connections between Base Frames and the Legs or Crossbeams because may variations are possible. FIGS. 8A, 8B, 8C and 8D illustrate one implementation and FIGS. 26B, 27B, 28B and 29B illustrate another.

Leg A (114) and Leg B (112) are rigidly connected to each other so that when they connect to their respective Base Frames at locations Leg Adjuster A 123 and Leg Adjuster B 124 they should both be connected at the same Leg Adjuster Point. For example, If Leg A is attached at Leg A Adjuster Point #2, then Leg B should be attached to Leg B Adjuster Point #2 on Base Frame #2. The same is true of Leg C Crossbeam Adjusters 126 and 128: if Leg C Crossbeam Adjuster 126 is in Leg C Crossbeam Adjuster Point #3 (e.g.) then Leg C Crossbeam Adjuster 128 should be in Leg C Crossbeam Adjustment Point #3 as well. The same is true for Leg F Crossbeam Adjusters 166 and 168: they should both be connected to their respective Base Frame at the same Adjustment Point: e.g.: Leg F Crossbeam Adjustment Point #4. Likewise, Leg D Adjuster 163 and Leg E Adjuster 164 should attach to the same number adjustment point; example: Leg D Adjuster 163 connects to Base Frame #1 at Leg D Adjuster 163 Point #2 then Leg E Adjuster 164 should attach to Base Frame #2 at Leg E Adjuster Point 164 #2. This symmetry of Adjuster Point Locations between Leg A and Leg B and between Leg C Crossbeam Adjusters 126 and 128 and Leg F Crossbeam Adjuster, and between Leg F Crossbeam Adjusters 166 and 168, and between Leg D Adjuster 163 and Leg E Adjuster 164 is important in order to maintain the full structural benefits of the triangular design. The principles of geometry and mechanics illustrate the impressive strength of triangular structures (as evidenced by truss bridges and other infrastructure).

FIG. 1 Leg C Crossbeam 110 and Leg F Crossbeam 150 are the same length in order to ensure the parallel position relationship between Pontoon 1 102 and Pontoon 2 104. Pontoon 1 102 and Pontoon 2 104 are in parallel position in order to best facilitate smooth motion across the water; allow the water to pass by with the least amount of friction.

FIG. 1 shows that the bottom location point of Leg A 114 at Leg A Adjuster 123 is adjustable and that the bottom location point of Leg B 112 at Leg B Adjuster 124 is adjustable and that the Bottom Location point of Leg C 116 at the Mid section of Leg C Crossbeam 110 is adjustable. Further, Junction Z 122 allows for Leg C 116 to attach to it (Junction Z 122) at a variety of location points found at Leg C Connection Points 130. The angle of Leg C 116 and Leg C Extension 118 is determined by the combination of location point options at three different spots: Spot 1, The Leg Adjustment Points of Legs A and Leg B, Spot 2, the Leg Adjustment Points of Leg C Crossbeam Adjusters 126 and 128, and Spot 3, Junction Z 122 where Leg C connection Point 130 connection with Junction Z. The combination of these three spots leads to a multiplicity of possible angles. In an alternate variation, there may be more adjustment positions, allowing for more combinations, and more angles.

FIG. 1 shows that the height of Suspension Point A 120 is determined by adjusting the position of Leg C Extension 118 in relation to Leg C 116. In this embodiment Leg C Extension 118 fits into Leg C 116 and is attached to it at Junction Z via Leg C Connection point 130. Leg C Extension 118 telescopes into Leg C 116 and can be affixed at a variety of positions determining a variety of heights of Suspension Point A, 120. In an alternate variation Leg C 116 and Leg C Extension 118 may be fixed in relation to each other by means other than one fitting into the other.

FIG. 1 shows that the height of Suspension Point B, 160 is determined by adjusting the position of Leg F Extension 158 in relation to Leg F 156. In this embodiment Leg F Extension 158 fits into Leg F 156 and is attached to it at Junction Y 162 via Leg F Connection point 170. Leg Extension F 158 telescopes into Leg F 156 and can be affixed at a variety of positions, determining a variety of heights for Suspension Point B, 160. In an alternate variation Leg F 156 and Leg C Extension 158 may be fixed in relation to each other by means other than one fitting into the other.

FIG. 1 shows that the adjustable nature of the position of Suspension Point A in relation to Suspension Point B allows for a great variety of positions for a user to place himself or herself in. By adjusting the height of Suspension Point A 120 and Suspension Point B 160 the user can position himself or herself in the way that is most comfortable and safe according to their desire at the time. A higher and more concave positioning of the hammock 144 allows for the user to be seated in a higher-up and more upright sitting position, allowing for greater visibility while maneuvering the floating hammock vessel.

The downward pressure exerted on the floating hammock vessel by the weight of the user or users is distributed through suspension point A 120 and Suspension Point 160. Suspension Point A 120 and Suspension Point 160 are both equally distant from both pontoons 102 and 104, thus ensuring that the downward weight is evenly distributed between the pontoons in the case that the user is not swinging.

The floating hammock vessel is designed to have a low center of gravity which makes it extremely difficult to flip the vessel under normal use. Normal use includes swinging in the hammock 144.

The center of gravity is determined by the average height above the water of the total of mass of the vessel and its user or users.

The majority of the vessel's weight is comprised of Pontoons 102 and 104, Base Frame 1 106 and Base Frame 2 108, Leg C Crossbeam 110 and Leg F Crossbeam 150, and those parts (making up the majority of the weight) are between 12 and 24 inches above the water surface. The remaining weight of the vessel is higher in altitude, but the higher it goes, the less the weight present at any given height. The fact that more than half the vessel's weight is close to the water surface makes for a very low center of gravity of the vessel. Combine this with the stance of the vessel's design—the distance separating the pontoons 102 and 104—and this design makes for a vessel that is very hard to tip.

The distance between Pontoon 1 102 and Pontoon 2 104 is such that when hammock 144 swings out transversally toward either Pontoon 1 102 or Pontoon 2 104, hammock 144 does not pass beyond the outer edge of either pontoon, thus making it highly unlikely that the floating hammock vessel could tip laterally. The users position between Suspension Points A (120) and Suspension Point B (160), combined by the fact that Pontoons 1 and 2 extend lengthwise further out from the middle point than the user, means that the floating hammock vessel is unlikely to be able to tip in a lengthwise manner.

The strength of the triangular nature of the support system supporting Suspension Point A 120 and Suspension point 160 is such that those Suspension points may always be equidistant from Pontoon A 102 and Pontoon 104. This fact, combined by the low-center of gravity of the vessel, makes it very stable.

The materials used may be steel, carbon fiber, aluminum, aluminum alloys, or other suitable strong materials that will not break while the vessel is in use.

The volume of air in (or the buoyancy of) the pontoons is such that the vessel will have sufficient buoyancy to carry the weight of a user or users up to 600 pounds.

Figure 2:
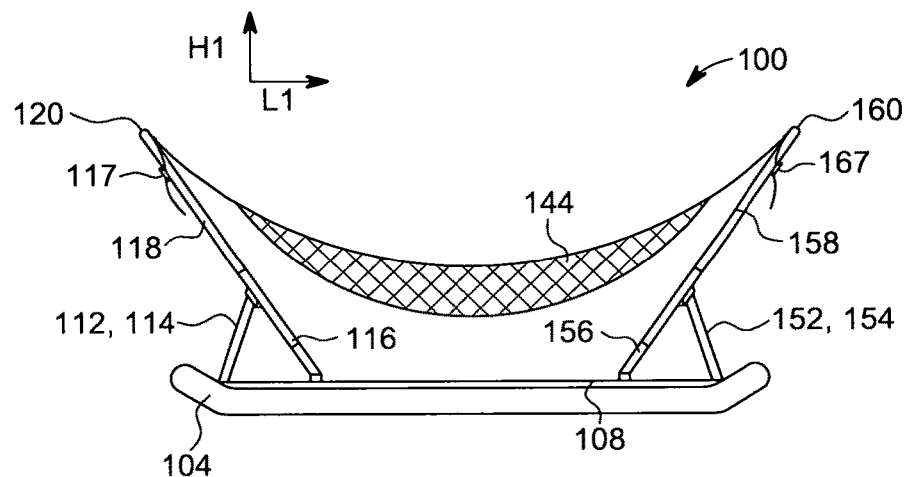
FIG. 2 is a side view of the floating hammock vessel shown in FIG. 1, according to an aspect of this disclosure.

FIG. 2 shows a side view perspective which clarifies that the position of a user in Hammock 144 is such that he or she will always have his or her weight more or less in the center of the vessel in terms of front to back, lengthwise, thus making it extremely difficult to tip the vessel lengthwise. Note the Fastening Points, 117 and 167, on the outside of Leg Extensions C and F, 118 and 158, which allow for securing the hammock, 144.

Figure 3:
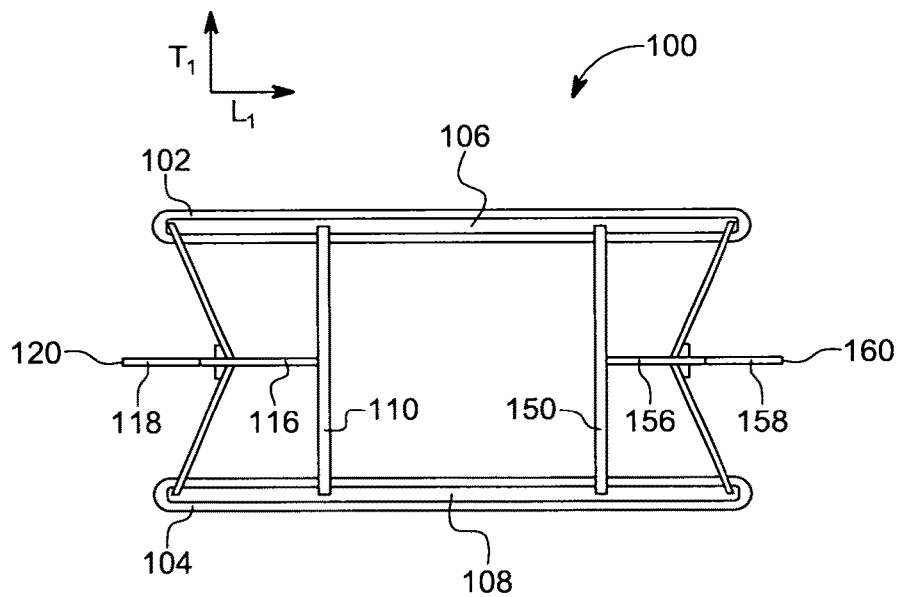
FIG. 3 is a top view of the floating hammock vessel shown in FIG. 1, according to an aspect of this disclosure.

FIG. 3 shows that in this embodiment Suspension Point A 120 and Suspension Point B 160 are equidistant to Pontoons 102 and 104, making it extremely difficult to tip the vessel laterally. FIG. 3 also shows the parallel nature of Pontoons 102 and 104 with respect to each other. This allows for the smoothest passage through and across the water.

Figure 4A:
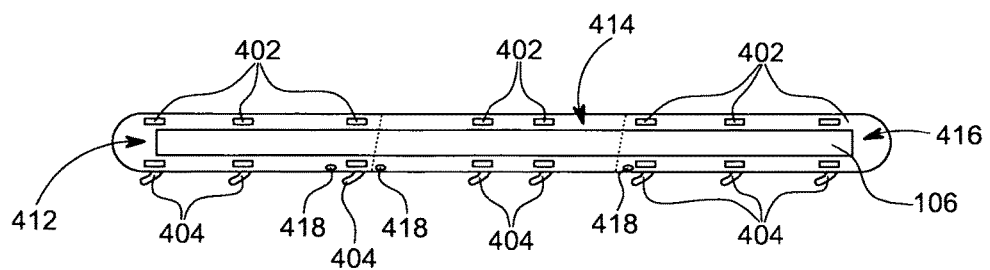
FIG. 4A is a top view of a pontoon portion of the floating hammock vessel shown in FIG. 1, according to an aspect of this disclosure.

FIGS. 4A thru 4F show variations of the type of pontoon which could make up Pontoon 1 102 and Pontoon 104. FIG. 4A shows a variation in which Pontoon 1 102 and Pontoon 104 may be inflatable with three different sections (Section 1 412, Section 2 414, and Section 3 416) each containing its own separate inflatable bladder and bladder valve (418). In an alternate variation there may be a greater or fewer number of sections and greater or fewer number of bladders and valves. Multiple bladders and multiple inflatable pontoon sections allow for more security in case of a puncture. If one bladder is punctured, the remaining bladders will continue to float and should be sufficient to allow use the vessel to continue. The inflatable pontoon variation has the further benefit of being light and collapsible, thus making it easier to transport. The inflatable pontoon variation could be constructed of various materials (such as hypalon, urethane, PVC or other material) with strength and durability being the main qualities desired. Inflatable bladders are used in rafts for white water rafting in very rough rivers and they do very well, generally speaking. The inflatable pontoons may be made of similar materials or of the same materials.

FIG. 4A shows a variation in which the Base Frame 1 106 and Base Frame 2 108 are fastened to the pontoon by means of straps 404 passing over or through the Base Frame 106, 108, then through the Strap Receiving Loop 402 before returning to and fastening to itself with a fastening device such as Velcro or other method.

Figure 4B:
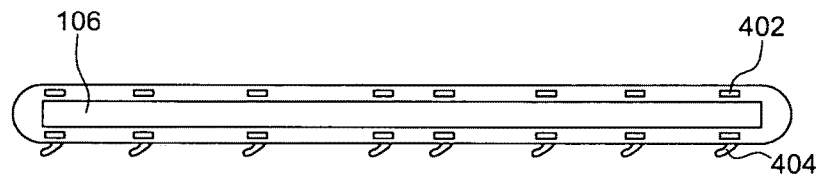
FIG. 4B is a top view of a pontoon portion of the floating hammock vessel shown in FIG. 1, according to an aspect of this disclosure.

FIG. 4B shows a variation in which the pontoon 102 and 104 may be of a single solid material. This variation also shows that the Base Frame 1 106 and Base Frame 2 108 are fastened to the pontoon by means of straps 404 passing over or through the Base Frame 106, 108, then through the Strap Receiving Loop 402 before returning to and fastening to itself with a fastening device such as Velcro or other method.

Figure 4C:
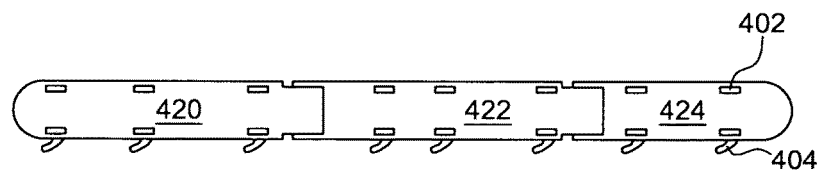
FIG. 4C is a top view of a pontoon portion of the floating hammock vessel shown in FIG. 1, according to an aspect of this disclosure.

FIG. 4C shows a variation in which Pontoons 1 102 and Pontoon 2 104 may be made of a three-section solid pontoon in which Section 1 420, Section 2 422, and Section 3 424 fit together nicely and are all connected to Base Frame 106 and Base Frame 108 by means of the straps 404 and Strap Receiving Loops 402 shown in FIG. 4C. In this variation the three sectioned pontoon allows for easier transportability.

Figure 4D:
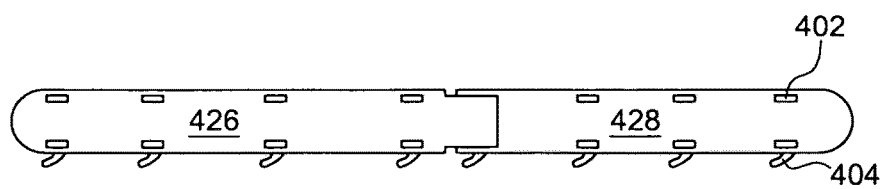
FIG. 4D is a top view of a pontoon portion of the floating hammock vessel shown in FIG. 1, according to an aspect of this disclosure.

FIG. 4D shows a variation in which Pontoon 1 102 and Pontoon 2 104 may be made of two sections of solid pontoon in which Section 426 and Section 428 fit together and are each connected to Base Frame 106 and Base Frame 108 by means of straps 404 and Strap Receiving Loops 402.

Figure 4E:
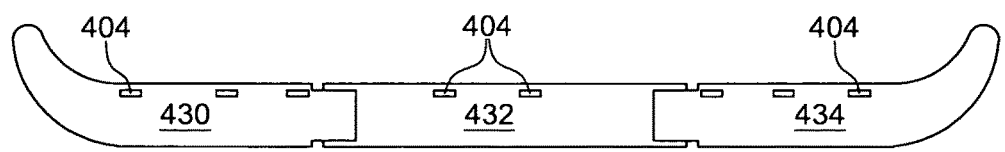
FIG. 4E is a side view of a pontoon portion of the floating hammock vessel shown in FIG. 1, according to an aspect of this disclosure.

FIG. 4E shows a side view of a variation in which Pontoon 1 102 and Pontoon 104 may be solid and have curved ends to help better cut through the water. In FIG. 4E this variation shows a three section variation of such a pontoon, with sections 1 (430), 2 (432) and 3 (434). In this variation the pontoon attaches to the Base Frames 106 and 108 as it does in FIG. 4D.

Figure 4F:
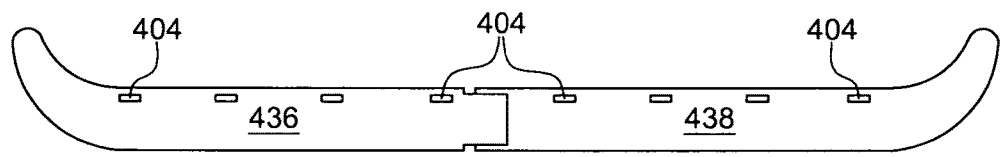
FIG. 4F is a side view of a pontoon portion of the floating hammock vessel shown in FIG. 1, according to an aspect of this disclosure.

FIG. 4F shows a side view of a variation in which Pontoon 1 102 and Pontoon 104 may be solid and have curved ends to help better cut through the water. In FIG. 4E this variation shows a two section variation of such a pontoon, with sections 1 (436) and 2 (438). In this variation the pontoon attaches to the Base Frames 106 and 108 as it does in FIG. 4D.

Figure 5A:
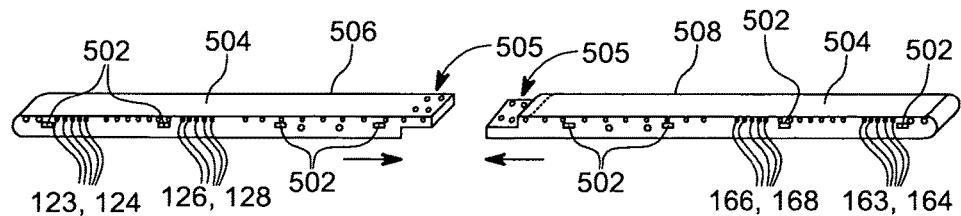
FIG. 5A is a perspective view of a base frame portion of the floating hammock vessel shown in FIG. 1, according to an aspect of this disclosure.
Figure 5B:
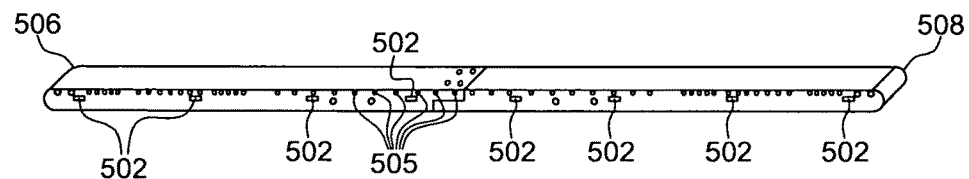
FIG. 5B is a perspective view of a base frame portion of the floating hammock vessel shown in FIG. 1, according to an aspect of this disclosure.
Figure 5C:
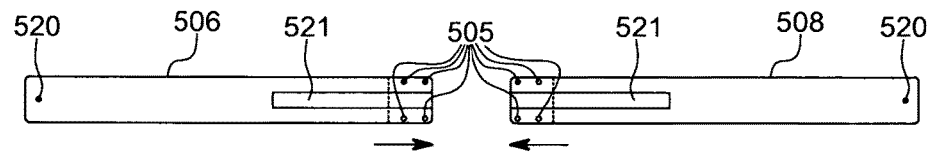
FIG. 5C is a top view of the bottom side of a base frame portion of the floating hammock vessel shown in FIG. 1, according to an aspect of this disclosure.
Figure 5D:
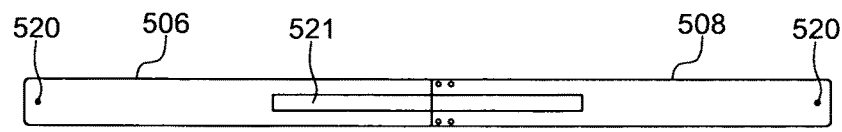
FIG. 5D is a top view of the bottom side of a base frame portion of the floating hammock vessel shown in FIG. 1, according to an aspect of this disclosure.
Figure 5E:
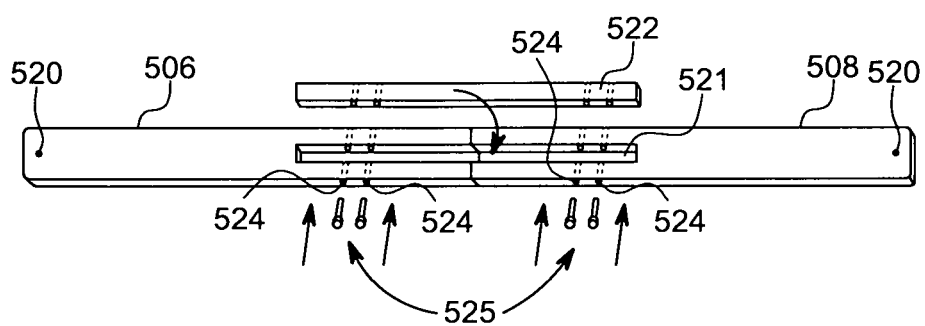
FIG. 5E is a top view of the bottom side of a base frame portion of the floating hammock vessel shown in FIG. 1, according to an aspect of this disclosure.
Figure 5F:
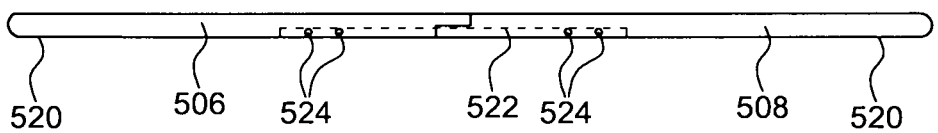
FIG. 5F is a side view of a base frame portion of the floating hammock vessel shown in FIG. 1, according to an aspect of this disclosure.

FIG. 5A shows a variation in which each of Base Frame 1 106 and Base Frame 108 is comprised of two sections Base Frame Section 1 506 and Base Frame Section 2 508, in such a manner that the two sections are connected together by means of connecting Members 525 (not shown) passing through Connector Holes 505 and thereby fastening the sections to each other. FIG. 5A further shows a variation in which the adjustment points 123, 124, 126, 128, 166, 168, 163, 164 are holes that pass through the base frame. The Strap holes 502 are holes that pass through the base frame allowing for a strap to pass from one side to the other, thereby allowing the base frame to be fastened to a pontoon onto which one part of the strap is affixed by adhesive or other means. FIG. 5A shows the two sections Base Frame Section 1 506 and Base Frame 2 508 physically apart from each other, but with arrows showing how they come together. FIG. 5B shows a variation in which the two Base Frame Sections 506 and 508 come together in such a way that the connector holes 505 from the Base Frame Top Side 504 align allowing for Connector Members 525 (not shown) to pass through, allowing for the pieces to be attached to each other. FIGS. 5C and 5D show a variation in which the bottom side of the Base Frames 106 and 108 have a connector Bar Receiving Canal 521 into which fits a Connector Bar 522 which is comprised of a strong material that cannot be bent under normal usage. The Connector Bar 522 may be fastened in place by the use of Connector Members 525 (that may be bolts and nuts and washers and pressure washers or other fastening devices) that pass through Connector Bar Connection Holes 524 as shown in FIGS. 5E and 5F. This Connector Bar extends significantly into both Base Frame Section 1 506 and Base Frame Section 2 508, thus providing a support that prevents the two sections from bending or hinging in the middle.

The combination of the Connectors 505 through both Base Frame Sections 506 and 508 and the Connector Bar 522 fitting snugly in place, passing across the union of both Base Frame Sections and with this Connector Bar being secured in place by the Connector Members 525 passing through the Connector Bar Connection holes 524 allows for the two Base Frame Sections 506 and 508 to be fastened securely to each other in such a manner that they act as if they were one unit.

Figure 6A:
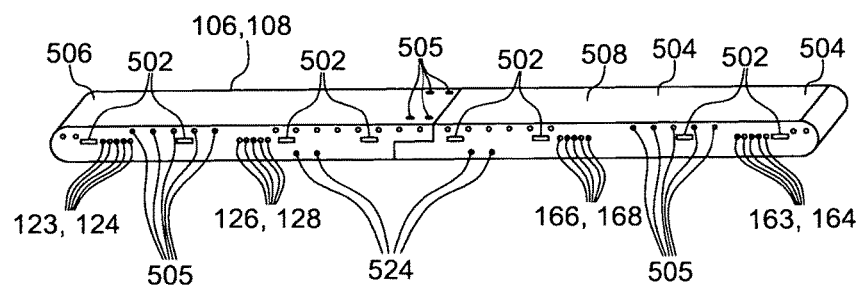
FIG. 6A is a perspective view of a base frame portion of the floating hammock vessel shown in FIG. 1, according to an aspect of this disclosure.

FIG. 6A shows a variation in which Base Frames 106, 108 are connected together by one of the methods described in the previous paragraph. FIG. 6A also shows multiple connector holes 505 into which can be attached various attachments such as Deck Flooring Sections 1904 (FIG. 19), Yoga Deck Flooring Sections 2102 (FIG. 21), Base Frame Attachment with Cup Holder 2604 (FIG. 26), Base Frame Attachment with Fishing Pole Holder 2704 (FIG. 27), Base Frame Attachment with Table/Desktop 2804 (FIG. 28), Base Frame Attachment with Fan 2904 (FIG. 29), or other attachments.

FIG. 6A further shows a variation in which the adjustment points 123, 124, 126, 128, 166, 168, 163, 164 are positioned to receive the connecting points of Leg A Adjuster 123, Leg B Adjuster 124, Leg C Crossbeam Adjuster 126, 128, Leg D Adjuster 163, Leg E Adjuster 164, and Leg F Crossbeam Adjusters 166 and 168, as shown in FIGS. 8A, 8B, 8C, and 8D.

FIG. 6A shows a variation in which the Base Frame Top Side 504 (which represents Base Frame 1 106 and Base Frame 2 108) is a single smooth surface without any obstacles. This design allows for this Base Frame to be used as a step or a floor spot, without having anything there to trip on, or catch anything on.

Figure 6B:
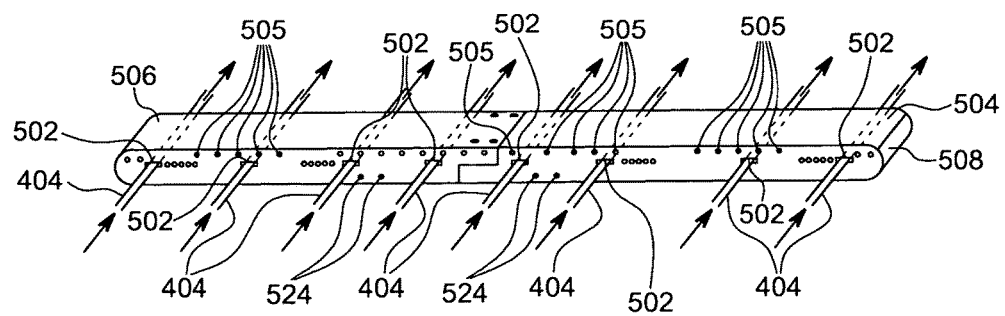
FIG. 6B is a perspective view of a base frame portion of the floating hammock vessel shown in FIG. 1, according to an aspect of this disclosure.

FIG. 6B shows a variation in which the straps 404 coming from the Pontoon 102 and 104 pass through the Base Frame 106,108 at the Strap Hole 502 locations. In this variation the eight Strap Hole 502 locations for each of Base Frame 106, 108 allows for multiple connection points between the pontoon and the Base Frame. The multiple locations help create a tight fastening system. The multiple locations also create a functional redundancy with allows for greater security—because if any one given Strap 404 breaks, there are still another seven straps holding the Base Frame 106, 108 to the Pontoon 102,104.

Figure 7A:
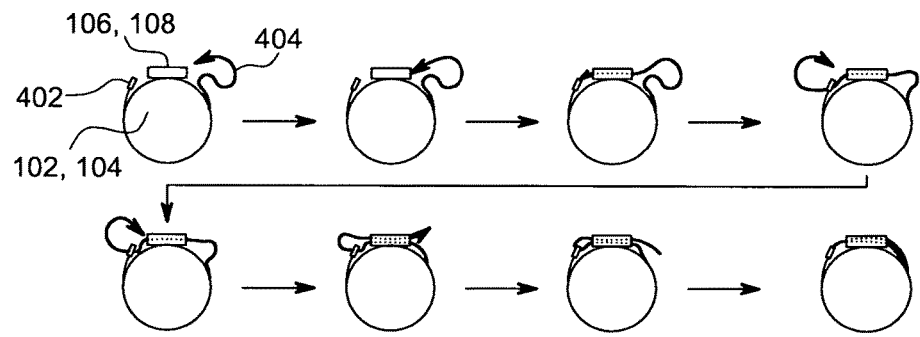
FIG. 7A is a heads-on cross-sectional view of a pontoon and base frame portion of the floating hammock vessel shown in FIG. 1, according to an aspect of this disclosure.
Figure 7B:
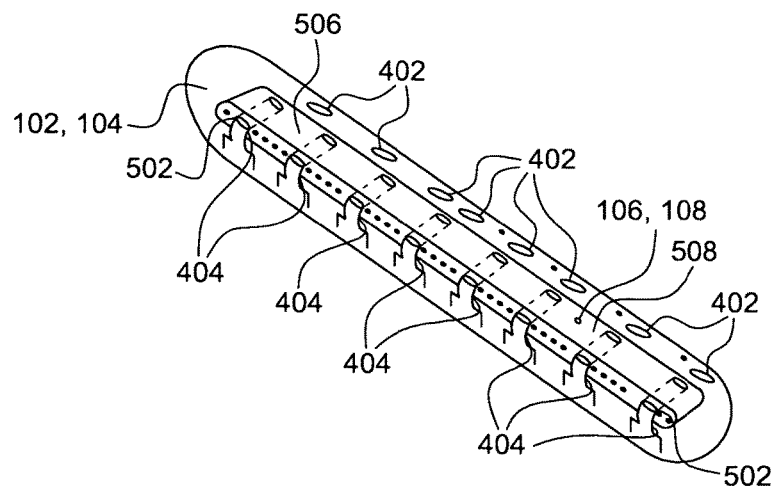
FIG. 7B is a perspective view of a pontoon and base frame portion of the floating hammock vessel shown in FIG. 1, according to an aspect of this disclosure.
Figure 7C:
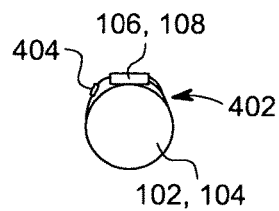
FIG. 7C is a heads-on cross-sectional view of a pontoon and base frame portion of the floating hammock vessel shown in FIG. 1, according to an aspect of this disclosure.

FIG. 7A Shows a variation in which a cross section of a pontoon is shown in order to demonstrate how the Strap 404 originating-from and fixed-to one of the pontoons 102, 104 passes through one of the Base Frames 106, 108 and through the Strap Receiving Loop 402 before returning back into the Strap Hole 502 (FIG. 6B or 7B) and back to the same side as the Strap's 404's fixed side of the Base Frame before attaching to itself by means of Velcro or other attaching method. FIG. 7B shows that in this variation there are eight different Straps 404 passing through eight separate Strap Holes 502 in each of Base Frame 106, 108 (as represented in this figure as the combination of Base Frame Section 1 506 and Base Frame Section 2 508). In an alternate variation there may be a greater or lesser number of Straps 404 fastening the Base Frame to the Pontoon. FIG. 7C shows the final configuration after the connections shown in FIG. 7A are completed.

Figure 8A:
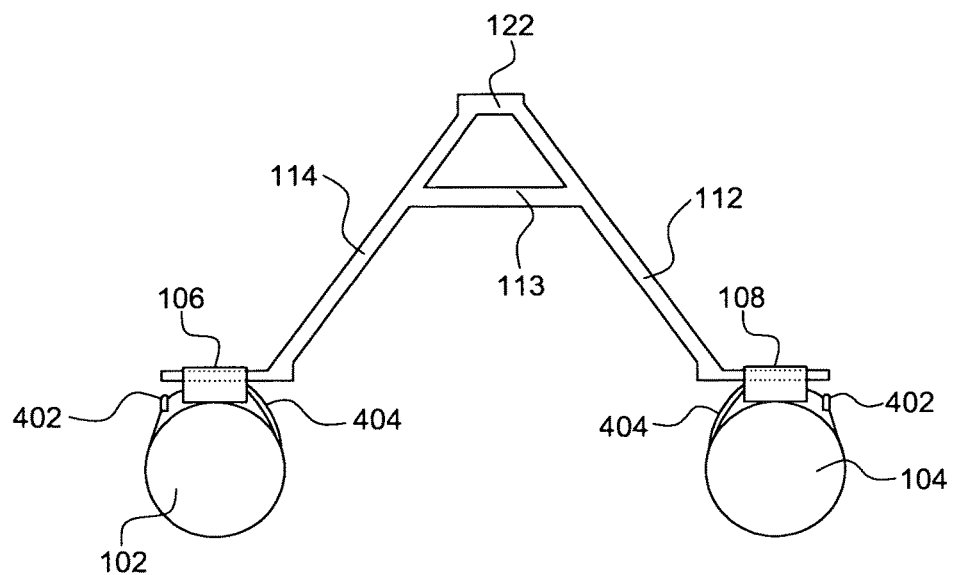
FIG. 8A is a heads-on cross-sectional view of a pontoon and frame portion of the floating hammock vessel shown in FIG. 1, according to an aspect of this disclosure.
Figure 8B:
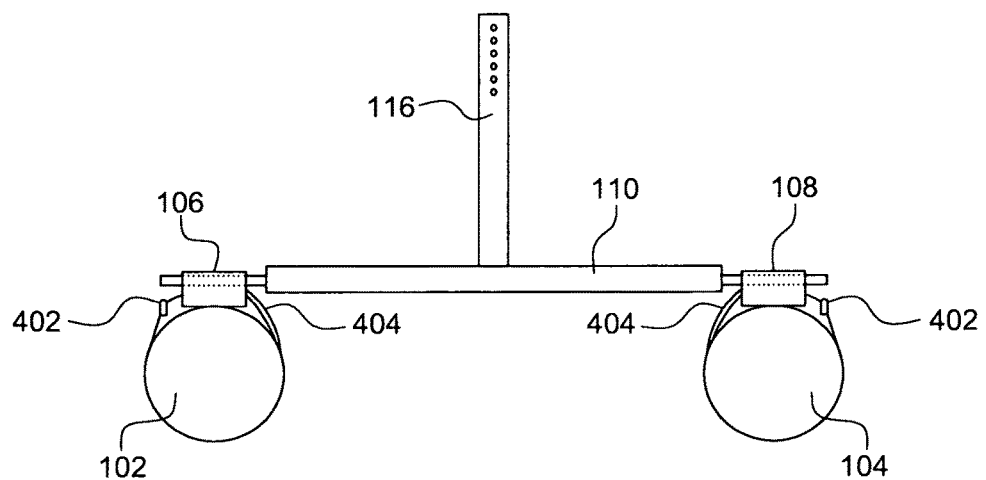
FIG. 8B is a heads-on cross-sectional view of a pontoon and frame portion of the floating hammock vessel shown in FIG. 1, according to an aspect of this disclosure.
Figure 8C:
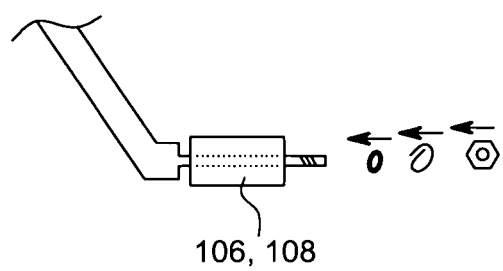
FIG. 8C is a heads-on cross-sectional view of a pontoon and frame portion of the floating hammock vessel shown in FIG. 1, according to an aspect of this disclosure.
Figure 8D:
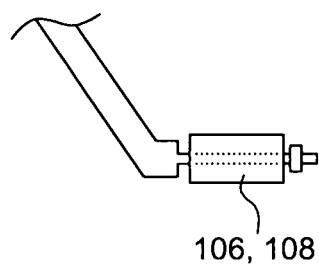
FIG. 8D is a heads-on cross-sectional view of a pontoon and frame portion of the floating hammock vessel shown in FIG. 1, according to an aspect of this disclosure.

FIG. 8A illustrates a variation in which the lower parts of Legs A 114 and B 112 are attached to the Base Frames 106 and 108 by connecting through the Adjustment points 124, 123 (shown in FIG. 5A). FIG. 8B illustrates a similar method of attaching Leg C Crossbeam 110 using Adjustment points 126, 128. The same technique will be applied to Legs D and E and Leg F Crossbeam. FIGS. 8C and 8D illustrate one method of securing Legs and Crossbeams to the Base Frames.

Figure 9:
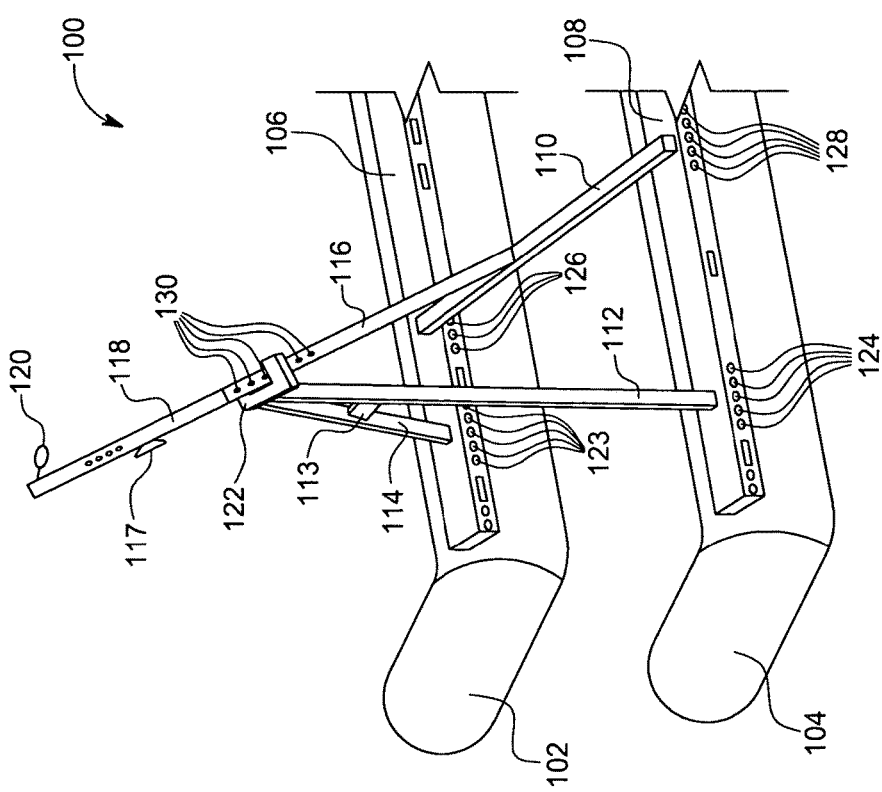
FIG. 9 is a perspective view of a portion of the floating hammock vessel shown in FIG. 1, according to an aspect of this disclosure.
Figure 12A:
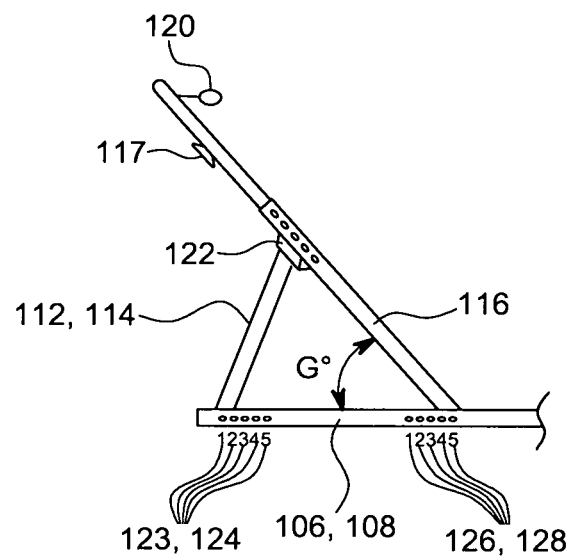
FIG. 12A is a side view of a portion of the floating hammock vessel shown in FIG. 1, according to an aspect of this disclosure.
Figure 12B:
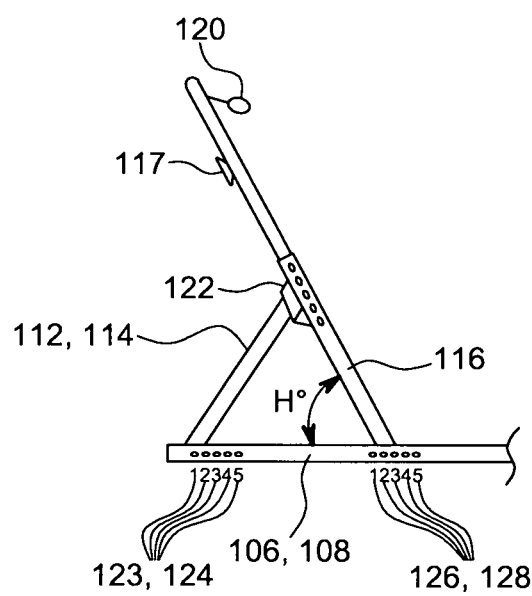
FIG. 12B is a side view of a portion of the floating hammock vessel shown in FIG. 1, according to an aspect of this disclosure.
Figure 12C:
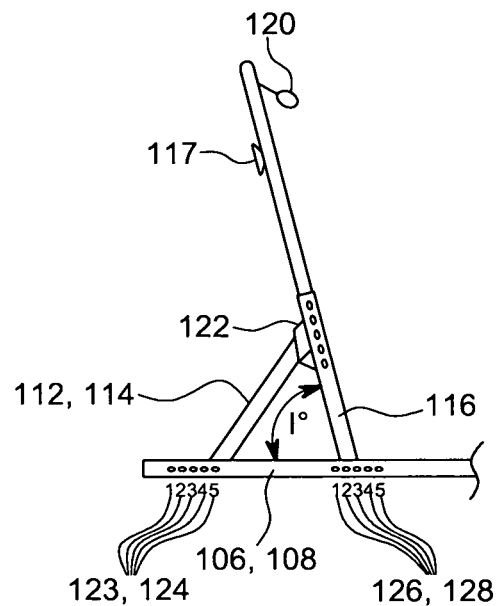
FIG. 12C is a side view of a portion of the floating hammock vessel shown in FIG. 1, according to an aspect of this disclosure.
Figure 13A:
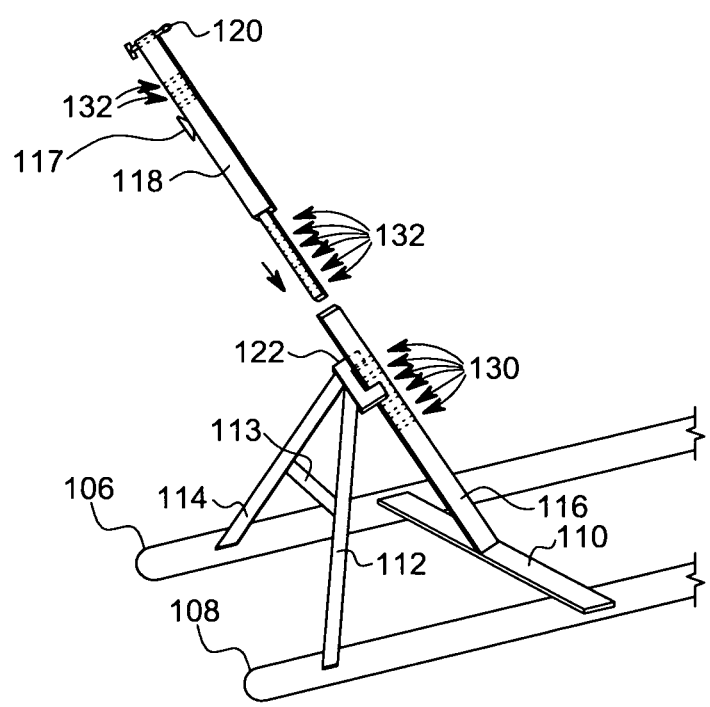
FIG. 13A is a perspective view of a portion of the floating hammock vessel shown in FIG. 1, according to an aspect of this disclosure.
Figure 13B:
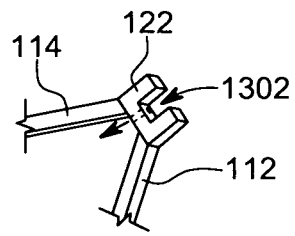
FIG. 13B is a perspective view of a portion of the floating hammock vessel shown in FIG. 1, according to an aspect of this disclosure.
Figure 13C:
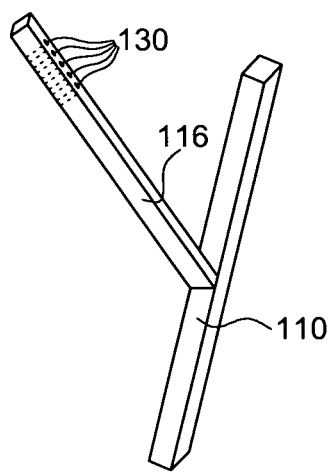
FIG. 13C is a perspective view of a portion of the floating hammock vessel shown in FIG. 1, according to an aspect of this disclosure.

FIG. 9 shows a variation in which the Leg C Connection Points 130 line up with Junction Z 122 and attach to it at the connection joint seen in FIG. 13B. FIG. 9 also shows a variation in which the Adjustment Points 123, 124, 126, 128 may be used to alter the spacing between Legs A and B and Leg C Crossbeam. (more detail in FIGS. 10,11 and 12).

Figure 10A:
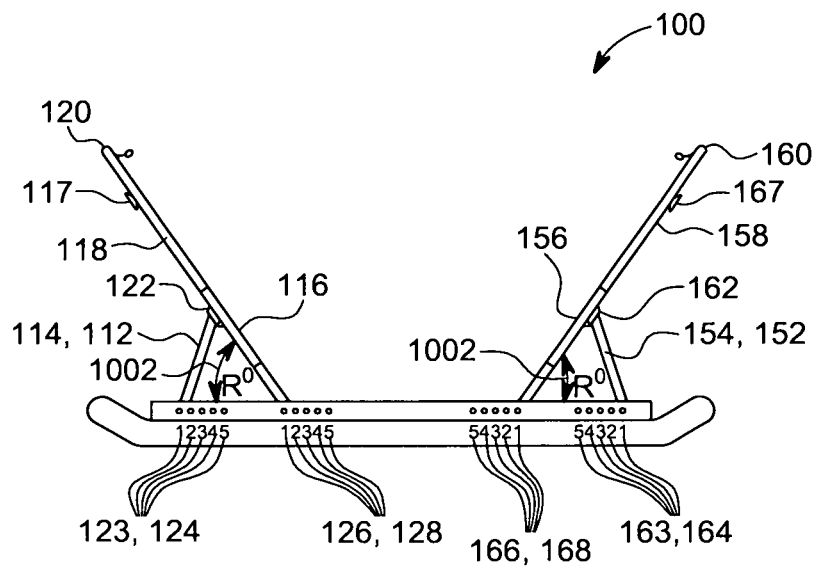
FIG. 10A is a side view of the floating hammock vessel shown in FIG. 1, according to an aspect of this disclosure.
Figure 10B:
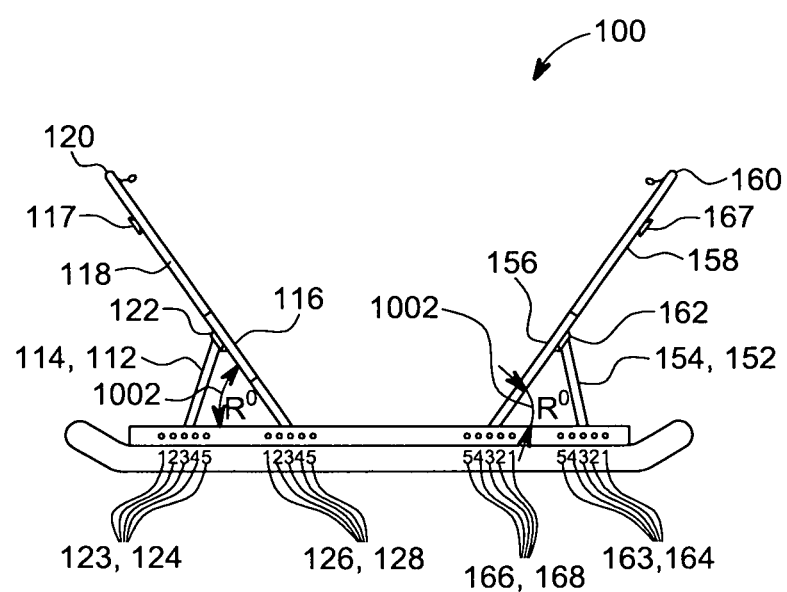
FIG. 10B is a side view of the floating hammock vessel shown in FIG. 1, according to an aspect of this disclosure.
Figure 10C:
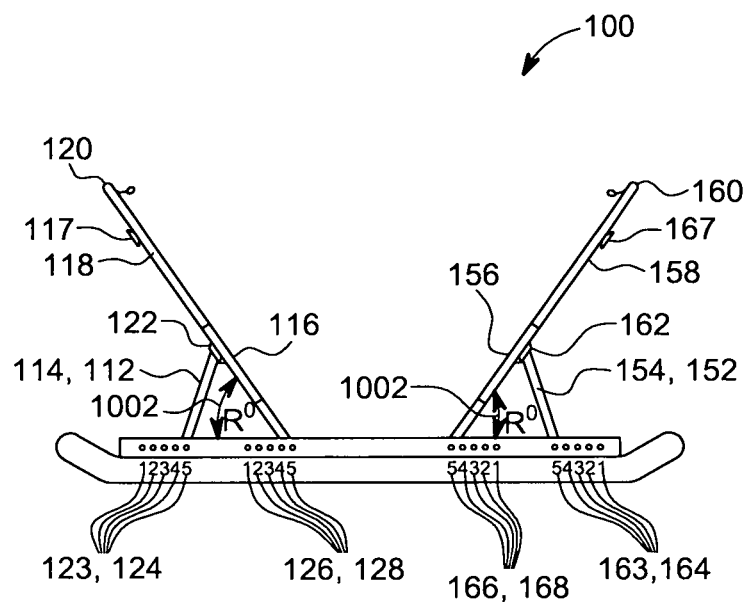
FIG. 10C is a side view of the floating hammock vessel shown in FIG. 1, according to an aspect of this disclosure.

FIGS. 10A, 10B, and 10C show variations in which the angle R (between a baseplate and a main support leg) is the same for Legs C 116 and F 156, but in which the locations of Crossbeam C 110 and Crossbeam F 150 vary. In FIG. 10A Crossbeams C 110 and F 150 are further apart than they are in FIG. 10C. Since the angles 1002 are identical in FIGS. 10A, 10B, and 10C, the Locations of the Crossbeams C 110 and F 150 correspond directly to the respective locations of Suspension Point A 120 and Suspension Point B 160. This illustrates the ability to move the Suspension Points 120 and 160 further apart or closer together and thus alter the shape (concavity) of the Hammock, 144, which supports the Melloship's user. In FIG. 10A the Suspension Points A 120 and B 160 are further apart and therefore the Hammock 144 (not shown) would be less concave (i.e. more flat) than it would be in FIG. 10C.

Figure 11A:
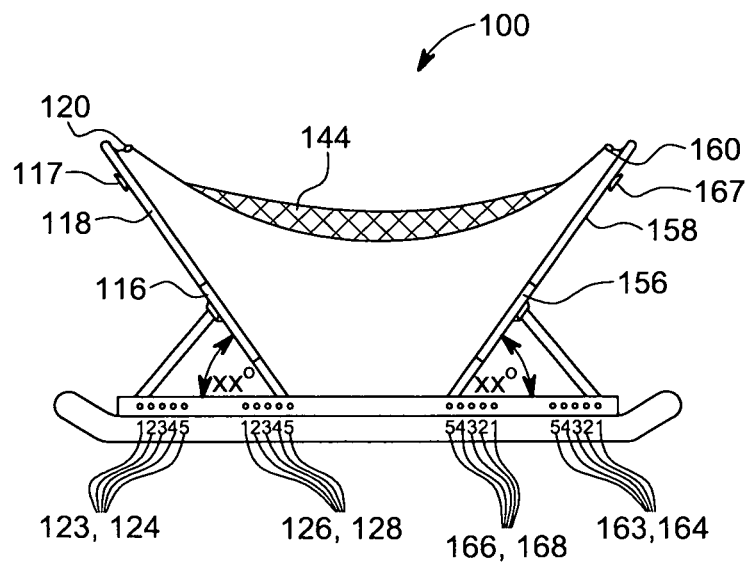
FIG. 11A is a side view of the floating hammock vessel shown in FIG. 1, according to an aspect of this disclosure.
Figure 11B:
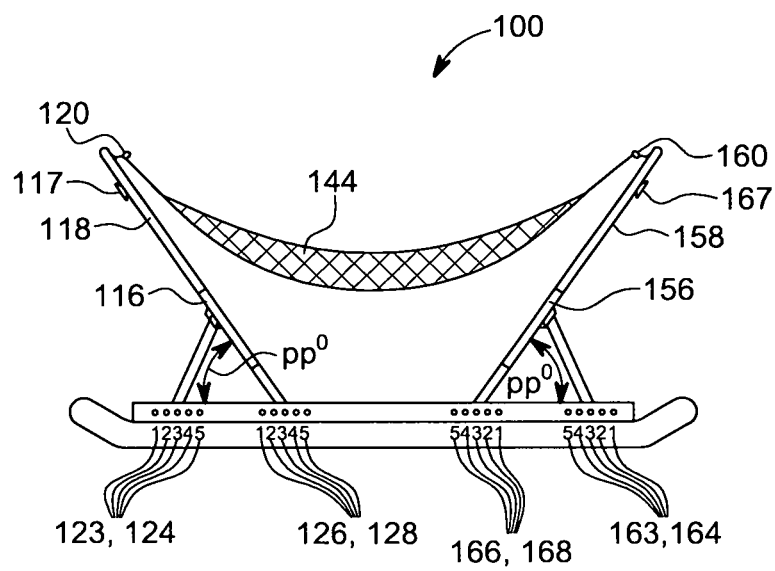
FIG. 11B is a side view of the floating hammock vessel shown in FIG. 1, according to an aspect of this disclosure.
Figure 11C:
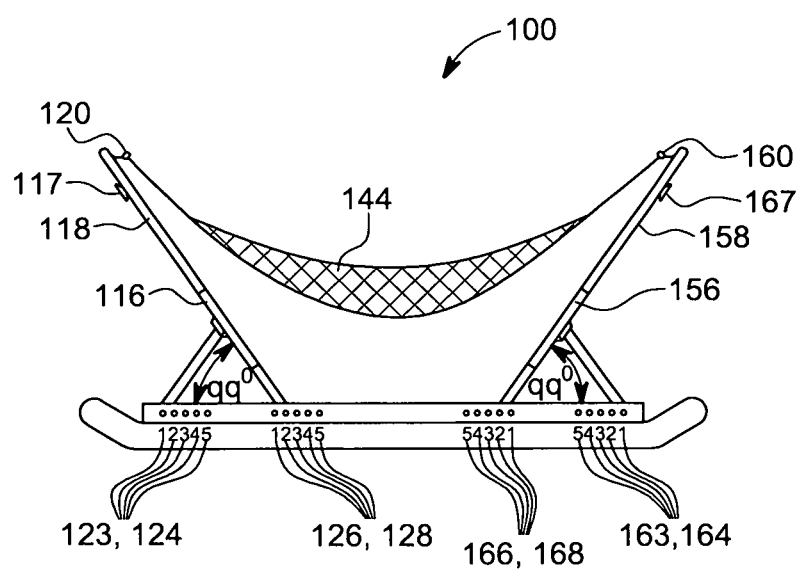
FIG. 11C is a side view of the floating hammock vessel shown in FIG. 1, according to an aspect of this disclosure.

FIGS. 11A, 11B, and 11C show how choosing to use different adjustment points (123, 124, 126, 128, 166, 168, 163, 164) allows for a multiple of different angles, R, of Legs C 116 and F 156. Changing those angles will alter the concavity of the hammock's shape.

FIGS. 12A, 12B, and 12C show a different view of the specific location of the connecting points of the legs Adjusters 123, 124, 126, 128, clarifying how they alter the angle between the BasePlate and Leg C 116 and therefore the location of Suspension Point A 120

FIG. 13A shows how the Leg C Connection Point 130 can be adjusted to connect with Junction Z Connection Joint 1302 (FIG. 13B) in order to adjust the angle between the BasePlate and Leg C, 116. FIG. 13A further illustrates that the Leg C extension 118 can be raised or lowered in relation to Junction Z 122 and therefore make Suspension Point A either higher or lower.

FIGS. 10A, 10B, 10C, 11A, 11B, 11C, 12A, 12B, 12C, and 13A show how the combination of 4 variables (1—position of Leg Adjusters A and B 123,124; 2—position of Leg C Crossbeam 110; 3—Leg C 130 Connection Point into Junction Z 122 at Connection Joint Z 1302—and 4—the height of Suspension Point A determined by Leg Extension C 118) allows the user to establish a great variety of positions in which to fix Suspension Points A 120 and Suspension Points B 160—which in turn allows the user to adjust the shape of the Hammock 144 to his/her desire.

Figure 14:
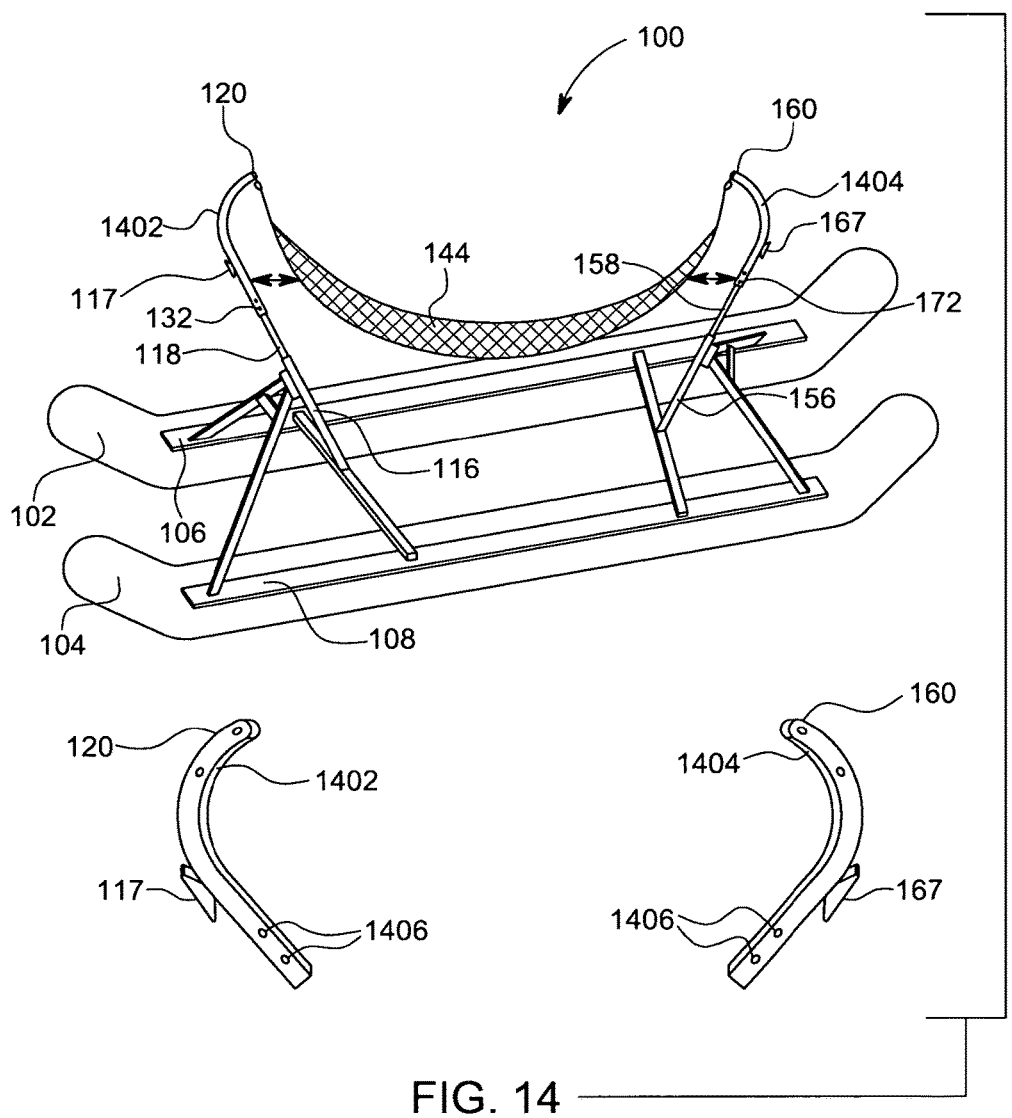
FIG. 14 is a perspective view of a variation of the floating hammock vessel shown in FIG. 1, according to an aspect of this disclosure.

FIG. 14 shows a variation of the floating hammock vessel in which Curved Extension Attachments 1402 and 1404 fit over Leg C Extension 118 and Leg F Extension 158 and attaches to them at Leg C Extension Connector Point 132 and Leg F Extension Connector Point 172 and attaches to each by means of Connector Members 525 (not shown) or other fastening mechanisms at Leg C Extension Connector Points 132 and Leg F Extension Connector Points 172. In an alternate version this Curved Extensions 1402 and 1404 could attach to Leg C Extension 118 and Leg F Extension 158 by sliding into Leg C Extension 118 and Leg F Extension 158 and then being fastened via Connector Members 525 or other fastening devices. The Curved Extension 1402 attachment has a Suspension Point A 120 from which to suspend the Hammock 144 and a Suspension Point B 160 from which to suspend the opposite end of Hammock 144. The Curved Extension 1402 attachment creates more space between the user positioned in Hammock 144 and the Legs C 118 and F 158. By having more space between the user and this supporting legs, it is less likely that the user will ever come in contact with Legs C 118 and Leg F 158. The Curved Extension 1402 attachment further provides a different aesthetic visual appeal—offer a more curved and softer visual sensation or interpretation compared to the non-curved version seen in FIG. 1.

Figure 15:
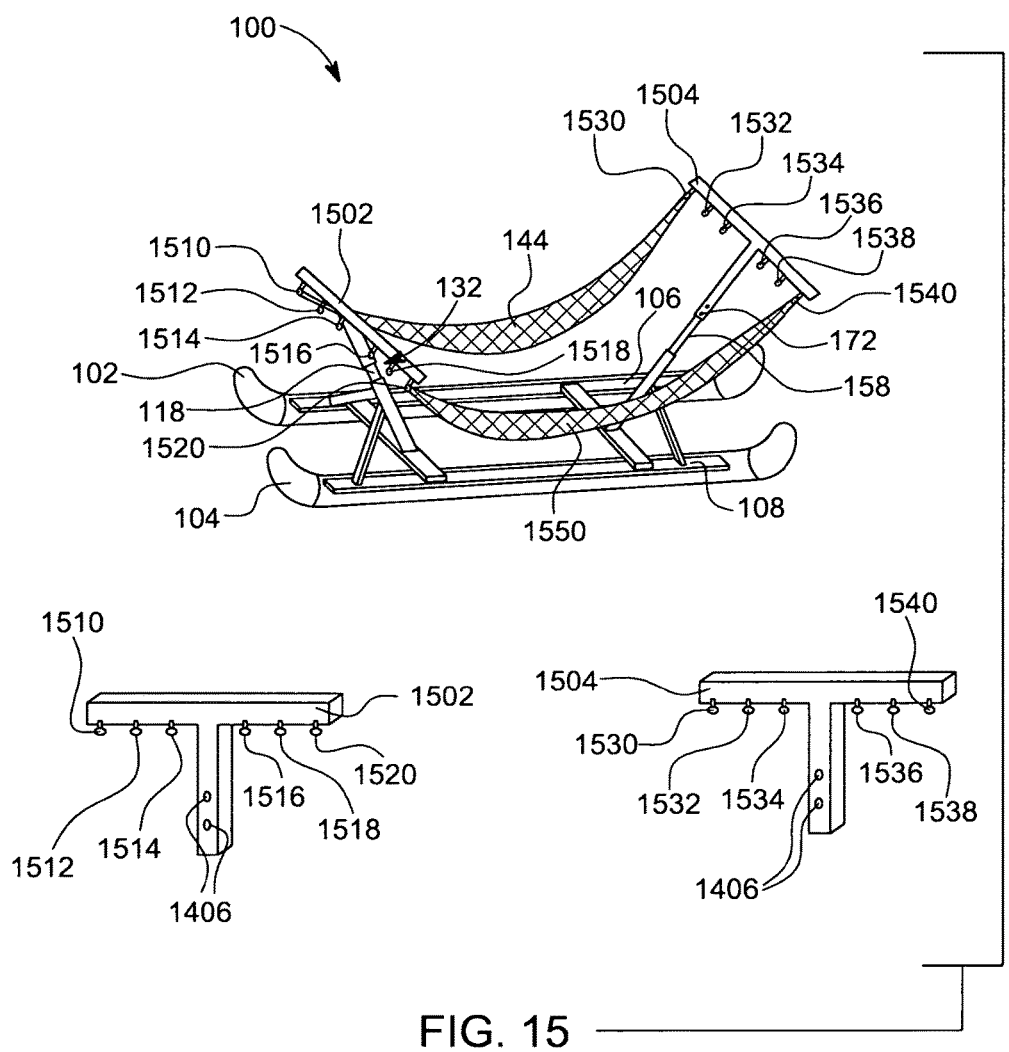
FIG. 15 is a perspective view of a variation of the floating hammock vessel shown in FIG. 1, according to an aspect of this disclosure.

FIG. 15 shows a variation of the floating hammock vessel in which a Doubles Extension Mechanism A attachment (1502) fits over Leg C Extension 118 and attaches to it at Leg C Extension Connector Point 132 by means of Connector Members 525 (not shown) or another fastening mechanism and in which Doubles Extension Mechanism B attachment (1504) fits over Leg F Extension 158 Leg F and attaches to it at Leg F Extension Connector Point 172 and attaches to each by means of Connector Members 525 or other fastening mechanisms. In an alternate version this Doubles Extension Mechanisms 1502 and 1504 may attach to their respective Leg C Extension 118 and Leg F Extension 158 by sliding into Leg C Extension 118 and Leg F Extension 158 and then being fastened via Connector Members 525 or other fastening devices. The Doubles Extension Mechanism 1502 has six distinct suspension points: Suspension Point 1510, Suspension Point 1512, Suspension Point 1514, Suspension Point 1516, Suspension Point 1518, and Suspension Point 1520 from which to suspend one end of Hammock 144 and one end of Hammock #2 1550. Similarly, Doubles Extension Mechanism 1504 has six distinct suspension points: Suspension Point 1530, Suspension Point 1532, Suspension Point 1534, Suspension Point 1536, Suspension Point 1538, and Suspension Point 1540 from which to suspend one end of Hammock 144 and one end of Hammock #2 1550. As shown in FIG. 15 Suspension Points 1510, 1520, 1530, and 1540 are all the same distance away from the center point of the top horizontal part of the Doubles Extension Mechanism 1502 and 1504. Similarly, Suspension Points 1512, 1518, 1532, and 1538 are all the same distance away from the center point of the top horizontal part of the Doubles Extension Mechanism 1502 and 1504. Suspension Points 1514, 1516, 1534, and 1536 are also the same distance from the Melloship center-line. In this variation the variety of Suspension Points available from which to suspend the ends of Hammock 144 and Hammock #2 1550 are such that two different users can be using two different hammocks simultaneously and they can choose to set the distances between themselves (the users) by means of changing the Suspension Points of Doubles Extension Mechanism 1502 and 1504. If the two users are of similar weight, they may which to choose to use the "outer" Suspension Point Options of Suspension Points 1510, 1520 for one end respectively of Hammock 144 and Hammock #2 1550 and Suspension Points 1530 and 1540 for the other respective ends of Hammock 144 and Hammock #2 1550. In a hypothetical scenario in which User 1 weighed 100 pounds and User 2 weighed 200 pounds they may wish to position User 1's Hammock 144 further away from the center point of the top horizontal part of the Doubles Extension Mechanism 1502 and 1504 (such as suspended from Suspension Points AA 1510 and GG 1530) than User 2's Hammock #2 1550 (such as being suspended from Suspension Points DD 1516 and JJ 1536) in order to best balance Floating Hammock Vessel. The Doubles Extension Mechanism attachments 1502 and 1504 allow for the users to select the suspension point locations that work best for their desired goals—be those goals related to proximity of hammock 144 to Hammock #2 1550 or related to the desired weight distribution in the users, or both. Two-hammock versions of the Melloship may require more widely spaced pontoons for stability. This is easily achieved by changing the length of Legs C and F Crossbeams (110, 150) and the Cross Legs supporters 113 and 153.

Figure 16:
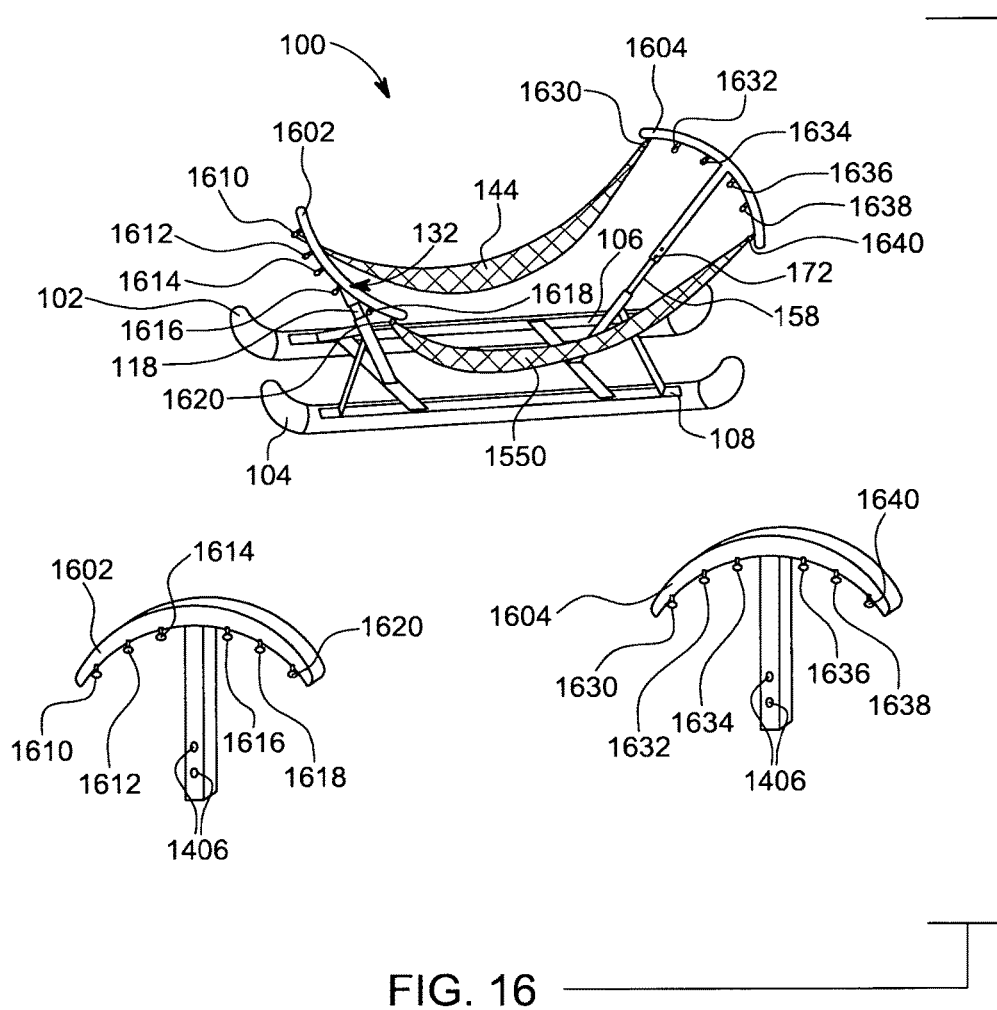
FIG. 16 is a perspective view of a variation of the floating hammock vessel shown in FIG. 1, according to an aspect of this disclosure.

FIG. 16 shows a variation of the floating hammock vessel in which a Curved Doubles Extension Mechanism 1602 attachment fits over Leg C Extension 118 and attaches to it at Leg C Extension Connector Point 132 by means of Connector Members 525 or another fastening mechanism and in which Doubles Extension Mechanism 1604 attachment fits over Leg F Extension 158 Leg F and attaches to it at Leg F Extension Connector Point 172 and attaches to each by means of Connector Members 525 or other fastening mechanisms. In an alternate version this Curved Doubles Extension Mechanism 1602 and 1604 may attach to their respective Leg C Extension 118 and Leg F Extension 158 by sliding into Leg C Extension 118 and Leg F Extension 158 and then being fastened via Connector Members 525 or other fastening devices. The Curved Doubles Extension Mechanism 1602 has six distinct suspension points: Suspension Point 1610, Suspension Point 1612, Suspension Point 1614, Suspension Point 1616, Suspension Point 1618, and Suspension Point 1620 from which to suspend one end of Hammock 144 and one end of Hammock #2 1550. Similarly, Curved Doubles Extension Mechanism 1604 has six distinct suspension points: Suspension Point 1630, Suspension Point 1632, Suspension Point 1634, Suspension Point 1636, Suspension Point 1638, and Suspension Point 1640 from which to suspend one end of Hammock 144 and one end of Hammock #2 1550. As shown in FIG. 16 Suspension Points 1610, 1620, 1630, and 1640 are all the same distance away from the center point of the top horizontal part of the Curved Doubles Extension Mechanism 1602 and 1604. Similarly, Suspension Points 1612, 1618, 1632, and 1638 are all the same distance away from the center point of the top horizontal part of the Curved Doubles Extension Mechanism 1602 and 1604. And also Suspension Points 1614, 1616, 1634, and 1636 are the same distance from the center-line. In this variation the variety of Suspension Points available from which to suspend the ends of Hammock 144 and Hammock #2 1550 are such that two different users can be using two different hammocks simultaneously and they can choose to set the distances between themselves (the users) by means of changing the Suspension Points of Curved Doubles Extension Mechanism 1602 and 1604. If the two users are of similar weight, they may which to choose to use the "outer" Suspension Point Options of Suspension Points 1610, 1620 for one end respectively of Hammock 144 and Hammock #2 1550 and Suspension Points 1630 and 1640 for the other respective ends of Hammock 144 and Hammock #2 1550. In a hypothetical scenario in which User 1 weighed 100 pounds and User 2 weighed 200 pounds they may wish to position User 1's Hammock 144 further away from the center point of the top horizontal part of the Curved Doubles Extension Mechanism 1602 and 1604 (such as suspended from Suspension Points 1610 and 1630) than User 2's Hammock #2 1550 (such as being suspended from Suspension Points 1616 and 1636) in order to best balance Floating Hammock Vessel. The Curved Doubles Extension Mechanism attachments 1602 and 1604 allow for the users to select the suspension point locations that work best for their desired goals—be those goals related to proximity of hammock 144 to Hammock #2 1550 or related to the desired weight distribution in the users, or both. Curved Doubles Extension mechanisms 1602 and 1604 provide a similar level of adjustability as Doubles Extension Mechanisms 1502 and 1504 but additionally offer a curved aesthetic visual appeal that is softer and more curvy than that found in Doubles Extension Mechanisms 1502 and 1504.

Figure 17:
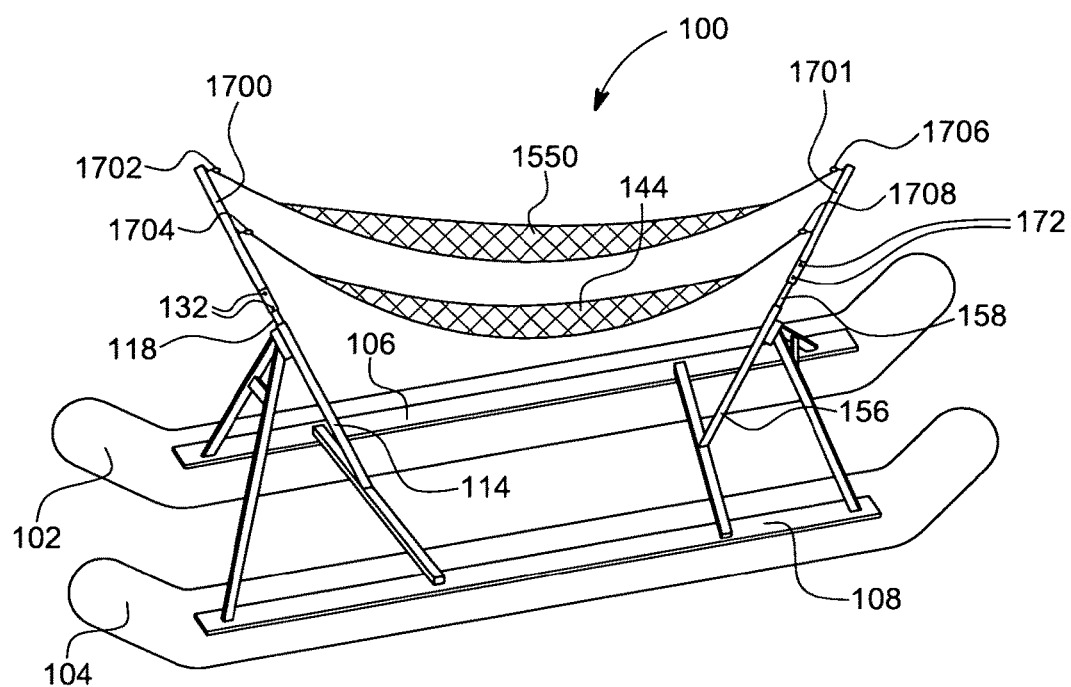
FIG. 17 is a perspective view of a variation of the floating hammock vessel shown in FIG. 1, according to an aspect of this disclosure.

FIG. 17 shows a variation in which Doubles Stacked Extension Attachments 1700 and 1701 fit over Leg Extensions C 118 and F 158 and connect at points Leg C Extension Connector Point 132 and Leg F Extension Connector Points 172 respectively by means of Connector Members 525 or other attaching mechanisms. The Doubles Stacked Extension Attachments allow for two users to use the Floating Hammock Vessel 100 simultaneously with one User 1 in Hammock #2 1550 position above User 2 in Hammock 144 in such a manner that Hammock #2 1550 is suspended from Suspension Point A-S1 1702 on one end and Suspension Point B-S1 1706 the other end and Hammock 144 is suspended from Suspension Point A-S2 on one end and Suspension Point B-S2 on the other end. Another optional use of the Doubles Stacked Extension Attachments 1700 and 1701 may be to suspend a single hammock 144 (but not as shown in FIG. 17) between Suspension Point A-S1 1702 on one end and Suspension Point B-S2 1708 on the other end—allowing for the user to have the hammock 144 (but not as shown in FIG. 17) suspended from two points of different heights, allowing for a different type of sitting, resting experience.

Figure 18A:
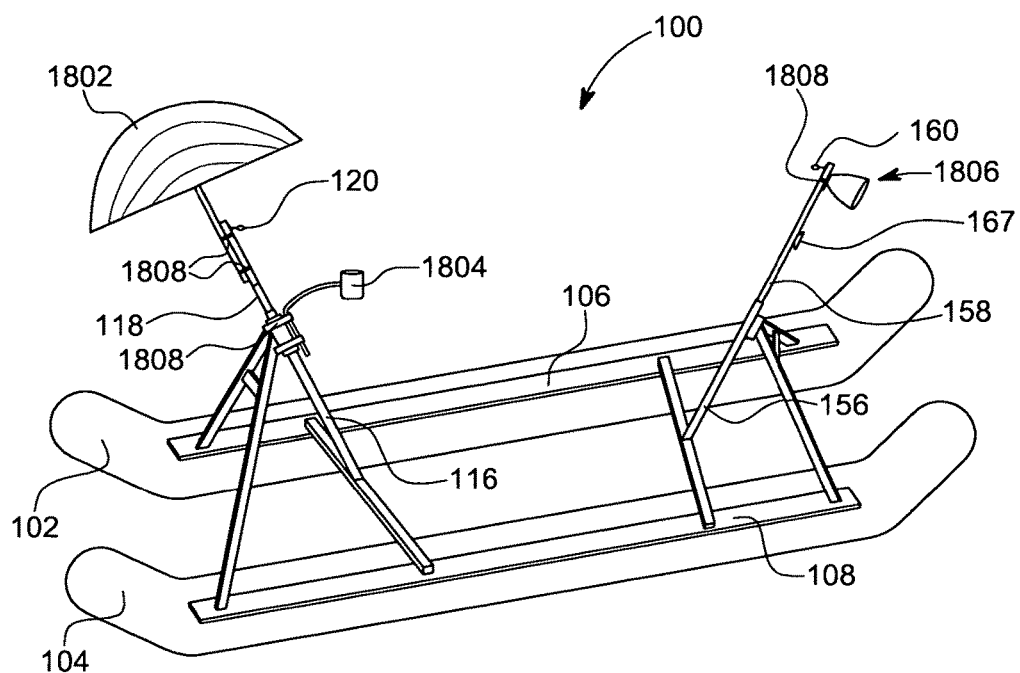
FIG. 18A is a perspective view of a variation of the floating hammock vessel shown in FIG. 1, according to an aspect of this disclosure.

FIG. 18A shows a variation of the Floating Hammock Vessel 100 in which a Shade Umbrella 1802 is attached to Leg C Extension 118 and fastened to it by two Connector Straps 1808 at two separate locations along Leg Extension 118. In an alternate variation the Shade Umbrella 1802 could be fastened to Leg C Extension 118 in another manner in which it may be stored in a more compact closed manner against Leg C Extension 118 and be able to be brought out, opened and placed in firm position without detaching one base section of it from Leg C Extension 118. Shade Umbrella 1802 provides shade for the user and in a variation may be easily adjusted to different angles and positions without the need for detaching it from Leg C Extension 118. The Shade Umbrella 1802 may also be mounted to Leg Extension F 158. Or two Shade Umbrellas 1802 can be mounted simultaneously: one attached to Leg Extension C 118 and the other attached to Leg Extension F 158. Not shown in FIG. 8A is a hammock, 144, but that would be attached using Suspension Points A and B (120 and 160).

Figure 18B:
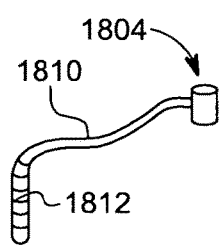
FIG. 18B is a side view of a portion of a variation of the floating hammock vessel shown in FIG. 1, according to an aspect of this disclosure.

FIGS. 18A and 18B show a variation in which a Cup Holder 1804 attached to a Cup Holder Flexible Neck 1810 and Cup Holder Connector Section 1812 is positioned such that a user can easily place a cup or beverage in an easy-to-reach position where said cup or beverage is held in place while not being used by the user. In this variation Cup Holder Connector Section 1812 is connected to Leg C 116 by means of a Connector Strap 1808, but in other variations may be fastened to Leg C 116 or Crossbeam C 110, or Leg F 156 or Leg F Crossbeam 150 by means of a Connector Strap 1808 or other attachment method.

Figure 18C:
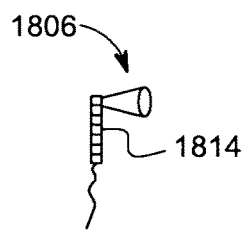
FIG. 18C is a side view of a portion of a variation of the floating hammock vessel shown in FIG. 1, according to an aspect of this disclosure.

FIGS. 18A and 18C show a variation in which a Light 1806 is attached to a Light Connector Section 1814 which is fastened to Leg Extension F 158 by means of a Connector Strap 1808. In another variation multiple Lights 1806 may be fastened to other locations of the Floating Hammock Vessel 100 including to Leg C Extension 118 and other parts. Light 1806 may be battery powered by an internal battery residing within Light 1806 itself or by the larger Battery located in Battery Holder 2414. In the variation in which Light 1806 is powered by a non-internal battery, the wiring leading from Light 1806 to said battery may be enclosed within conduit 2410 along the length of its route to said battery. A variation may include Light 1806 that is controlled by a remote switch.

Figure 19A:
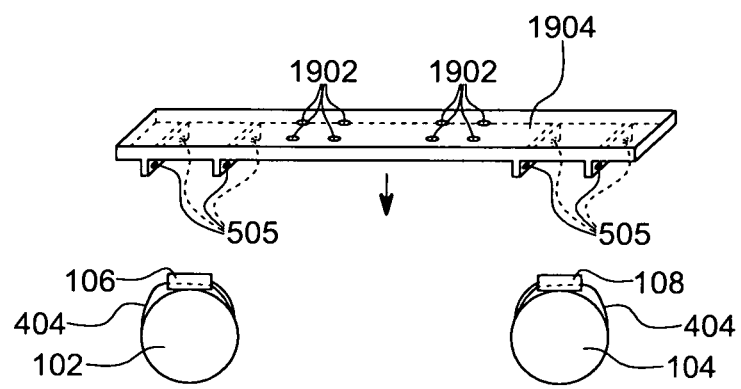
FIG. 19A is a perspective view of a portion of a variation of the floating hammock vessel shown in FIG. 1, according to an aspect of this disclosure and a heads-on cross-sectional view of a portion of a variation of the floating hammock vessel shown in FIG. 1, according to an aspect of this disclosure.
Figure 19B:
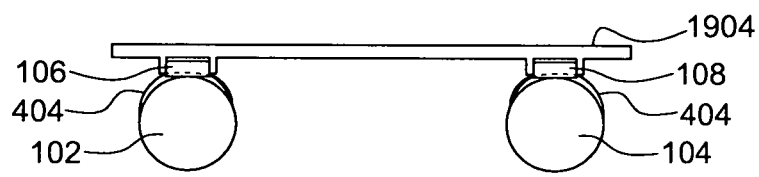
FIG. 19B is a heads-on cross-sectional view of a portion of the floating hammock vessel shown in FIG. 1, according to an aspect of this disclosure.
Figure 19C:
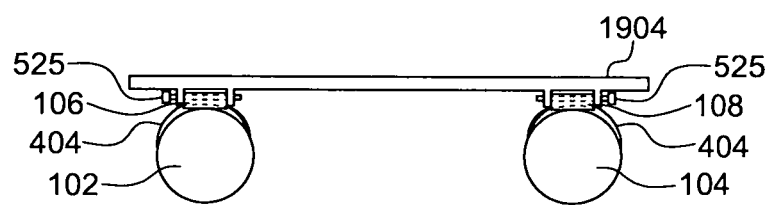
FIG. 19C is a heads-on cross-sectional view of a portion of the floating hammock vessel shown in FIG. 1, according to an aspect of this disclosure.

FIG. 19A shows how a Deck Flooring Section 1904 attaches to Base Frame 1 106 and Base Frame 2 108 by means of a Connector Member 525 (not shown) passing through the Connector Holes 505 found on the underside of the Deck Flooring Section 1904 as well as through the Connector Holes 505 (not shown) of Base Frame 1 (as shown in FIG. 6A) and Base Frame 2 (as shown in FIG. 6A) in such a manner that the Deck Flooring Section 1904 is securely fastened by four different Connector Members 525 (not shown) on Base 1 106 and by four different Connector Members 525 (not shown) on Base 2 108. The length of Deck Flooring Section 1904 runs between and perpendicular to the Base Frames 1 106 and 2 108. FIG. 19A shows how the Deck Flooring Section 1904 may be first positioned above- and then come down upon—the two Base Frames 1 106 and 2 108. FIG. 19B Shows the Deck Flooring Section now sitting snugly atop Base Frames 1 106 and 2 108. FIG. 19C shows Connector Member 525 passing through the Connector Holes 505 of Base Frames 1 106 and 2 108 (as shown in FIG. 6A) and also through the Connector holes 505 found on the bottom section of the Deck Flooring Section 1904, thus securely holding the Deck Flooring Section to the Base Frames 1 106 and 2 108. In another variation the Deck Flooring Section 1904 may be attached to the Base Frames 1 106 and 2 108 by means of another fastening method. The Deck Flooring Section 1904 may have a non-slip surface such that a user is not likely to slip on it if it is wet.

FIG. 19A further shows a variation in which there are eight distinct Flooring Connector Holes 1902 available and onto which can be connected tie down fasteners (not shown) that can in turn be used to hold down coolers or other items in such a manner that they cannot move or fall off of the Floating Hammock Vessel 100. The Flooring Connector Holes 1902 are also used to attach a motor mounting surface (not shown) that may connect with Motor Mount Hole Connectors 2402 (as shown in FIG. 24), or to connect Long Deck Flooring Sections 2302 (see FIG. 23) or a Transom Attachment 2506 (FIG. 25) or to attach Battery Holder Tie-Down 2412 mechanism.

Figure 20:
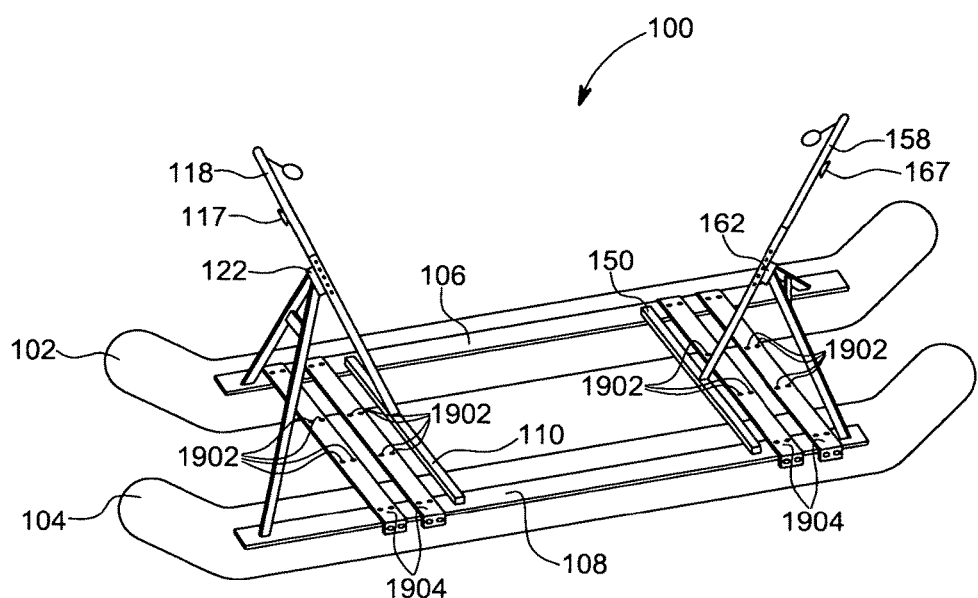
FIG. 20 is a perspective view of a variation of the floating hammock vessel shown in FIG. 1, according to an aspect of this disclosure.

FIG. 20 shows a perspective view in which four Deck Flooring Sections 1904 are in place, each crossing from Base Frame 1 106 on one end to Base Frame 2 108 on the other end, and in each case each end of the Deck Flooring Section 1904 is secured in 4 positions by means of two Connector Members 525 (not shown) passing through four distinct Connector Holes 505 (not shown).

Figure 21A:
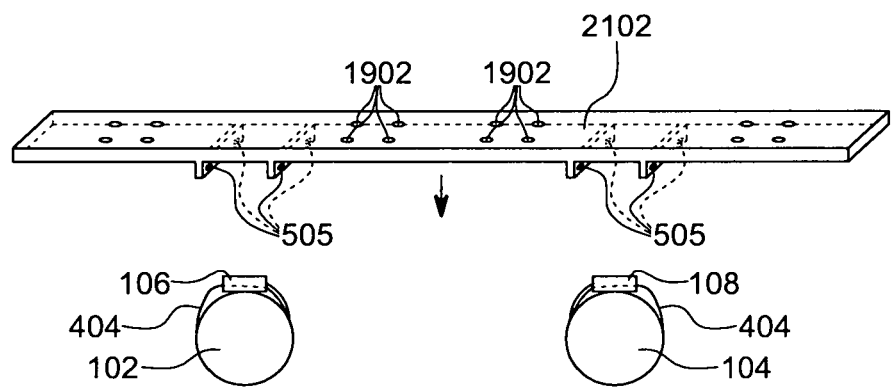
FIG. 21A is a perspective view of a portion of the floating hammock vessel shown in FIG. 1, according to an aspect of this disclosure and a heads-on cross-sectional view of a portion of the floating hammock vessel shown in FIG. 1, according to an aspect of this disclosure.
Figure 21B:
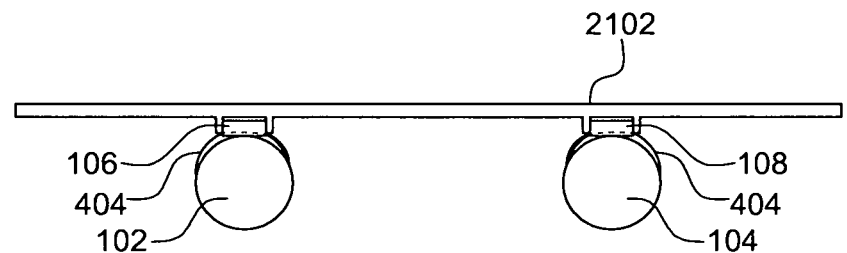
FIG. 21B is a heads-on cross-sectional view of a portion of the floating hammock vessel shown in FIG. 1, according to an aspect of this disclosure.
Figure 21C:
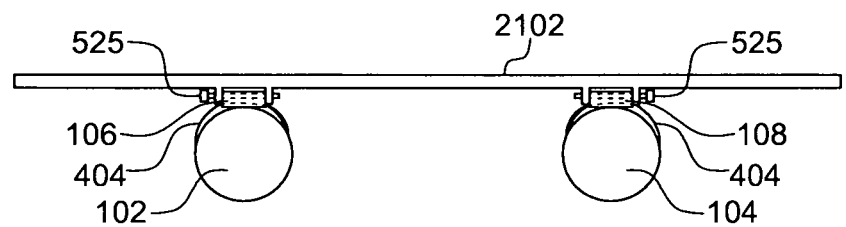
FIG. 21C is a heads-on cross-sectional view of a portion of a variation of the floating hammock vessel shown in FIG. 1, according to an aspect of this disclosure.

FIG. 21A shows how a Yoga Deck Flooring Section 2102 attaches to Base Frame 1 106 and Base Frame 2 108 by means of a Connector Member 525 (not shown) passing through the Connector Holes 505 found on the underside of the Yoga Deck Flooring Section 2102 as well as through the Connector Holes 505 found passing through the Connector Holes 505 (not shown) of Base Frame 1 (as shown in FIG. 6A) and Base Frame 2 (as shown in FIG. 6A) in such a manner that the Yoga Deck Flooring Section 2102 is securely fastened by four different Connector Members 525 (not shown) on Base 1 106 and by four different Connector Members 525 (not shown) on Base 2 108. The length of Yoga Deck Flooring Section 2102 runs between and perpendicular to the Base Frames 1 106 and 2 108. FIG. 21A Shows how the Yoga Deck Flooring Section 2102 may be first positioned above- and then come down upon—the two Base Frames 1 106 and 2 108. FIG. 21B Shows the Yoga Deck Flooring Section now sitting snugly atop Base Frames 1 106 and 2 108. FIG. 21C shows Connector Member 525 passing through the Connector Holes 505 of Base Frames 1 106 and 2 108 (as shown in FIG. 6A) and also through the Connector holes 505 found on the bottom section of the Yoga Deck Flooring Section 1904, thus securely holding the Yoga Deck Flooring Section to the Base Frames 1 106 and 2 108. In another variation the Yoga Deck Flooring Section 2102 may be attached to the Base Frames 1 106 and 2 108 by means of another fastening method. The Yoga Deck Flooring Section 2102 may have a non-slip surface such that a user is not likely to slip on it if it is wet.

Figure 22:
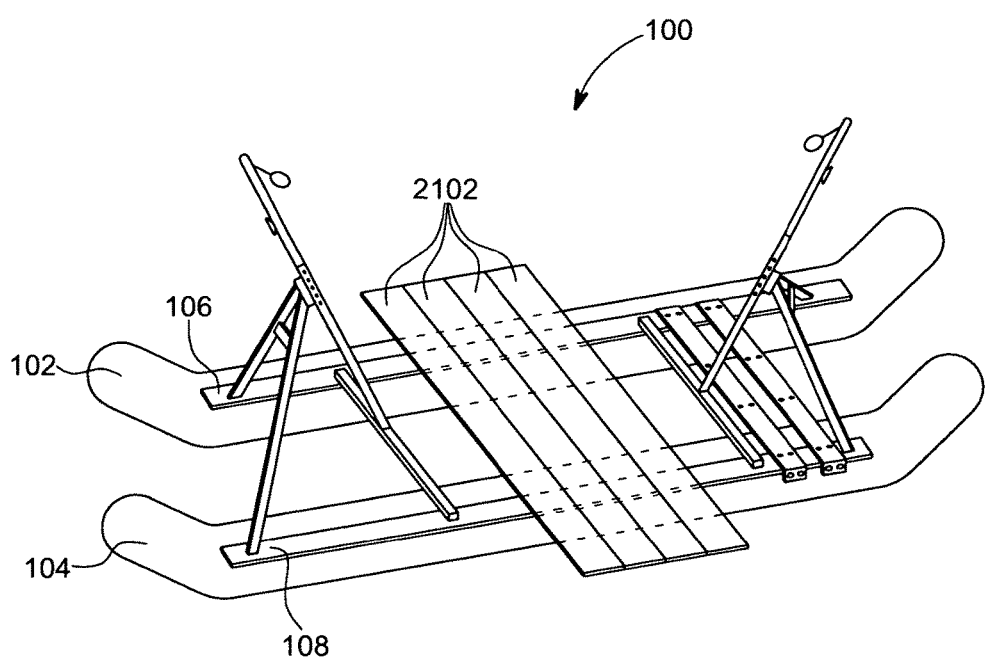
FIG. 22 is a perspective view of a variation of the floating hammock vessel shown in FIG. 1, according to an aspect of this disclosure.

FIG. 22 shows a perspective view in which four Yoga Deck Flooring Sections 2102 are in place, each somewhat more than 6-inches wide and crossing from Base Frame 1 106 to Base Frame 2 108, and at each crossing the Yoga Deck Flooring Section 2102 is secured in 4 positions by means of two Connector Members 525 (not shown) passing through four distinct Connector Holes 505 (not shown). The length of the Yoga Deck Flooring Sections 2102 are such that a standard yoga mat (72 inches by 24 inches) will fit entirely on the four side-by-side connected Yoga Deck Flooring Sections 2102, as shown in FIG. 22.

Figure 23:
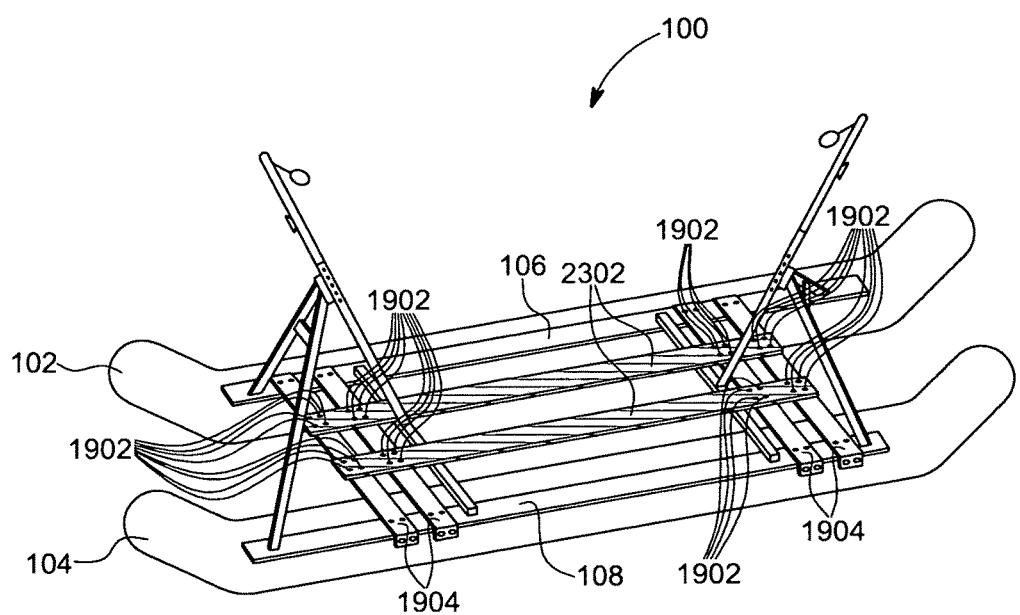
FIG. 23 is a perspective view of a variation of the floating hammock vessel shown in FIG. 1, according to an aspect of this disclosure.
Figure 24:
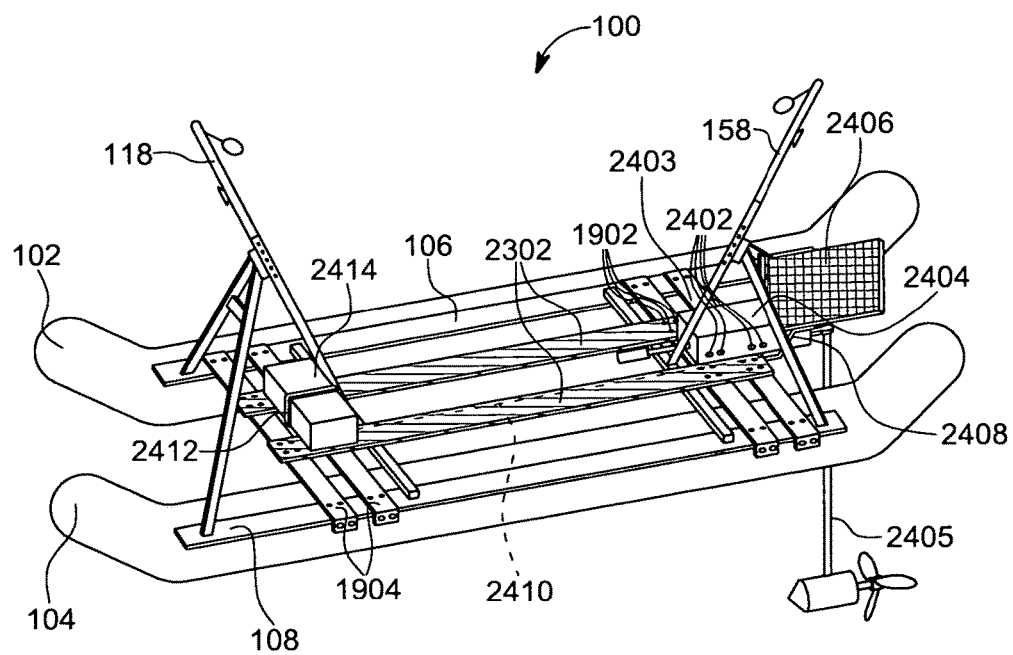
FIG. 24 is a perspective view of a variation of the floating hammock vessel shown in FIG. 1, according to an aspect of this disclosure.

FIG. 23 Shows two Long Deck Flooring Sections 2302 attached to the Flooring Connector Holes 1902 shown in FIG. 19A. These Long Deck Flooring Sections 2302 provide a space for a user to stand on while getting in or out of Hammock 144. The Long Deck Flooring Sections 2302 may have a non-slip surface such that a user is not likely to slip on it if it is wet.

FIG. 24 shows a variation in which a Battery Holder Tie-Down, 2412, is connected to the Deck Flooring Section 1904 in order to fasten the waterproof Battery Holder 2414 to the Deck Flooring Section 1904 in such a manner that the Battery Holder 2414 cannot move or fall off the Floating Hammock Vessel, even in the case that the Floating Hammock Vessel is flipped over.

FIG. 24 also shows a variation in which a standard electric bow-mount motor 2404 (which is a non-transom-mount style of motor) may be attached to a Flat Motor Mount 2403 (which is connected to Deck Floor Section 1904) by means of Connector Members 505 (not shown) passing through the Motor Mount Hole Connectors 2402. Such a mounting system is designed to hold the motor 2404 securely in place.

FIG. 24 further shows a Solar Panel 2406 which is attached to Solar Panel Mounting Attachment 2408, which is in turn attached to the Cross-Legs Supporter 153 (FIG. 1) or 113 (FIG. 1) and may also be attached to Legs D 154 and E 152 or Legs A 114 and B 112.

FIG. 24 also shows a variation in which the wires that connect the Motor 2404 and the Solar Panel 2406 to the Battery (not shown) inside Battery Holder 2414 are enclosed within an electrical Conduit 2410 (which runs underneath the Deck Flooring 2303) in order to protect the wires from being exposed.

Figure 25A:
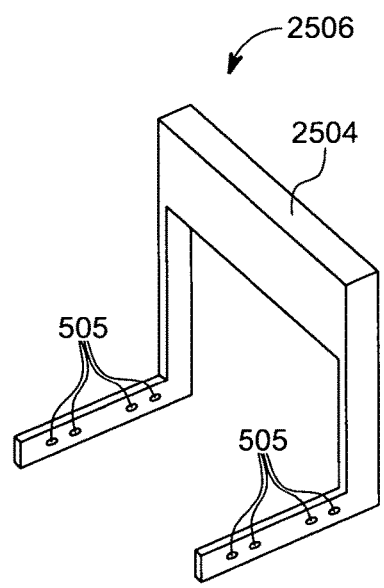
FIG. 25A is a perspective view of a variation of a portion of the floating hammock vessel shown in FIG. 1, according to an aspect of this disclosure.
Figure 25B:
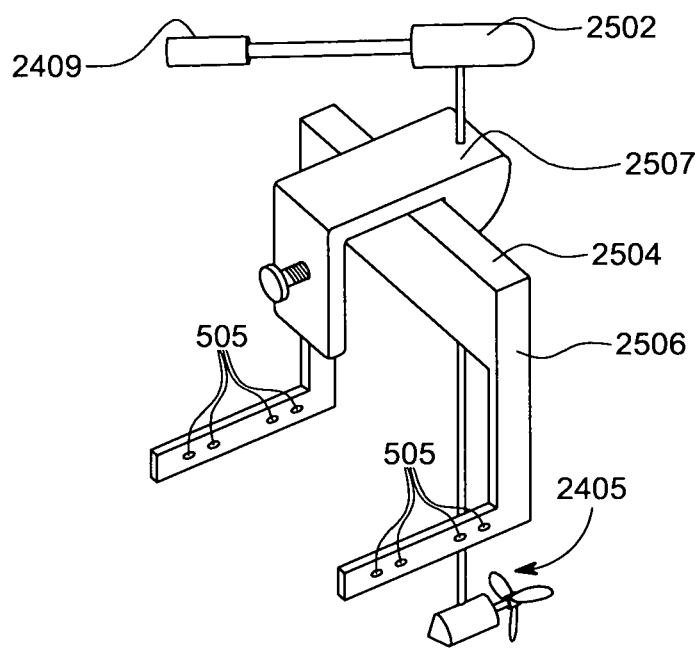
FIG. 25B is a perspective view of a variation of a portion of the floating hammock vessel shown in FIG. 1, according to an aspect of this disclosure.
Figure 25C:
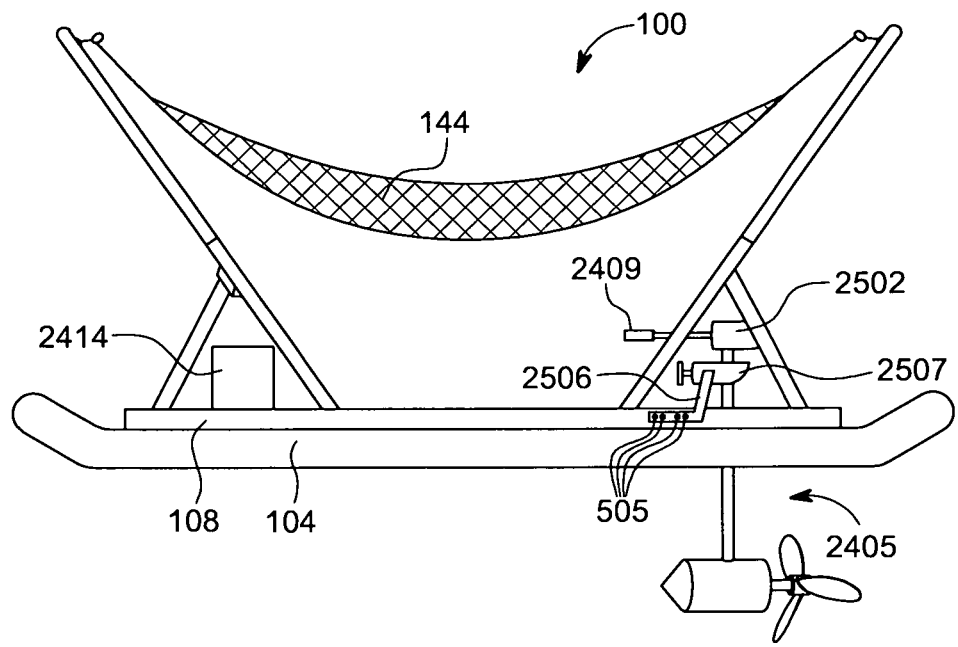
FIG. 25C is a side view of a variation of the floating hammock vessel shown in FIG. 1, according to an aspect of this disclosure.

FIG. 25 show a variation in which a Transom Attachment 2506 (FIG. 25A) is attached to a Deck Flooring Section 1904 (not shown here, but shown in FIGS. 19 and 20) by means of Connector Members 505 (not shown here) passing through the Connector Holes shown in FIG. 25B and through the Connector Holes 1902 shown in FIG. 19A. FIG. 25B shows a variation in which a Transom Mount Motor 2502 may be mounted to the Transom 2504 by using a mounting clamp 2507. FIG. 25C shows a side view of the Transom Mount Motor 2502 in such a location that it can be easily controlled by a person sitting, laying or otherwise positioned in Hammock 144 by use of the tiller, 2409, or a remote control device.

Figure 26A:
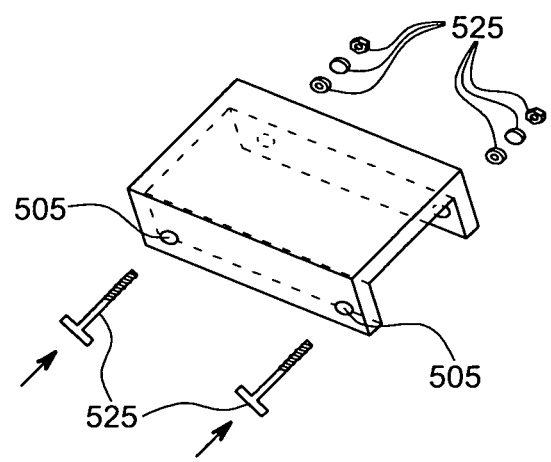
FIG. 26A is a perspective view of a variation of a portion of the floating hammock vessel shown in FIG. 1, according to an aspect of this disclosure.
Figure 26B:
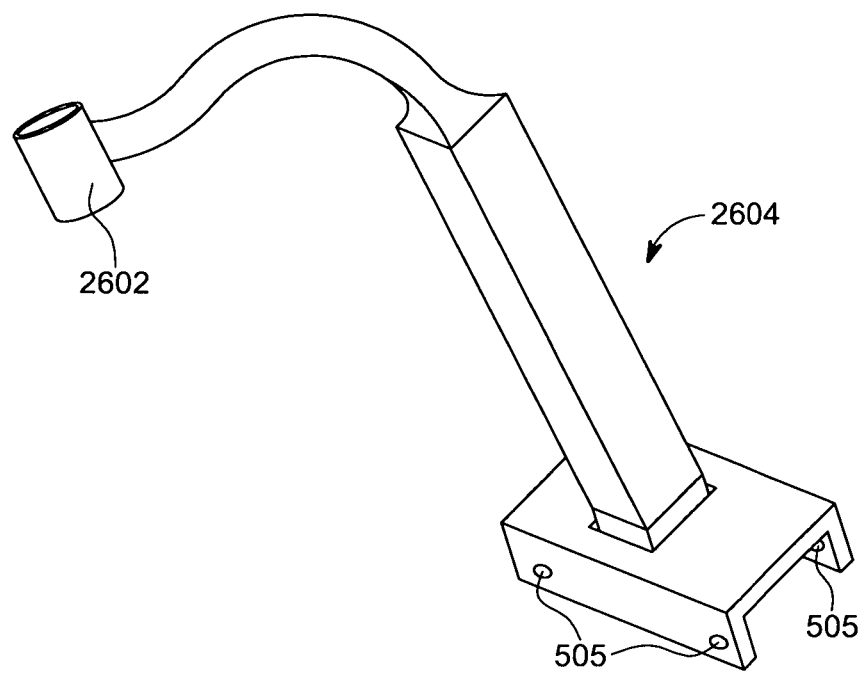
FIG. 26B is a perspective view of a variation of a portion of the floating hammock vessel shown in FIG. 1, according to an aspect of this disclosure.
Figure 26C:
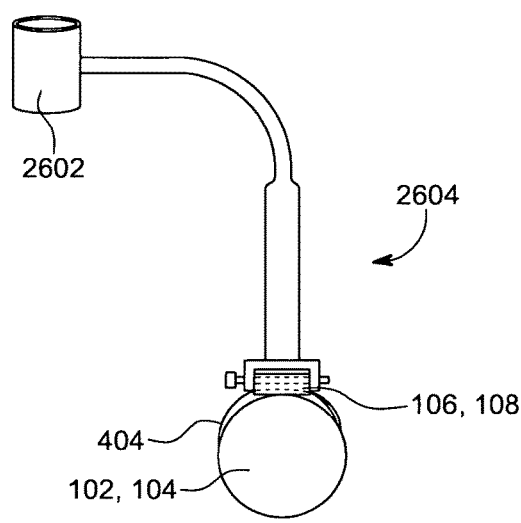
FIG. 26C is a perspective view of a variation of a portion of the floating hammock vessel shown in FIG. 1, according to an aspect of this disclosure.
Figure 26D:
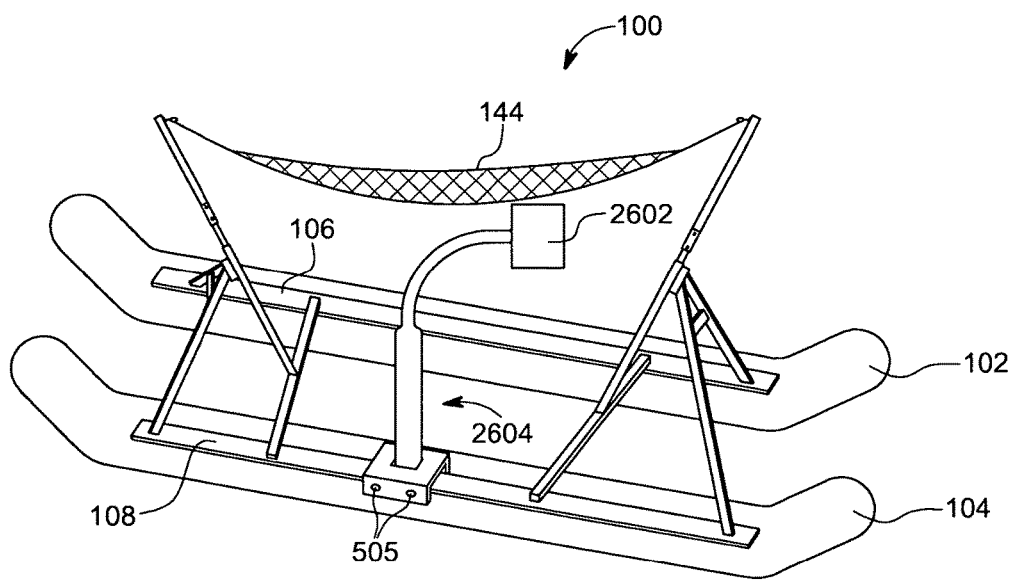
FIG. 26D is a perspective view of a variation of the floating hammock vessel shown in FIG. 1, according to an aspect of this disclosure.

FIG. 26 show a variation in which Extension Cup Holder 2602 is connected by a flexible neck similar to that of 1810 Cup Holder Flexible Neck 1810 shown in FIG. 18) to Base Frame Attachment with Cup Holder 2604 as shown in FIGS. 26B and 26C. The base of the Base Frame Attachment with Cup Holder 2604 is shown in FIG. 26A with Connector Members 525 that fasten it to the Base Frame 1 106 or Base Frame 2 108 as shown in FIG. 26C. Note that the base, FIG. 26A, is not a separate item but is an integral part of item 2604—FIG. 26A is added for clarity in showing the method of connecting parts. FIG. 26D shows a variation in which the Base Frame Attachment with Cup Holder 2604 is fastened to Base Frame 2 in such a location as to position the Extension Cup Holder 2602 in a useful location for a user positioned in Hammock 144. The purpose of Extension Cup Holder 2602 is to allow for the user to have a cup or beverage (in bottle of other liquid holding device) held in a convenient location next to him or her (the user) in such a manner that he or she can easily take a sip from his/her beverage cup (or other container) and place it back in Extension Cup Holder 2602 with great ease.

Figure 27A:
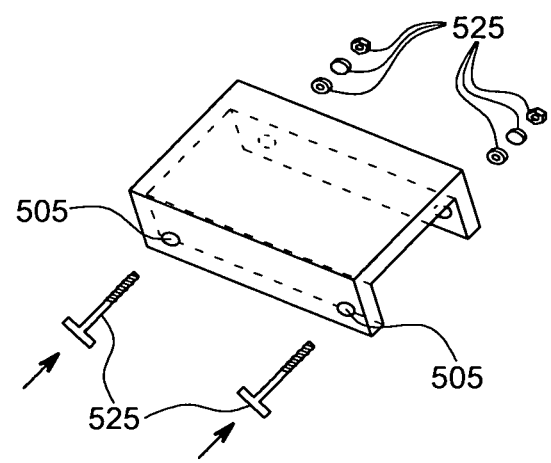
FIG. 27A is a perspective view of a variation of a portion of the floating hammock vessel shown in FIG. 1, according to an aspect of this disclosure.
Figure 27B:
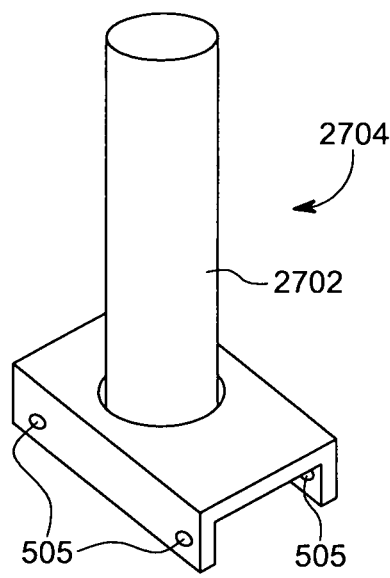
FIG. 27B is a perspective view of a variation of a portion of the floating hammock vessel shown in FIG. 1, according to an aspect of this disclosure.
Figure 27C:
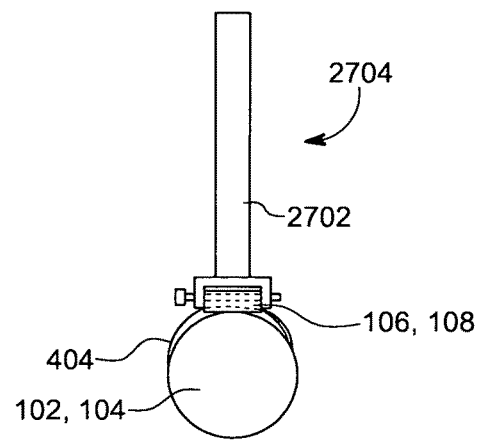
FIG. 27C is a perspective view of a variation of a portion of the floating hammock vessel shown in FIG. 1, according to an aspect of this disclosure.
Figure 27D:
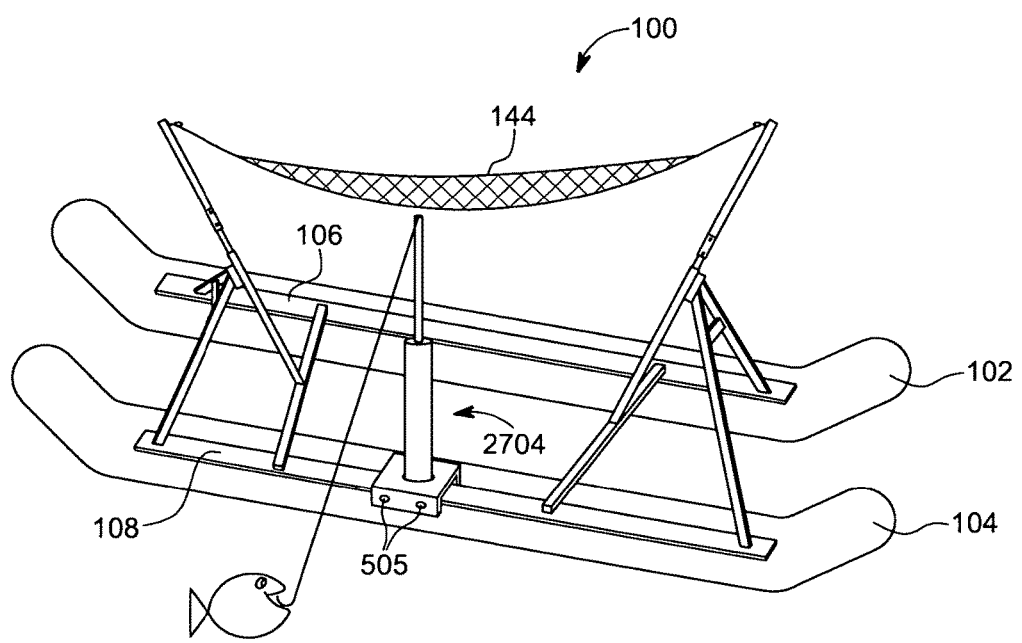
FIG. 27D is a perspective view of a variation of the floating hammock vessel shown in FIG. 1, according to an aspect of this disclosure.

FIG. 27 show a variation in which Fishing Pole Holder 2702 is connected to Base Frame Attachment with Fishing Pole Holder 2704 as shown in FIGS. 27B and 27C. The base of the Base Frame Attachment with Fishing Pole Holder 2704 is shown in FIG. 27A with Connector Members 525 that fasten it to the Base Frame 1 106 or Base Frame 2 108 as shown in FIG. 27C. FIG. 27D shows a variation in which the Base Frame Attachment with Fishing Pole Holder 2702 is fastened to Base Frame 2 108 in such a location as to position the Fishing Pole Holder 2702 in a useful location for the user positioned in Hammock 144. In an alternate variation there may be multiple Fishing Pole Holders 2702 connected to a Base Frame Attachment with Fishing Pole Holder 2704 and there may be many such Base Frame Attachment with Fishing Pole Holders 2704 attached to multiple locations on Base Frame 1 106 and Base Frame 2108.

Figure 28A:
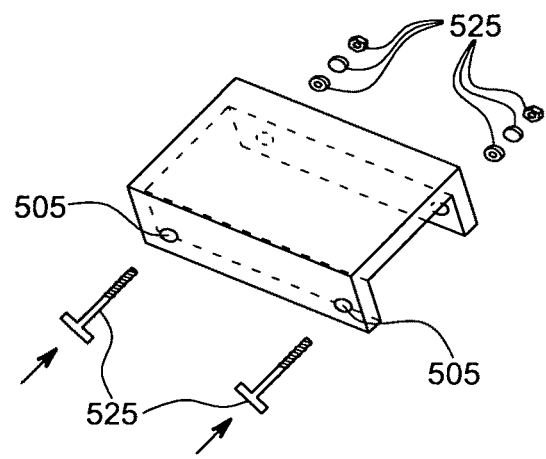
FIG. 28A is a perspective view of a variation of a portion of the floating hammock vessel shown in FIG. 1, according to an aspect of this disclosure.
Figure 28B:
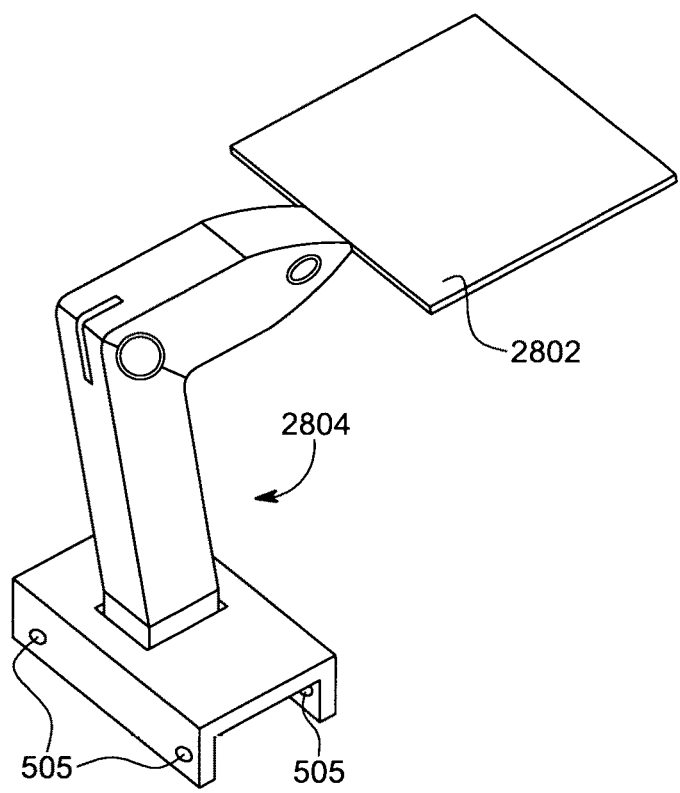
FIG. 28B is a perspective view of a variation of a portion of the floating hammock vessel shown in FIG. 1, according to an aspect of this disclosure.
Figure 28C:
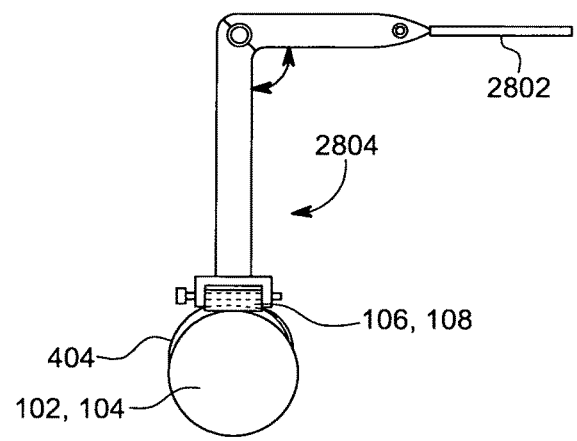
FIG. 28C is a perspective view of a variation of a portion of the floating hammock vessel shown in FIG. 1, according to an aspect of this disclosure.
Figure 28D:
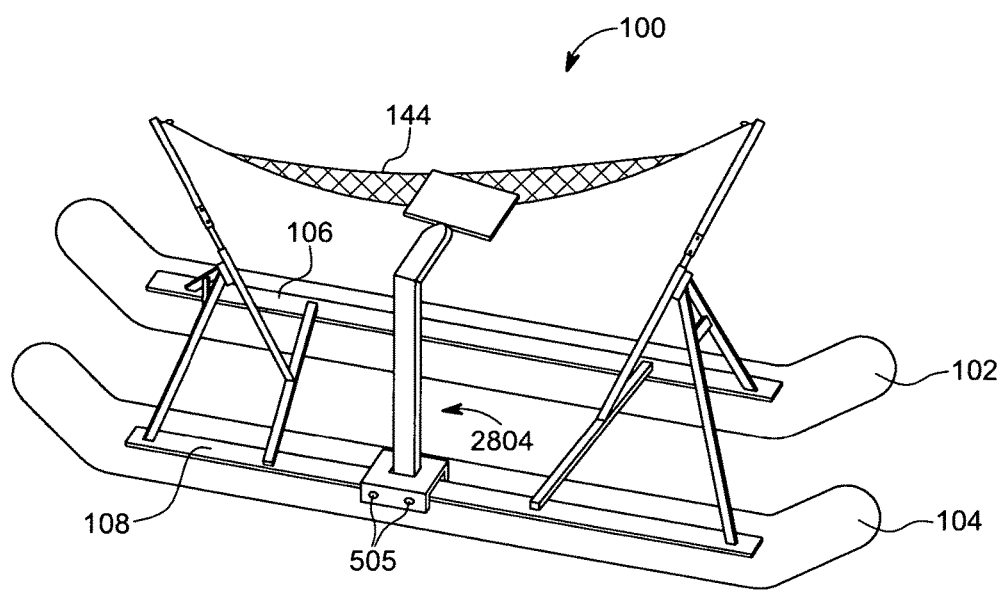
FIG. 28D is a perspective view of a variation of the floating hammock vessel shown in FIG. 1, according to an aspect of this disclosure.

FIG. 28 show a variation in which Table/Desktop 2802 is connected to Base Frame Attachment with Table/Desktop 2804 as shown in FIGS. 28B and 28C. The base of the Base Frame Attachment with Table/Desk 2804 is shown in FIG. 28A with Connector Members 525 that fasten it to the Base Frame 1 106 or Base Frame 2 108 as shown in FIG. 28C. FIG. 28D shows a variation in which the Base Frame Attachment with Table/Desktop is fastened to Base Frame 2 108 in such a location as to position the Table/Desktop 2802 in a useful location for the user sitting in or otherwise positioned in Hammock 144. In an alternate version there may be various Base Frame Attachments with Table/Desktop 2804 attached to various locations on Base Frame 1 106 and/or Base Frame 2 108. In an alternate variation the Table/Desktop 2802 will be connected to the Base Frame Attachment with Table/Desktop 2804 by means of an easily adjusted mechanism allowing user to position table/desk in whatever position he or she desires.

Figure 29A:
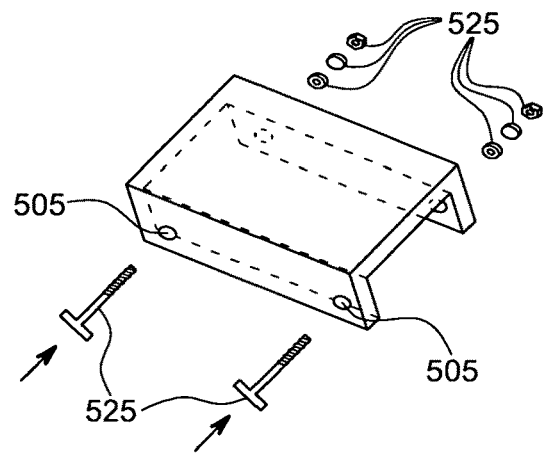
FIG. 29A is a perspective view of a variation of a portion of the floating hammock vessel shown in FIG. 1, according to an aspect of this disclosure.
Figure 29B:
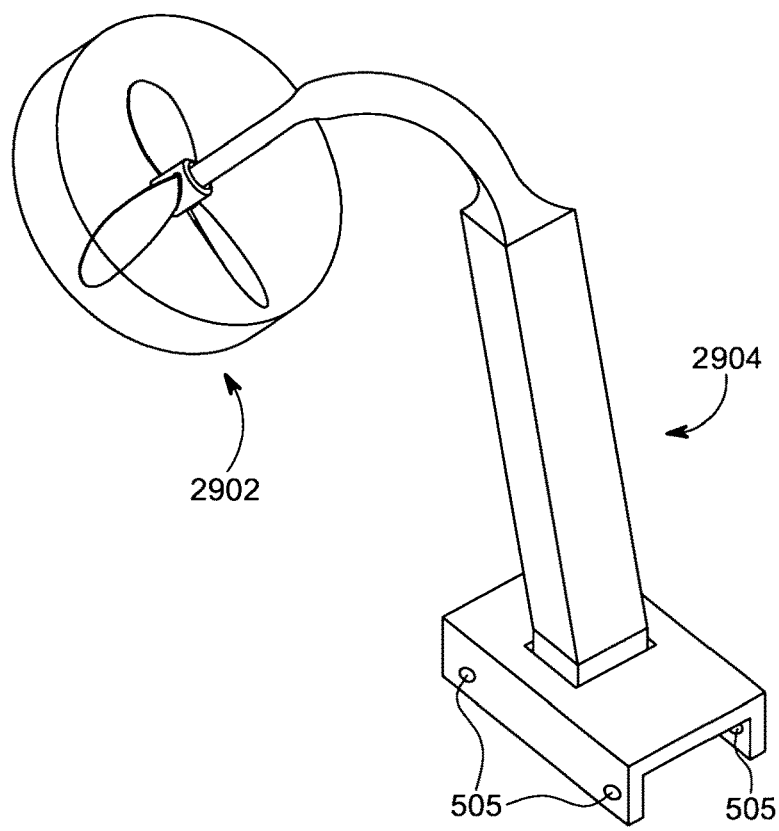
FIG. 29B is a perspective view of a variation of a portion of the floating hammock vessel shown in FIG. 1, according to an aspect of this disclosure.
Figure 29C:
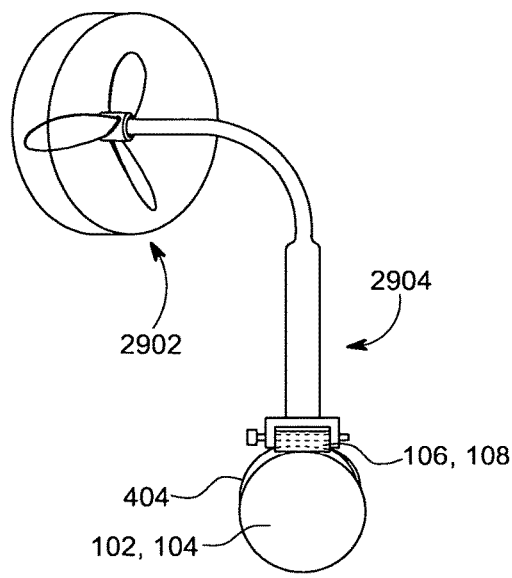
FIG. 29C is a perspective view of a variation of a portion of the floating hammock vessel shown in FIG. 1, according to an aspect of this disclosure.
Figure 29D:
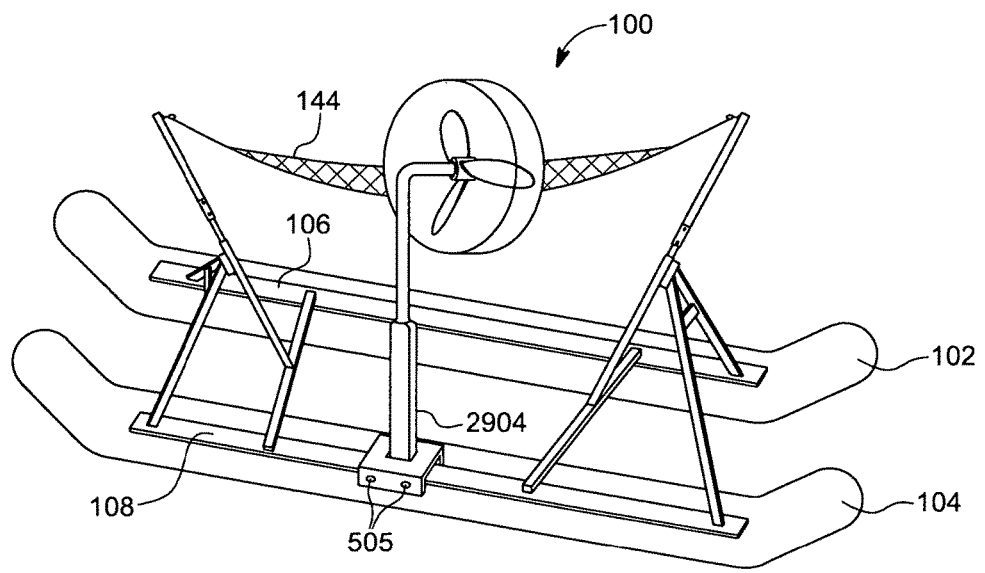
FIG. 29D is perspective view of a variation of the floating hammock vessel shown in FIG. 1, according to an aspect of this disclosure.

FIG. 29 show a variation in which Fan 2902 is connected to Base Frame Attachment with Fan 2904 as shown in FIGS. 29B and 29C The base of the Base Frame Attachment with Fan 2904 is shown in FIG. 29A with Connector Members 525 that fasten it to the Base Frame 1 106 or Base Frame 2 108 as shown in FIG. 29C. FIG. 29D shows a variation in which the Base Frame Attachment with Fan is fastened to Base Frame 2 108 in such a location as to position the Fan 2902 in a useful location for the user sitting in or otherwise positioned in Hammock 144. In this variation Fan 2902 is powered by a battery held within the Fan 2902 itself. In another variation the Fan 2902 may be powered by the Battery in the Battery Holder 2414 (not shown here, but in FIG. 24), in which case the wiring between the Fan 2902 and the Battery Holder may be enclosed in a Conduit 2410 (not shown here).

Figure 30:
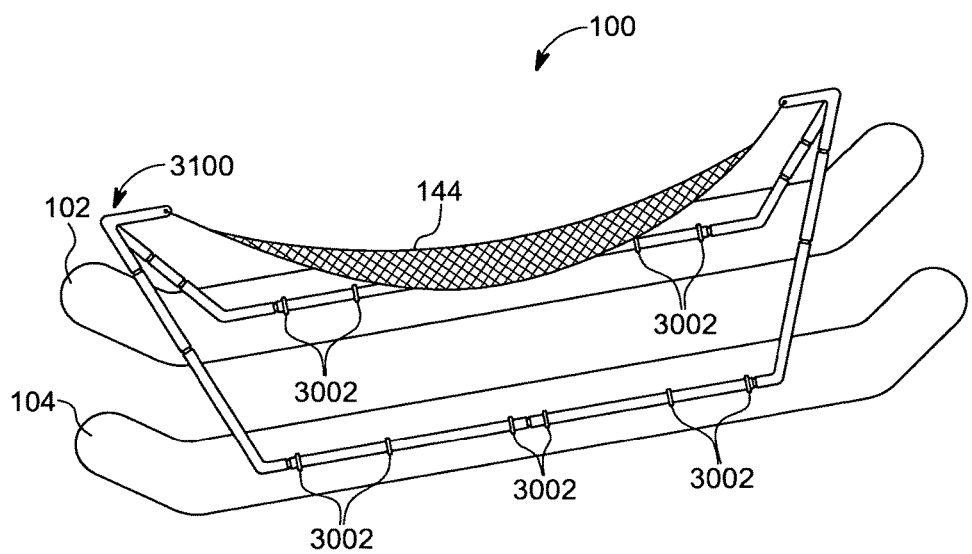
FIG. 30 is a perspective view of a variation of the floating hammock vessel shown in FIG. 1, according to an aspect of this disclosure.
Figure 31:
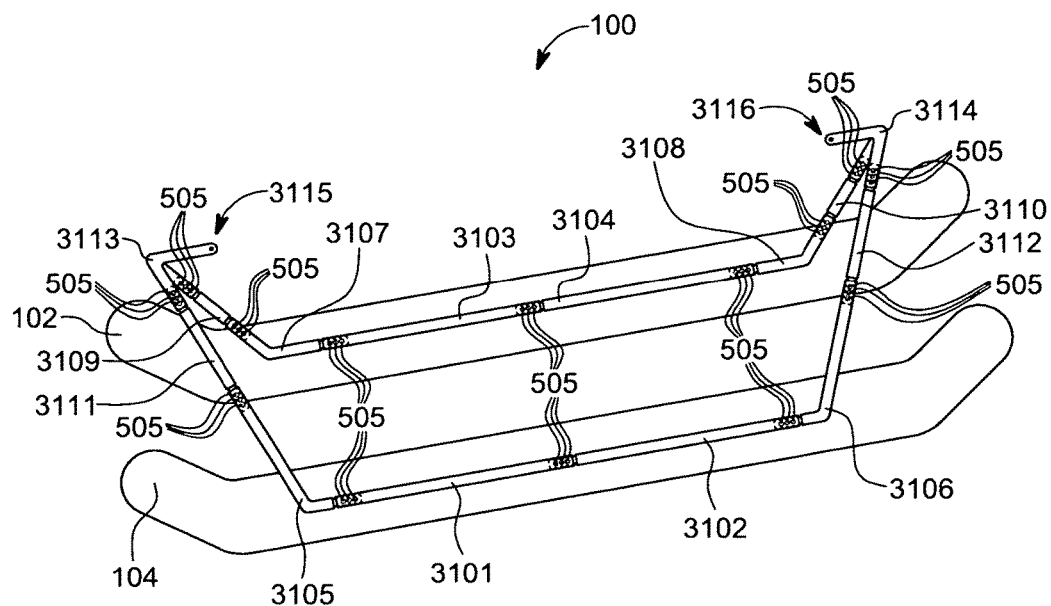
FIG. 31 is a perspective view of a variation of the floating hammock vessel shown in FIG. 1, according to an aspect of this disclosure.

FIG. 30 shows a variation of the Floating Hammock Vessel 100 in which the leg-and-crossbeam supports (110, 112, 114, 116, 118 etc.) for the hammock are replaced by an i-Frame, (3100) made of several interconnecting parts, see FIG. 31. Strap Fastening Points 3002 permit the i-Frame parts 1 3101, 3102, 3103 and 3104 (See FIG. 31) to be attached to Pontoon 1 102 and Pontoon 2 104. In this variation the pontoons may be inflatable as in FIG. 4A.

FIG. 31 shows more detail of this variation of the Floating Hammock Vessel 100. The frame is comprised of 14 different parts: i-Frame Part 1 3101, i-Frame Part 2 3102, i-Frame Part 3 3103, i-Frame Part 4 3104, i-Frame Part 5 3105, i-Frame Part 6 3106, i-Frame Part 7 3107, i-Frame Part 8 3108, i-Frame Part 9 3109, i-Frame Part 10 3110, i-Frame Part 11 3111, i-Frame Part 12 3112, i-Frame Top Connector A 3113, and i-Frame Top Connector B 3114.

FIG. 31 shows a variation in which i-Frame Part 1 3101 receives into it and attaches to neighboring parts i-Frame Part 2 3102 and i-Frame part 5 3105. These parts are attached together by Connector Members 525 (not shown) where their respective Connector Holes 505 align as shown in FIG. 31. i-Frame Part 2 3102 connects to both i-Frame part 1 3101 and i-Frame Part 6 3106 by means of Connector Members 525 (not shown) where their respective Connector Holes 505 align. i-Frame Part 3 3103 connects to both i-Frame Part 4 3104 and i-Frame Part 7 3107 by means of Connector Members 525 (not shown) where their respective Connector Holes 505 align. i-Frame Part 4 3104 connects to both i-Frame Part 3 3103 and i-Frame Part 8 3108 by means of Connector Members 525 (not shown) where their respective Connector Holes 505 align. i-Frame Part 5 3105 connects to both i-Frame Part 1 3101 and i-Frame Part 11 3111 by means of Connector Members 525 (not shown) where their respective Connector Holes 505 align. i-Frame Part 6 3106 connects to both i-Frame Part 2 3102 and i-Frame Part 12 3112 by means of Connector Members 525 (not shown) where their respective Connector Holes 505 align. i-Frame Part 7 3107 connects to both i-Frame Part 3 3103 and i-Frame Part 9 3109 by means of Connector Members 525 (not shown) where their respective Connector Holes 505 align. i-Frame Part 8 3108 connects to both i-Frame Part 4 3104 and i-Frame Part 10 3110 by means of Connector Members 525 (not shown) where their respective Connector Holes 505 align. i-Frame Part 9 3109 connects to both i-Frame Part 7 3107 and i-Frame Top Connector A 3113 by means of Connector Members 525 (not shown) where their respective Connector Holes 505 align. i-Frame Part 10 3110 connects to both i-Frame Part 8 3108 and i-Frame Top Connector B 3114 by means of Connector Members 525 (not shown) where their respective Connector Holes 505 align. i-Frame Part 11 3111 connects to both i-Frame Part 5 3105 and i-Frame Top Connector A 3113 by means of Connector Members 525 (not shown) where their respective Connector Holes 505 align. i-Frame Part 12 3112 connects to both i-Frame Part 6 3106 and i-Frame Top Connector B 3114 by means of Connector Members 525 (not shown) where their respective Connector Holes 505 align. i-Frame Top Connector A 3113 connects to both i-Frame Part 9 3109 and i-Frame Part 11 3111 by means of Connector Members 525 (not shown) where their respective Connector Holes 505 align. i-Frame Top Connector B 3114 connects to both i-Frame Part 10 3110 and i-Frame Part 12 3112 by means of Connector Members 525 (not shown) where their respective Connector Holes 505 align. In an alternate variation Connector Holes 505 and Connector Members 525 are replaced by other connecting devices or methods. The parts in this variation may be made of steel, aluminum, fiber carbon, aluminum alloy or other composite materials that offer great strength and rigidity.

FIG. 31 shows a variation in which i-Frame Suspension Point A 3115 and i-Frame Suspension Point B 3116 suspend a Hammock 114 (not shown in FIG. 31, but shown in FIG. 30).

FIGS. 30 and 31 show a variation that has no flooring material at all. This variation may be desirable for floating down a river or sitting in a pool. This variation may be desirable for a pond or a small lake in which paddling the Floating Hammock Vessel to the shore might not take very much effort or time. In a variation padding may be wrapped around the i-Frame Sections to protect a user from getting hurt in the case that he or she might fall into the frame. In this variation, the Floating Hammock Vessel may be controlled and/or maneuvered by means of a paddle (not shown) or a rudder system (not shown).

Figure 32A:
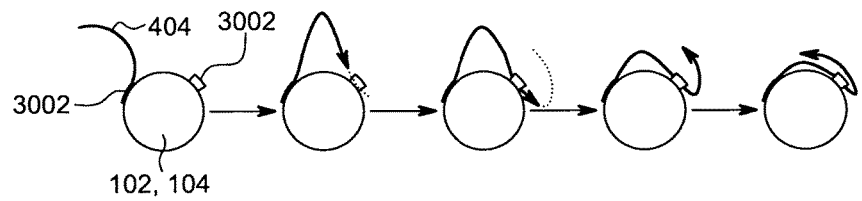
FIG. 32A is a heads-on cross-sectional view of a variation of a portion of the floating hammock vessel shown in FIG. 1, according to an aspect of this disclosure.
Figure 32B:
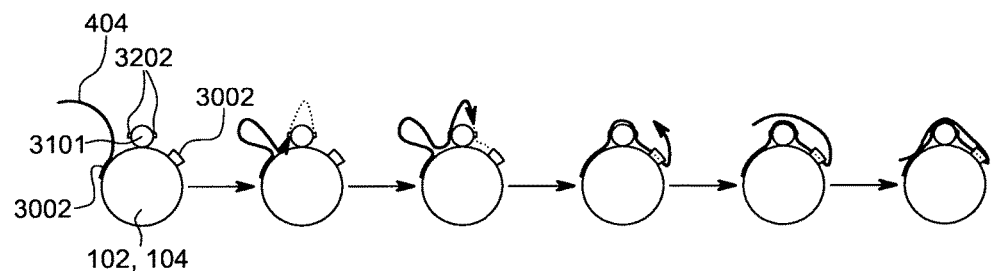
FIG. 32B is a heads-on cross-sectional view of a variation of a portion of the floating hammock vessel shown in FIG. 1, according to an aspect of this disclosure.
Figure 32C:
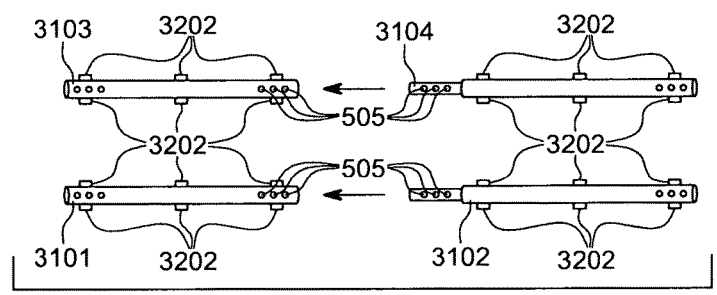
FIG. 32C is a top view of a variation of a portion of the floating hammock vessel shown in FIG. 1, according to an aspect of this disclosure.

FIGS. 32A, 32B, and 32C show a variation in which the pontoons 102, 104 (which may be inflatable) arc connected to the Frame (i-Frame Parts 1 3101, 2 3102, 3, 3103, and 4 3104) by means of a strap 404 that passes through the two Strap Hole Fastening Points 3202 that are located at three different positions along the length of the i-Frame Part (1, 2, 3, or 4) and through the Strap Receiving Loop 402 before the strap loops back and returns toward the place where it originated and passes back over the i-Frame Part (1, 2, 3, or 4) before fastening itself back onto itself by means of very strong Velcro or other attaching device. In this variation the Strap Hole Fastening Point 3202 is a loop or rectangular frame section made of metal or other strong material that is part of the i-Frame part 1 (2, 3, or 4) and which contains a hole or passing section which allows for a strap 404 to pass through it (the Strap Hole Fastening Point) in order to pull the strap 404 which is attached to the pontoon in contact to the i-Frame Part.

FIG. 32B, a cross-section view shows how the Strap 404 which is attached to the pontoon (by adhesive or other strong fastening method, such a stitching) passes through the Strap Hole Fastening Points 3202 of i-Frame Part 1 3101, then through the Strap Receiving Loop 402 which is attaché to the pontoon (by adhesive or other strong fastening method, such a stitching) before it (the Strap 404) changes directions and returns back over the i-Frame Part 1 3101 and then is pulled tight before being fastened (by Velcro or other device) to itself at the originating point of the Strap 404. FIG. 32C clarifies possible locations for the Strap Hole Fastening Points, 3202.

Figure 33:
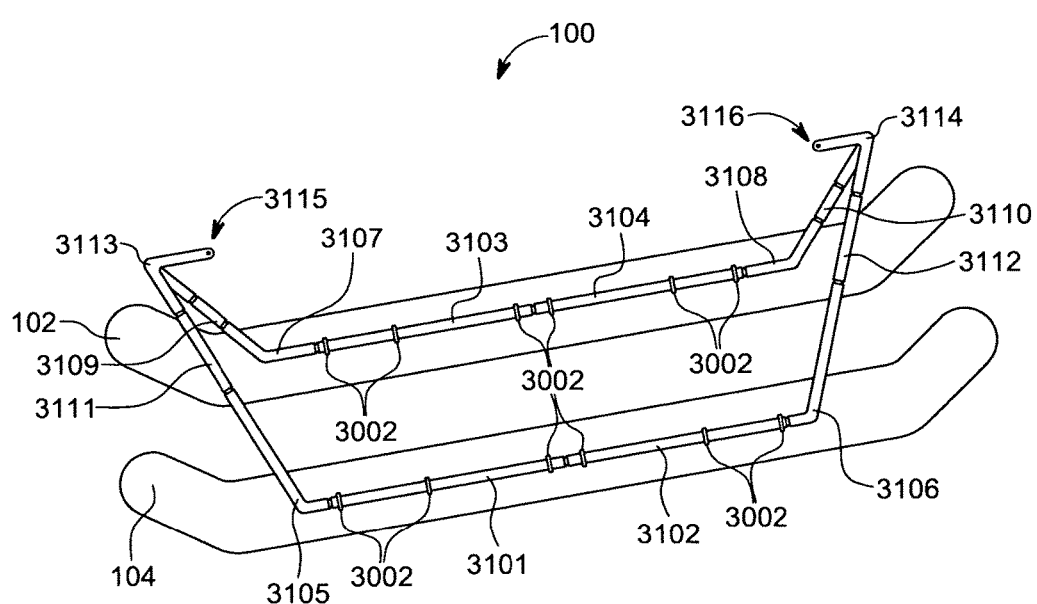
FIG. 33 is a perspective view of a variation of the floating hammock vessel shown in FIG. 1, according to an aspect of this disclosure.

FIG. 33 shows a variation in which there are twelve different Strap Fastening Points 3002 holding the i-Frame Parts 3101, 3102, 3103, and 3104 to the Pontoons 102 and 104. Each of these Strap Fastening Points consists of the Strap 404 (not shown here but in FIGS. 32A and B), the Strap Hole Fastening Points 3202, the Strap Receiving Loop 402 (not shown here, but in FIGS. 32A and B), and the Strap fastening Method as shown in FIGS. 32A, 32B and as described in the previous paragraph.

Figure 34:
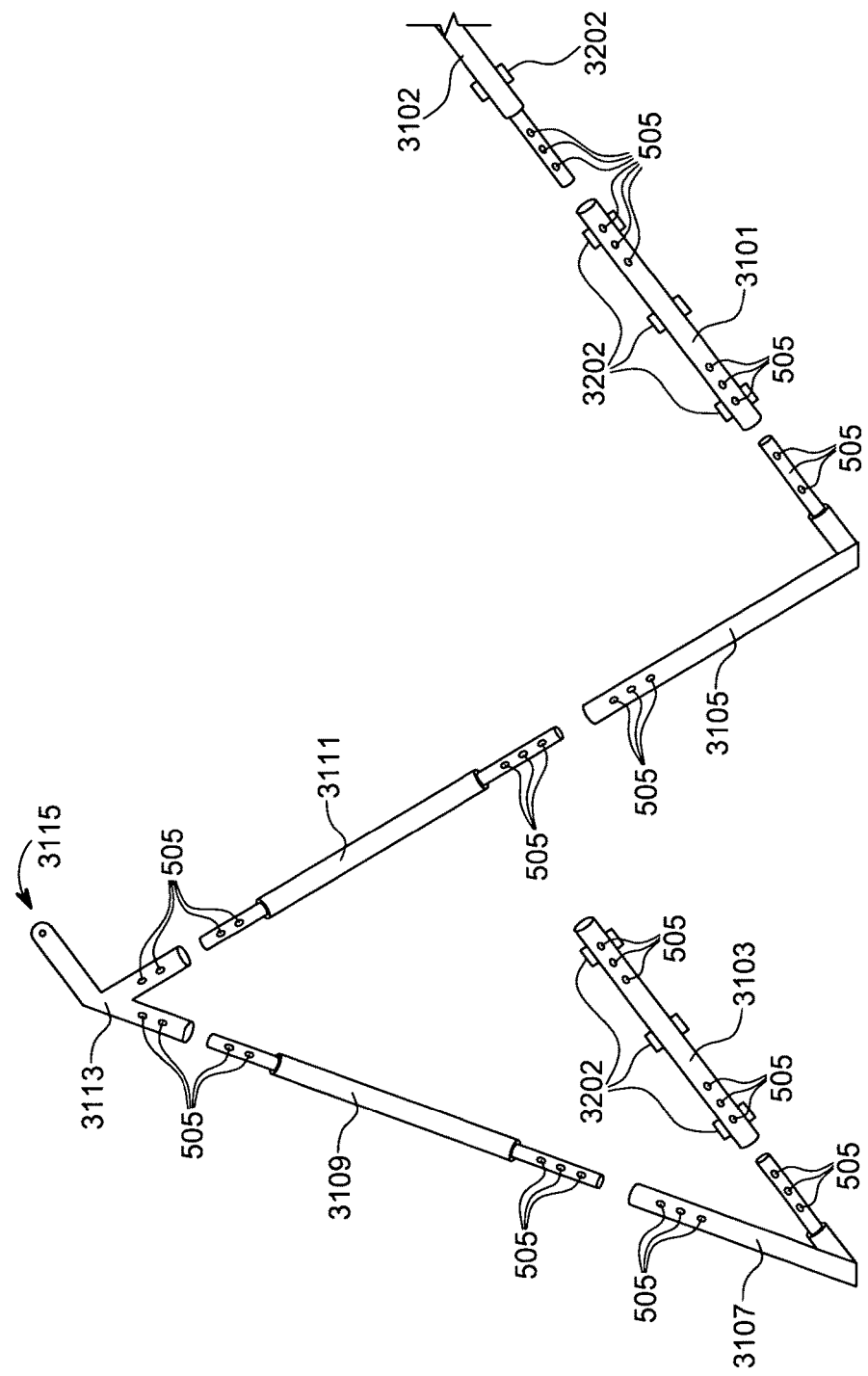
FIG. 34 is a perspective view/side view of a portion of a variation of the floating hammock vessel shown in FIG. 1, according to an aspect of this disclosure.

FIG. 34 shows an exploded view perspective of how the i-Frame Parts connect to each other. The specific order of the how they attach to each other and are connected to each other according to one variation has been detailed above.

Figure 35:
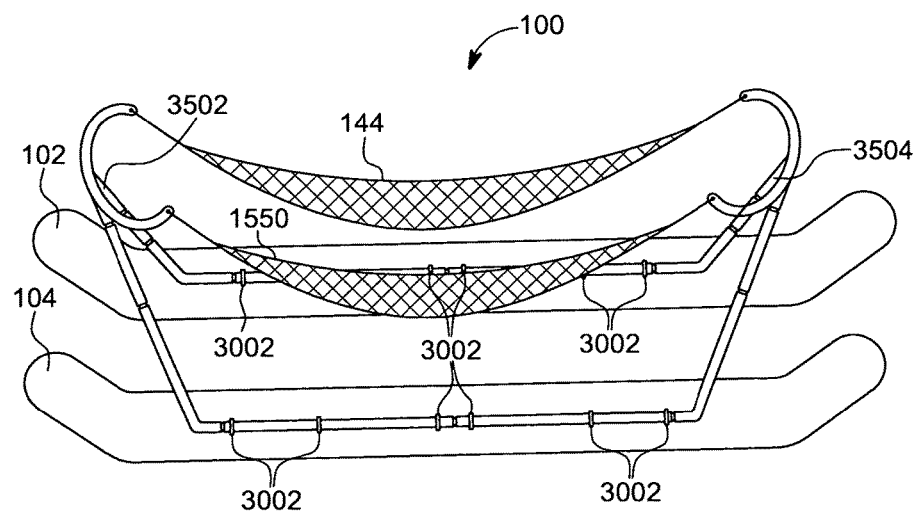
FIG. 35 is a perspective view of a variation of the floating hammock vessel shown in FIG. 1, according to an aspect of this disclosure.

FIG. 35 shows a variation in which i-Frame Doubles Top Connector A 3502 and i-Frame Doubles Top Connector B 3504 each have two suspension points from which to suspend two hammocks, Hammock 144 and Hammock #2 1550. In this variation the angle between the two legs supporting the i-Frame Doubles Top Connector A and i-Frame Doubles Top Connector B is greater than the angle found between the legs supporting i-Frame Top Connector A and i-Frame Top Connector B (as shown in FIGS. 30, 31, 33, and 34) in order to make sure the pontoons 1 102 and 104 as shown in this variation in FIG. 35 are a greater distance apart ensuring for more stability. The i-Frame Doubles Top Connectors A and B 3502 and 3504 allow for two users to simultaneously use the Floating Hammock Vessel while positioned side by side. The curved nature of the i-Frame Doubles Top Connectors A 3502 an B 3504 allow for the suspension points to be closer in towards the middle of the Floating Hammock Vessel which helps ensure that the users will have sufficient space between them and the frame. A variation may include foam or other padding material that wraps around the frame in order to best protect the user or users against harm in case of coming into direct and sudden contact with the frame.

Figure 36:
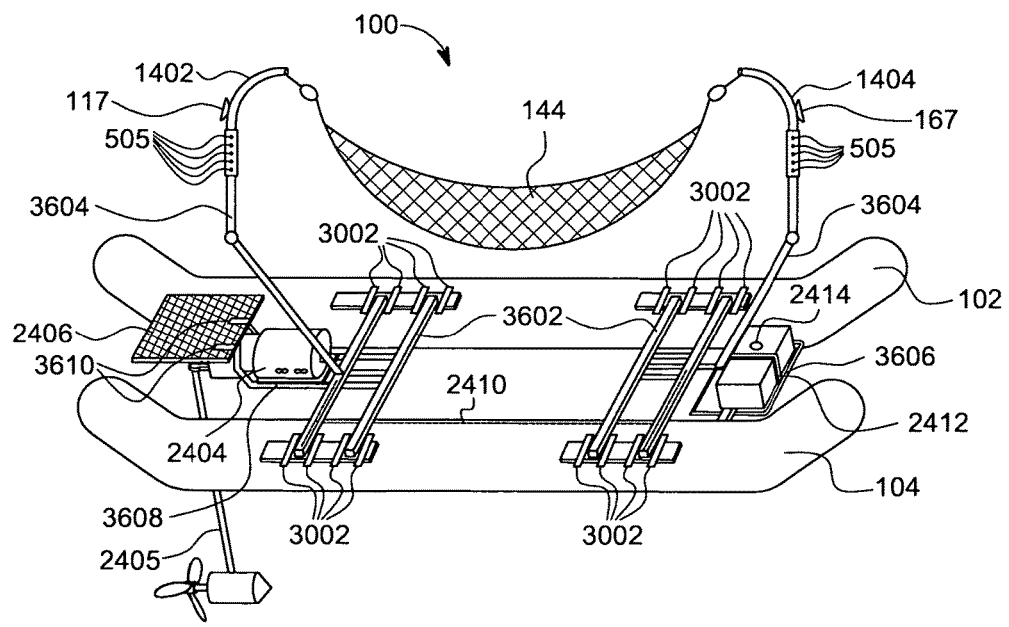
FIG. 36 is a perspective view of a variation of the floating hammock vessel shown in FIG. 1, according to an aspect of this disclosure.

FIG. 36 shows another variation of the Floating Hammock Vessel 100 in which the frame structure is made of two primary pontoon—crossing sections referred to here as Cross-Pontoon Frames 3602. In this variation the pontoons may be either inflatable or solid. In this variation the Cross-Pontoon Frames 3602 are held in place against the pontoons by Strap Fastening Points 3002 in sixteen different locations on the two Pontoons 102 and 104. Each of the Strap Fastening Points shown in FIG. 36 consists of the Strap 404 (not shown here but in FIG. 32), the Strap Hole Fastening Points 3202, the Strap Receiving Loop 402 (not shown here, but in FIG. 32). The Strap Fastening Points 3002 ensure that the Cross-Pontoon Frame cannot move around on its pontoon 1 102 or 104 and the Cross-Pontoon Frame remains in a fixed position.

FIG. 36 shows a variation in which a battery sits in the Battery Holder 2414, which is held to a CP-Frame Rack Attachment 3606 by means of a Battery Holder Tie Down 2412. FIG. 36 further shows a variation in which a bow mount motor 2404 and a Solar Panel 2406 are attached to a CP Frame Rack and Solar Panel Mount Attachment 3608. FIG. 36 also shows Adjustable Joint Unit Attachments 3604 supporting the Curved Extensions 1402 which suspend the Hammock 144. In another variation, Deck Flooring Sections 1904 (not shown here but shown in FIG. 19) may be attached between the Cross-Pontoon Frames by means of a fastening device (not shown). In another variation, an Extension Cup Holder 2602 (not shown here, but shown in FIG. 26) may be attached to the Cross-Pontoon Frame 3602 by a fastening device not shown here. In another variation Fishing Pole Holders 2702 (not shown here but shown in FIG. 27) may be attached to the Cross Pontoon Frame 3602 by a fastening device not shown here. In another variation a Fan 2902 may be attached to the Cross-Pontoon Frame 3602 by a fastening device not shown here. In another variation a table/desktop 2802 (not shown here, but shown in FIG. 28) may be attached to the Cross Pontoon Frame 3602 by a fastening device not shown here. In another variation a light 1806 may be attached to either the adjustable Joint Unit Attachment 3604 or the Curved Extension 1402 by a fastening device not shown here. In another variation the Shade Umbrella 1802 (not shown here, but shown in FIG. 18) can be attached to the Adjustable Joint Unit Attachment 3604 by a fastening device not shown here. In another variation the Doubles Extension Mechanism 1502, 1504 (not shown here, but shown in FIG. 15 may be attached to the Adjustable Joint Unit Attachment 3604 allowing for two users to use this variation simultaneously. In another variation the Curved Doubles Extension Mechanism 1602, 1604 (not shown here, but shown in FIG. 16) may be attached to the Adjustable Joint Unit Attachment 3604 for use of two users simultaneously on this variation. In another variation the Doubles Stacked Extension Attachment 1700, 1701 may be attached to the Adjustable Joint Unit Attachment 3604 allowing for two users to use this variation in a stacked formation.

Figure 37:
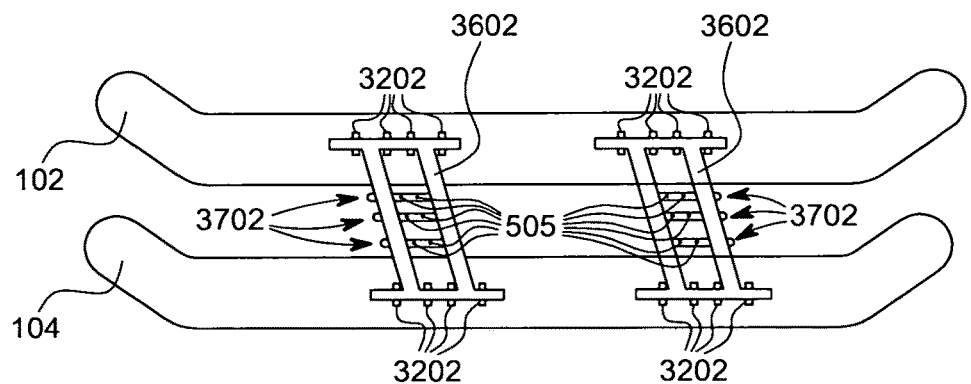
FIG. 37 is a perspective view of a portion of a variation of the floating hammock vessel shown in FIG. 1, according to an aspect of this disclosure.

FIG. 37 shows that each Cross-Pontoon Frame 3602 includes three CP Frame Attachment Receivers 3702 which are located underneath the smooth upper surface of the Cross-Pontoon Frames. FIG. 37 shows that there are two Cross-Pontoon Frames 3602, and that each has three CP Frame Attachment Receivers 3702.

Figure 38:
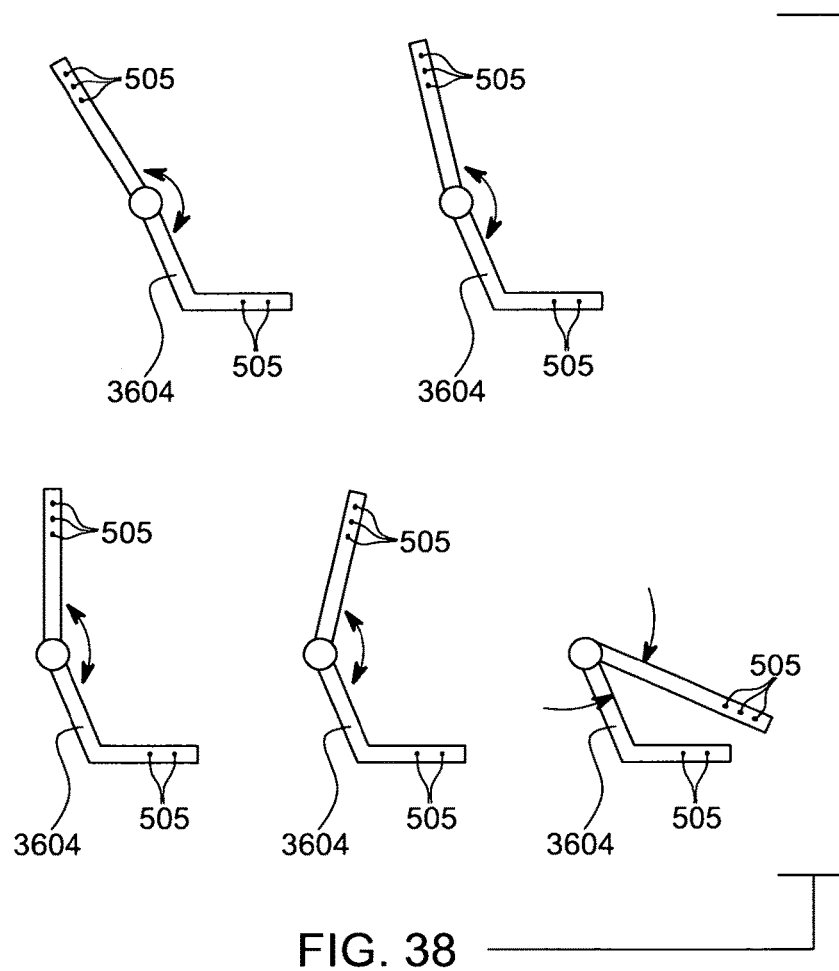
FIG. 38 is side view of a portion of a variation of the floating hammock vessel shown in FIG. 1, according to an aspect of this disclosure.

FIG. 38 shows the Adjustable Joint Unit Attachment 3604 (shown also in FIG. 36) as having a hinged joint which is adjustable and can be fixed by a device not shown here to be held in such a manner that the upper section's angle in relation to the bottom section can be changed. FIG. 38 shows a variation in which the bottom part of the Adjustable Joint Unit Attachment has an elbow-joint angle of approximately 110 degrees. FIG. 38 shows that near both ends of the Adjustable Joint Unit Attachment are Connector Holes 505, which allow the Adjustable Joint Unit Attachment to be connected to the CP Frame Attachment Receiver 3702 as shown in FIG. 37 at the bottom end and to the Curved Extension 1404 at the top end.

Figure 39A:
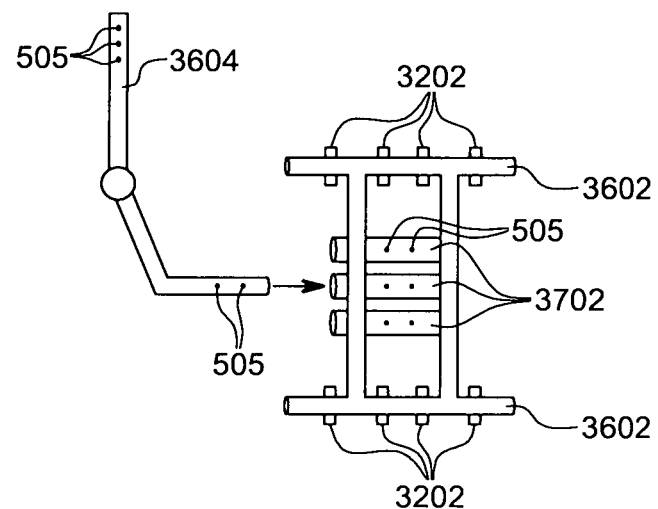
FIG. 39A is a perspective view of a portion of a variation of the floating hammock vessel shown in FIG. 1, according to an aspect of this disclosure.

FIG. 39A shows a variation in which the Adjustable Joint Unit Attachment 3604 fits into the middle CP Frame Attachment Receiver 3702 and is fastened to it where their respective Connector Holes 505 align by means of Connector Members 525 not shown here. Note that in FIGS. 39A, B and C the Cross-Pontoon Frame, 3602, is shown in plan-view while the Adjustable Joint Unit 3604 is shown as a side-elevation view: these two items are actually at right-angles to one another.

Figure 39B:
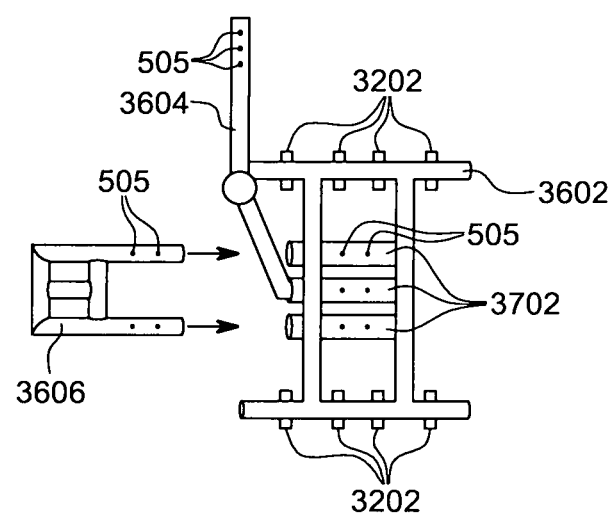
FIG. 39B is a perspective view of a portion of a variation of the floating hammock vessel shown in FIG. 1, according to an aspect of this disclosure.

FIG. 39B shows a variation in which the CP Frame Rack Attachment fits into the outer two CP Frame Attachment Receivers 3702 and is attached to it where the Connector Holes 505 align by means of Connector Members 505 not shown here.

Figure 39C:
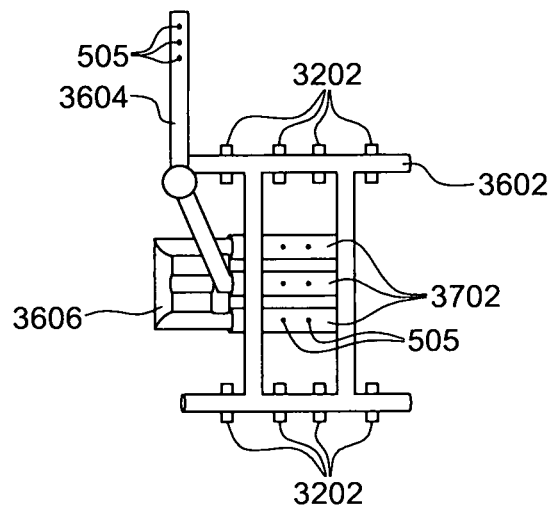
FIG. 39C is a perspective view of a portion of a variation of the floating hammock vessel shown in FIG. 1, according to an aspect of this disclosure.

FIG. 39C shows how Adjustable Joint Unit Attachment 3604 and Cross-Pontoon Frame 3602 and CP Frame Rack Attachment 3606 all come together to form a single structure which can be seen in FIG. 36 in which the CP Frame Rack Attachment 2606 is on the right side supporting the Battery Holder 2414.

Figure 40A:
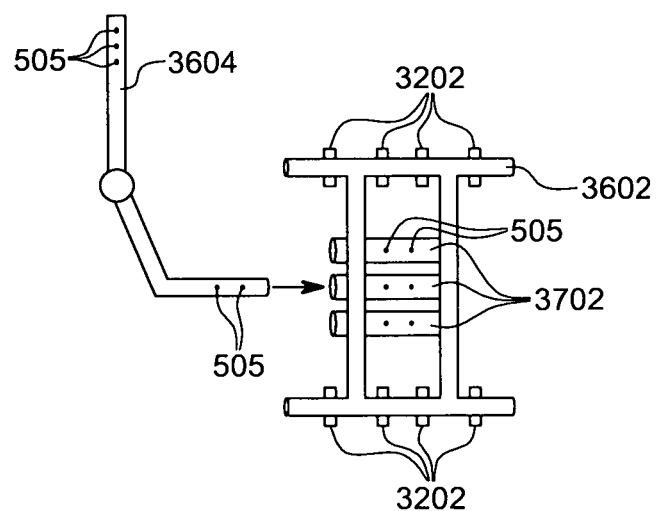
FIG. 40A is a perspective view of a portion of a variation of the floating hammock vessel shown in FIG. 1, according to an aspect of this disclosure.

FIG. 40A shows a variation in which the Adjustable Joint Unit Attachment 3604 fits into the middle CP Frame Attachment Receiver 3702 and is fastened to it where their respective Connector Holes 505 align by means of Connector Members 525 not shown here. Note that in FIGS. 40A, B and C the Cross-Pontoon Frame, 3602, is shown in plan-view while the Adjustable Joint Unit 3604 is shown as a side-elevation view: these two items are actually at right-angles to one another.

Figure 40B:
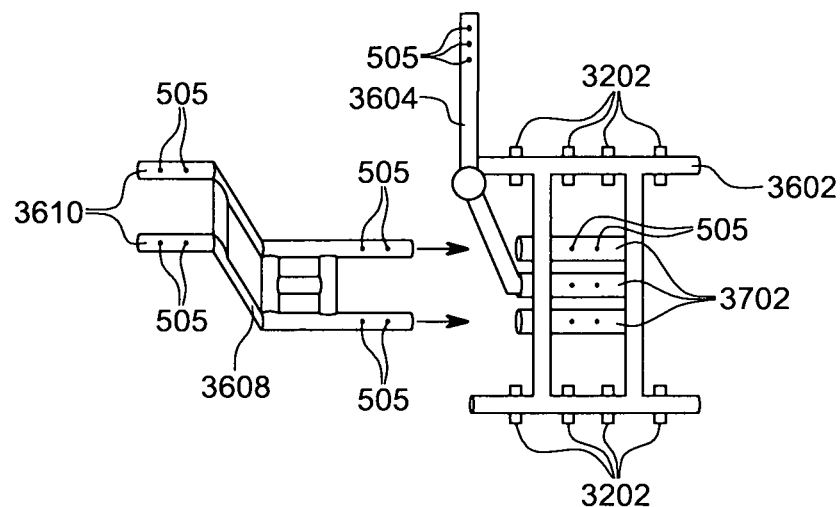
FIG. 40B is a perspective view of a portion of a variation of the floating hammock vessel shown in FIG. 1, according to an aspect of this disclosure.

FIG. 40B shows a variation in which the CP Frame Rack and Solar Panel Mount Attachment 3608 fits into the outer two CP Frame Attachment Receivers 3702 and is attached to it where the Connector Holes 505 align by means of Connector Members 525 not shown here.

Figure 40C:
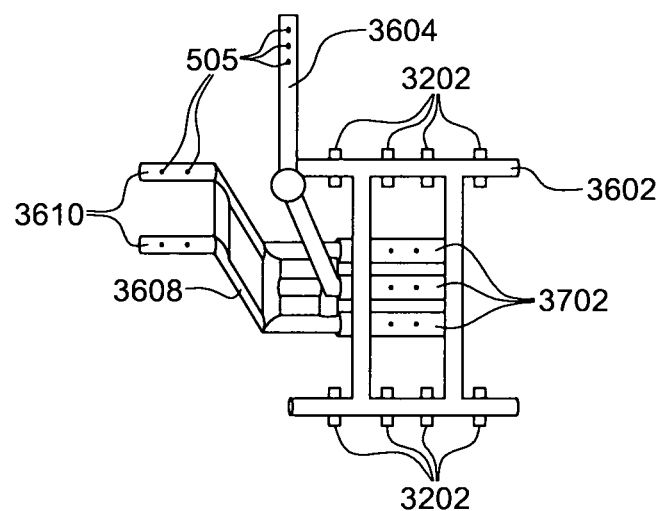
FIG. 40C is a perspective view of a portion of a variation of the floating hammock vessel shown in FIG. 1, according to an aspect of this disclosure.

FIG. 40C shows how Adjustable Joint Unit Attachment 3604 and Cross-Pontoon Frame 3602 and CP Frame Rack and Solar Panel Mount Attachment 3608 all come together to form a single structure which can be seen in FIG. 36.

Figure 41A:
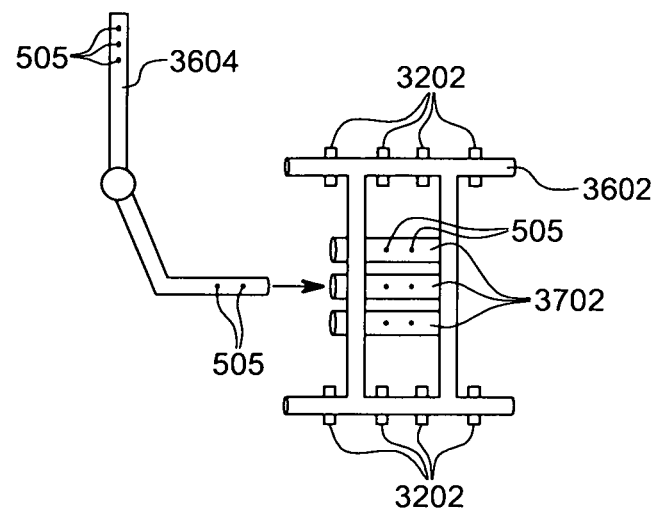
FIG. 41A is a perspective view of a portion of a variation of the floating hammock vessel shown in FIG. 1, according to an aspect of this disclosure.

FIG. 41A shows a variation in which the Adjustable Joint Unit Attachment 3604 fits into the middle CP Frame Attachment Receiver 3702 and is fastened to it where their respective Connector Holes 505 align by means of Connector Members 525 not shown here. Note that in FIGS. 41A, B and C the Cross-Pontoon Frame, 3602, is shown in plan-view while the Adjustable Joint Unit 3604 is shown as a side-elevation view: these two items are actually at right-angles to one another.

Figure 41B:
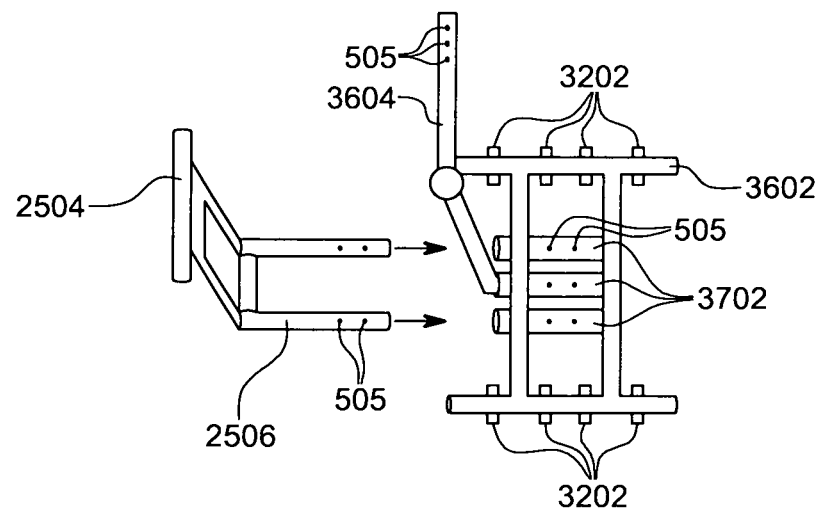
FIG. 41B is a perspective view of a portion of a variation of the floating hammock vessel shown in FIG. 1, according to an aspect of this disclosure.

FIG. 41B shows a variation in which the Transom Attachment 2506 fits into the outer two CP Frame Attachment Receivers 3702 and is attached to it where the Connector Holes 505 align by means of Connector Members 525 not shown here.

Figure 41C:
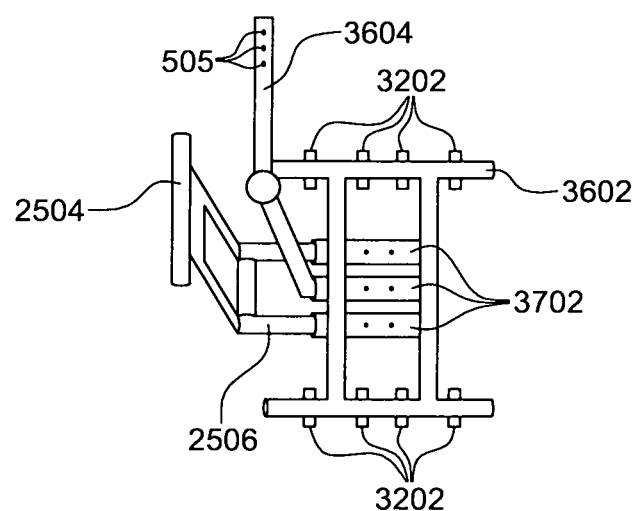
FIG. 41C is a perspective view of a portion of a variation of the floating hammock vessel shown in FIG. 1, according to an aspect of this disclosure.

FIG. 41C shows how Adjustable Joint Unit Attachment 3604 and Cross-Pontoon Frame 3602 and the Transom Attachment 2506 all come together to form a single structure. In this variation a transom mount motor may be mounted on the Transom 2504.

Figure 42:
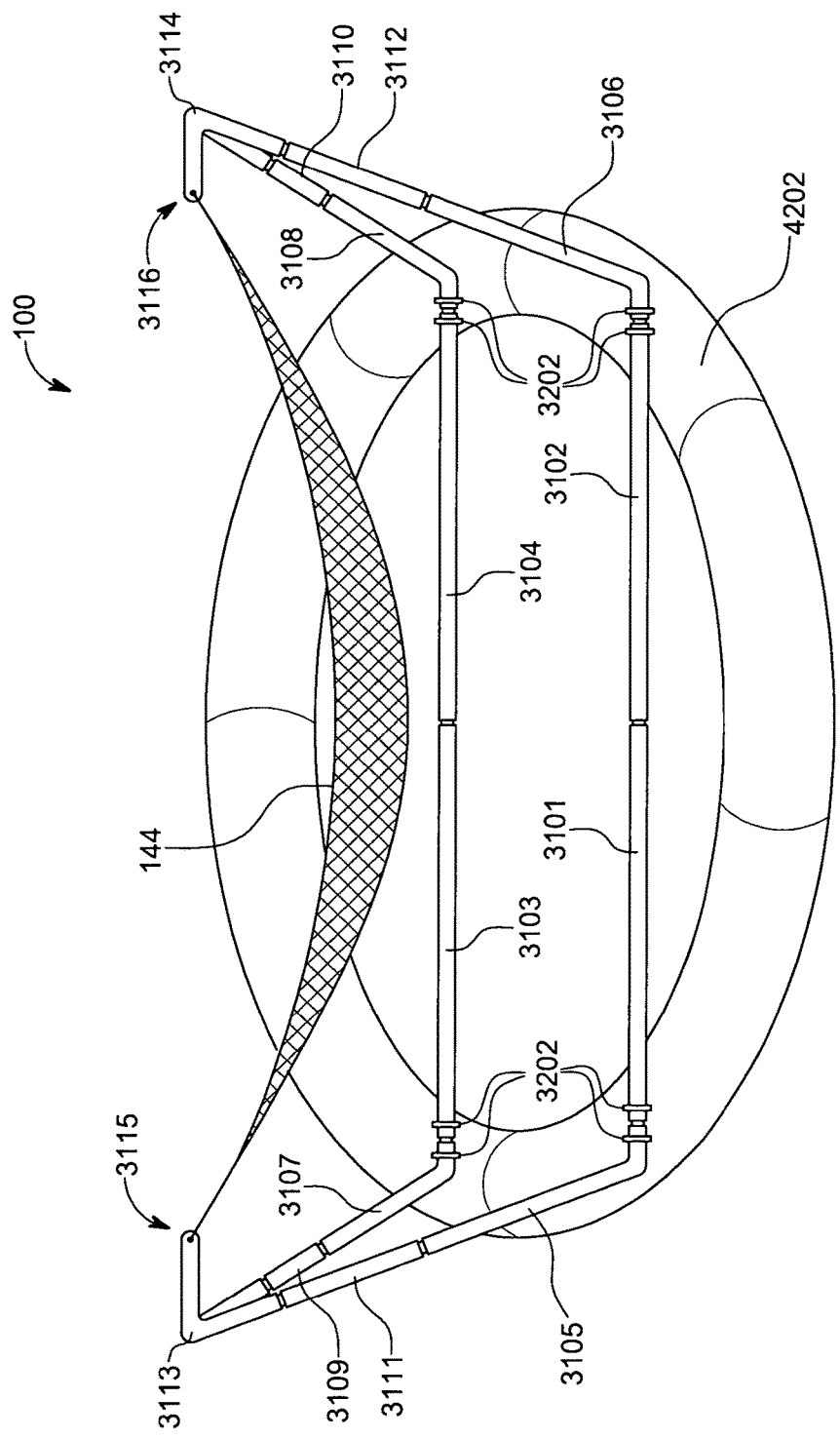
FIG. 42 is a perspective view of a variation of the floating hammock vessel shown in FIG. 1, according to an aspect of this disclosure.

FIG. 42 shows a variation in which the Floating Hammock Vessel 100 is supported by a Circular Floating Device 4202 which is a circular floating device, circular buoyancy system, whose buoyancy is such that it can support the floating hammock vessel and various users. In this variation eight Strap Fastening Points 3002 and Strap Hole Fastening Points 3202 are used to secure the Circular Floating Device 4202 to the i-Frame which supports the hammock. In this variation the Strap 404 (not shown here, but shown in FIG. 32) starting point originates on and is fixed to the Circular Floating Device and the Strap Receiving Loop 402 (not shown here) originates on and is fixed to the Circular Floating Device. These Straps 404 are connected to the Strap Hole Fastening Points 3202 as described in paragraph 00177. In an alternate version there may be a greater or lesser number of Strap Fastening Points 3002. In an alternate versions there may be another fastening system used in order to hold the floating hammock vessel's frame to the Circular Floating Device. In an alternate variation the Circular Floating Device may be entirely covered by a fitted covering made of a strong water-resistant material and the Straps 404 may be attached to this covering. The circular nature of this variation allows for a user to easily bounce off of other floating hammock vessels of a similar variation as well as to bounce off of other obstacles without the likelihood of getting caught up on (or stuck) on such obstacles. Examples of materials for the circular buoyancy system include, but are not limited to, foamed synthetic materials, low density synthetic materials, rubber, such as an inflatable tube or tire inner tube, and the like, as well as any combinations thereof. Suitable circular bouyancy systems may not be necessarily a perfect circle, or perfectly torus-shaped. For example, a suitable circular bouyancy system are characterized by a closed-loop shape and may be oval in shape, or even triangular, or even a combination of polygons and curves. More generally, the term "bouyancy systems" include both a cooperative floating system of two or more pontoons and circular bouyancy systems as provided herein.

Figure 43:
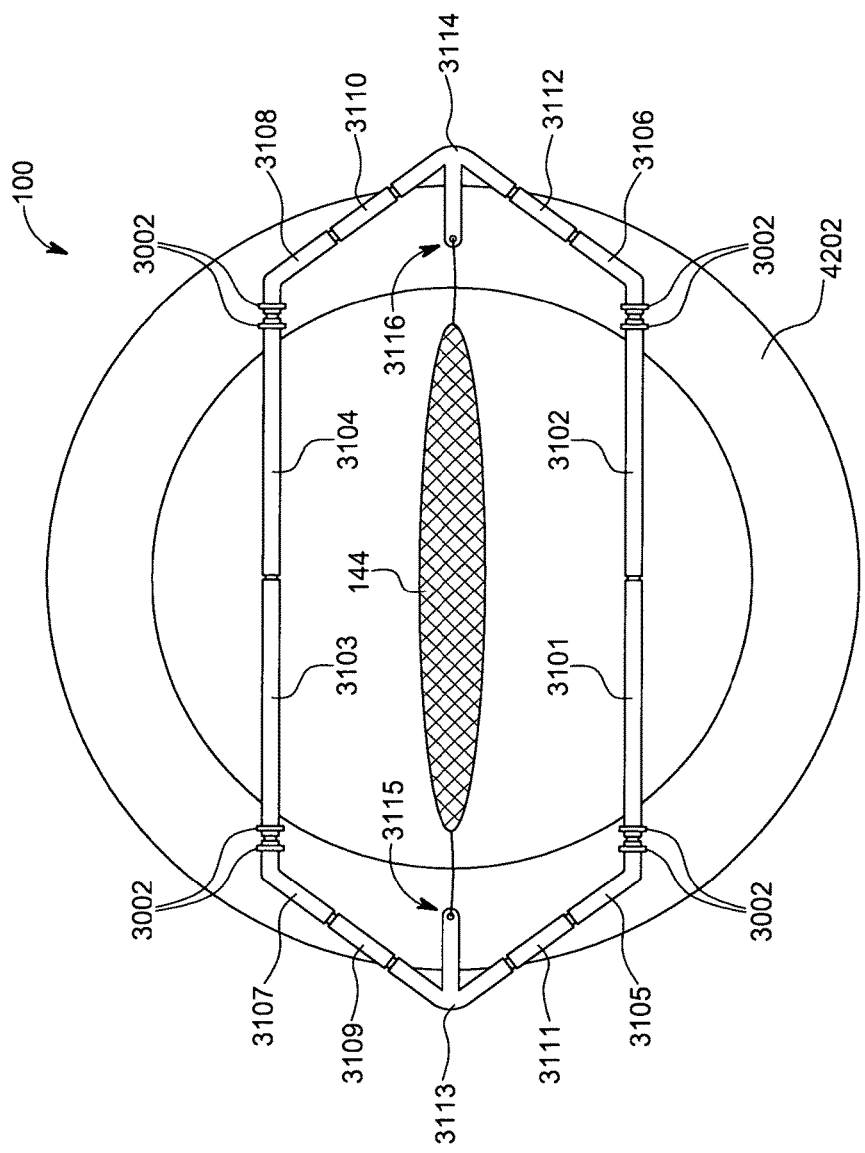
FIG. 43 is a top view of a variation of the floating hammock vessel shown in FIG. 1, according to an aspect of this disclosure.

FIG. 43 shows a top-view perspective of this variation of the Floating Hammock Vessel 100 in which it can be appreciated that the center point of the floating hammock vessel is aligned with the center point in the middle of the Circular Floating Device 4202.

The Floating Hammock Vessel 100 gets you into a lake in style, quickly, silently, without using much of your own effort and with minimal pollution to the environment. The Floating Hammock Vessel 100 may be fast, lightweight, effortless, and environmentally friendly as it is designed to function with an electric motor that does not pollute the water, does not make noise pollution, and runs off of a battery which can be charged by the solar panels on the vessel while the motor is being used.

Other components of the Floating Hammock Vessel 100 may include the following:

- Fastener to hold large paddle (e.g. SUP paddle)
- Solar Panel with controller, directly hooked up to motor which allows for simultaneous charging and use of motor.
- Ability to add more than one such solar panel.
- Sun blocking systems (e.g. umbrella, canopy, etc.)
- Umbrella as attachment ability to flip it up, angle it however you wish, open it . . . all without un-attaching it from pole
- Ability to attach a sail to Leg C 114.
- Ability to attach dual-rudders (catamaran style) to back of pontoons.
- Latches/fasteners/pulleys/rope-grippers required for sailing.
- Cup-holders attached to flex-necks so as to be able to position as wished.
- Cooler tie down hooks/O-rings, to tie strap to floor.
- Battery tied downs . . . hooks or O-rings to tie strap to floor.
- Adjustable Hammock Support pole . . . for different heights.
- Flex-neck (like "goose-neck" lamps . . . to be able to hold book/remote controls or ipad, or iphone or smart phones or computers or speakers.
- Tie down to hold electric winch in place.
- System of pulleys to allow winch to raise and lower hammock 144 using winch.
- Ability to easily adjust hammock rope (either manually or via the winch) to raise and lower the hammock 144.
- Hammock 144 can be lowered below the level of the Base Frame 106 and 108 and into water.
- Ability to easily dis(assemble) parts into separate individual pieces: Pontoons 1 102 and 2 104 and Base Frames 1 106 and 2 108, and frame sections, etc. . . . and thus may be put on roof rack.
- Ability to attach a light to front/back/sides of vessel 100.
- Device to attach flag (e.g. distress flag or protest flags).
- Ability to connect one Floating Hammock Vessel to another Floating Hammock Vessel, either side by side (with each Floating Hammock Vessel positioned lengthwise next to each other such that their respective pontoons are all parallel to each other) or nose to nose. Ability may be provided by attachments that connect Base Frame 1 or Base Frame 2 of a Floating Hammock Vessel to Base Frame 1 or Base Frame 2 of another Floating Hammock Vessel. The ability to connect any number of Floating Hammock Vessels to each other and thus creating a single large floating structure with many hammock options. This may be a good option for holding a Yoga class or other gathering of people in the middle of a lake.
- Ability to attach cable/rope between two hammock poles at highest point and to then hang OTHER things from this cable/rope, such as swinging hammock-type chairs, etc.
- Ability to hold a first aid kid, a communications radio and/or a flare gun.
- Ability to be able to suspend a camping hammock for camping purposes.
- Ability to set up a small tent on the Yoga Deck Flooring Section 2102
- Transom capable of holding many styles/makes of electric and non-electric motors.
- Flat Motor Mount 2403 capable of holding many styles and makes of electric and non-electric motors.
- An anchor holding pouch or Anchor Holder, An anchor cranking mechanism to raise and lower the anchor. Anchor can be used to keep Floating Hammock vessel . . . Anchor can be made of Weight or of weight and angled claw-like things to grab into rocks or into a sand or mud bottom or Anchor could be a sail like material that simply holds water and helps prevent Floating Hammock Vessel from being blown around too much by the surface winds.
- Padding to wrap around the posts of the frame . . . for security . . . so if you fall and hit them, it will not hurt as much . . .

A Grip-Surface on the cross deck pieces and on the top of the Base Frame pieces, on all portions of the floating hammock vessel onto which a user is likely to be able to stand or place his/her foot to prevent Slipping.

All references to the disclosure or examples thereof are intended to reference the particular example being discussed at that point and are not intended to imply any limitation as to the scope of the disclosure more generally. The scope of the protected innovation is defined by the attached claims.

What is claimed:

1. A floating vessel having a first end and a second end spaced from the first end in a first direction, the floating vessel comprising:
   a first pontoon extending in the first direction;
   a second pontoon extending in the first direction and being substantially parallel to the first pontoon;
   a first support structure located at the first end and extending at least partially in a height direction, wherein the height direction is substantially perpendicular to the first direction, the first support structure being operatively coupled to both the first pontoon and the second pontoon;
   a second support structure located at the second end and extending at least partially in the height direction, the second support stricture being operatively coupled to both the first pontoon and the second pontoon; and a hammock coupled at one lengthwise end to the first support structure and coupled at its other lengthwise end to the second support structure in such a manner that the hammock be suspended lengthwise between the pontoons, being significantly equidistant form each pontoon and significantly parallel to each pontoon;
   wherein the first support structure includes a first hammock pole, a first support leg, and a second support leg, wherein the first support leg is operatively coupled to the first pontoon and the second support leg is operatively coupled to the second pontoon;
   wherein the first support leg is coupled to the first hammock pole at a first point and the second support leg is coupled to the first hammock pole at the first point.

2. The floating vessel of claim 1, wherein the second support structure includes a second hammock pole, a third support leg, and a fourth support leg, wherein the third support leg is operatively coupled to the first pontoon and the fourth support leg is operatively coupled to the second pontoon.

3. The floating vessel of claim 2, further comprising:
   a first cross beam extending from the first pontoon to the second pontoon in a second direction, wherein the second direction is substantially perpendicular to both the first direction and the height direction; and
   a second cross beam extending from the first pontoon to the second pontoon in the second direction.

4. The floating vessel of claim 3, wherein the first hammock pole is coupled to the first cross beam and the second hammock pole is coupled to the second cross beam.

5. The floating vessel of claim 4, wherein the third support leg is coupled to the second hammock pole at a second point and the fourth support leg is coupled to the second hammock pole at the second point.

6. The floating vessel of claim 5, wherein the first point is positioned equidistant between the first pontoon and the second pontoon in the second direction, and wherein the second point is positioned equidistant between the first pontoon and the second pontoon in the second direction.

7. The floating vessel of any of claims 1, 2-6 further comprising one or more of the following: inflatable pontoons, an additional hammock and hammock support system being suspended from support structures, an additional pontoon arranged in a parallel position with respect to other pontoons, an umbrella attached to the frame, a battery to provide electric power to one or more devices, a solar photovoltaic system attached to the vessel for charging the battery, a cup holder, a light attached to the frame, a yoga deck attached to or as a part of the frame, deck flooring, an electric motor mounted to the vessel to propel the floating vessel, a fishing pole holder, an electric fan.

* * * * *